US009490722B2

(12) United States Patent
Sakakibara

(10) Patent No.: US 9,490,722 B2
(45) Date of Patent: Nov. 8, 2016

(54) METHOD OF CONTROLLING DIRECT POWER CONVERTER

(71) Applicant: DAIKIN INDUSTRIES, LTD., Osaka-shi, Osaka (JP)

(72) Inventor: Kenichi Sakakibara, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/429,858

(22) PCT Filed: Sep. 12, 2013

(86) PCT No.: PCT/JP2013/074706
§ 371 (c)(1),
(2) Date: Mar. 20, 2015

(87) PCT Pub. No.: WO2014/046012
PCT Pub. Date: Mar. 27, 2014

(65) Prior Publication Data
US 2015/0236606 A1 Aug. 20, 2015

(30) Foreign Application Priority Data

Sep. 21, 2012 (JP) ................................ 2012-208048

(51) Int. Cl.
*H02M 5/40* (2006.01)
*H02M 5/458* (2006.01)
*H02M 5/44* (2006.01)

(52) U.S. Cl.
CPC ............. *H02M 5/4585* (2013.01); *H02M 5/40* (2013.01); *H02M 5/44* (2013.01)

(58) Field of Classification Search
CPC ............. H02M 2001/007; H02M 7/5387; H02M 7/7575; H02M 5/458; H02M 5/4585; H02M 5/4505; H02M 5/451; H02M 5/452; H02M 1/12; H02M 1/14; H02M 1/4266; H02M 2001/123; H02M 1/4208; H02M 1/32; H02M 3/28; H02M 3/315; H02H 7/261; H02H 7/268; H02H 7/122; H02J 3/36
USPC ........... 363/44, 39, 126, 40, 55, 97, 98, 131, 363/132, 135, 136, 137, 35–37
See application file for complete search history.

(56) References Cited

U.S. PATENT DOCUMENTS

| 2009/0086515 A1* | 4/2009 | Sakakibara | ......... H02M 5/4585 363/37 |
| 2011/0025246 A1* | 2/2011 | Sakakibara | ......... H02M 1/4216 318/400.42 |
| 2012/0187929 A1* | 7/2012 | Ohshita | ............... H02M 3/1584 323/272 |

FOREIGN PATENT DOCUMENTS

| JP | 3070598 B1 | 7/2000 |
| JP | 4135026 B2 | 8/2008 |
| JP | 4718041 B2 | 7/2011 |
| JP | 2011-193678 A | 9/2011 |

OTHER PUBLICATIONS

Ohnuma et al., "Basic Investigation and Capacitance Reduction method of a Novel Single-Phase to Three-Phase Power Converter," Papers of Technical Meeting on Semiconductor Power Converter, IEE Japan, SPC-08-162, 2008, pp. 7-12, with English abstract provided.
Ohnuma et al., "Circuit Configuration and Control Strategy of single-to-three Phase Power Converter with Active Buffer and Charge Circuit," 2010 IEE Japan National Conference, 4-057, 2010, pp. 95-96, with partial English translation (3 pages total).
Ohnuma et al., "Experimental Verification of Single Phase to Three Phase Converter Using an Active Buffer circuit with a Charge Circuit," 2010 IEE Japan Industry Applications Science Conference, 2010, pp. I-587-I-590, with English abstract provided.

* cited by examiner

*Primary Examiner* — Timothy J Dole
*Assistant Examiner* — Bryan R Perez
(74) *Attorney, Agent, or Firm* — Birch, Stewart, Kolasch & Birch, LLP

(57) ABSTRACT

In a first period when a cosine value is positive that is a cosine value of a value twice a phase angle determined while an AC waveform output from a single-phase AC power source is regarded as a sine value of the phase angle, a discharge duty for making a first switch conducting is set to be higher than a first value determined by dividing the product of an amplitude of an AC voltage of the single-phase AC power source and the cosine value by the product of an across voltage of a capacitor and $\sqrt{2}$. In addition to or alternatively to this, in a second period when the cosine value is negative, a rectifying duty for making a diode rectifier conducting is set to be higher than a second value that is the reciprocal of the product of the absolute value of the sine value and $\sqrt{2}$.

14 Claims, 30 Drawing Sheets

F I G . 4
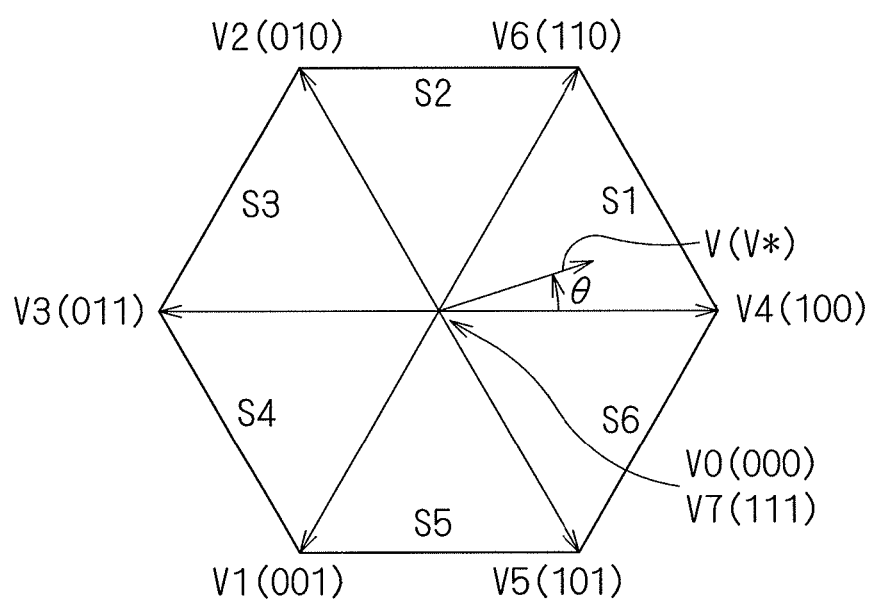

F I G. 5
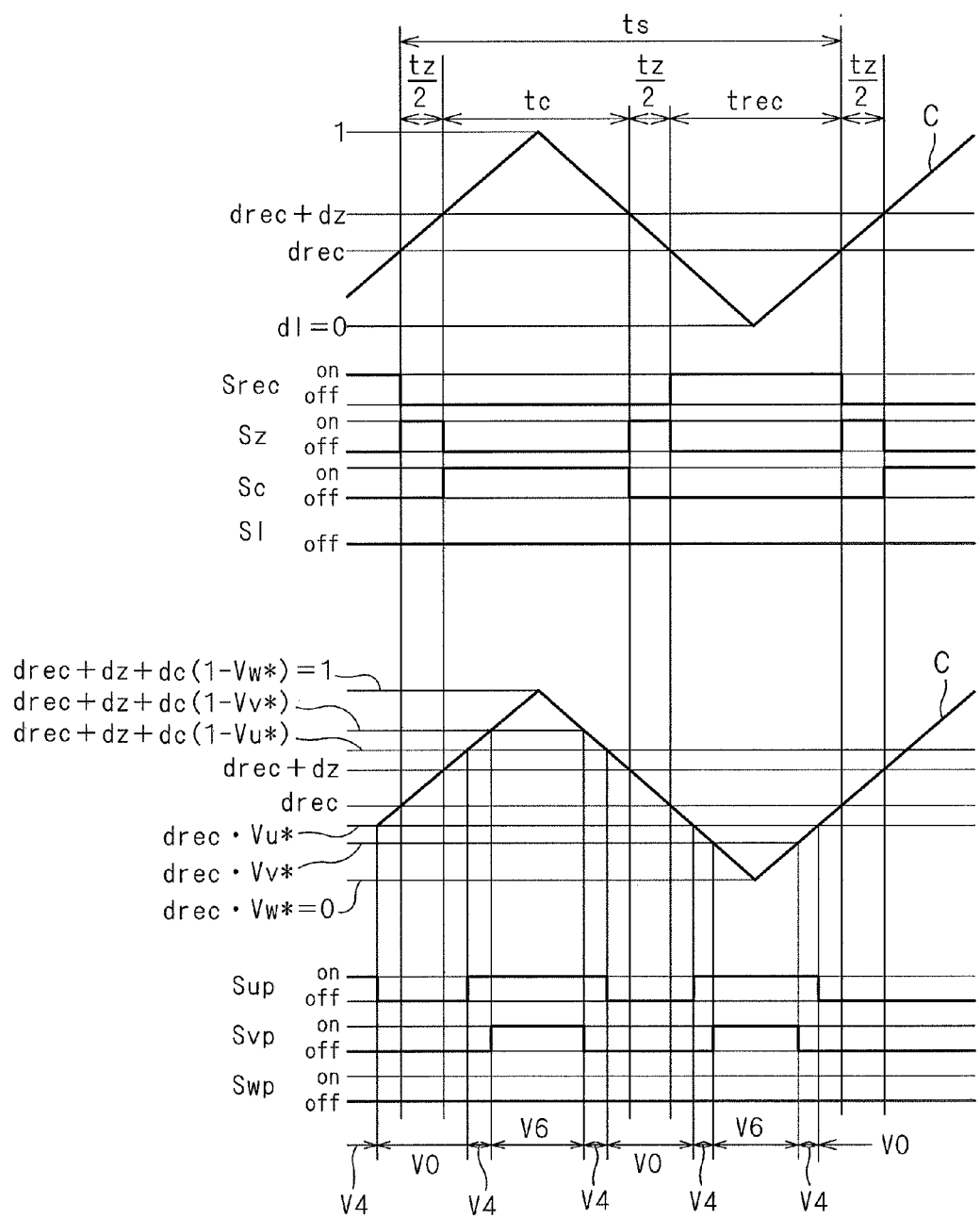

F I G. 6
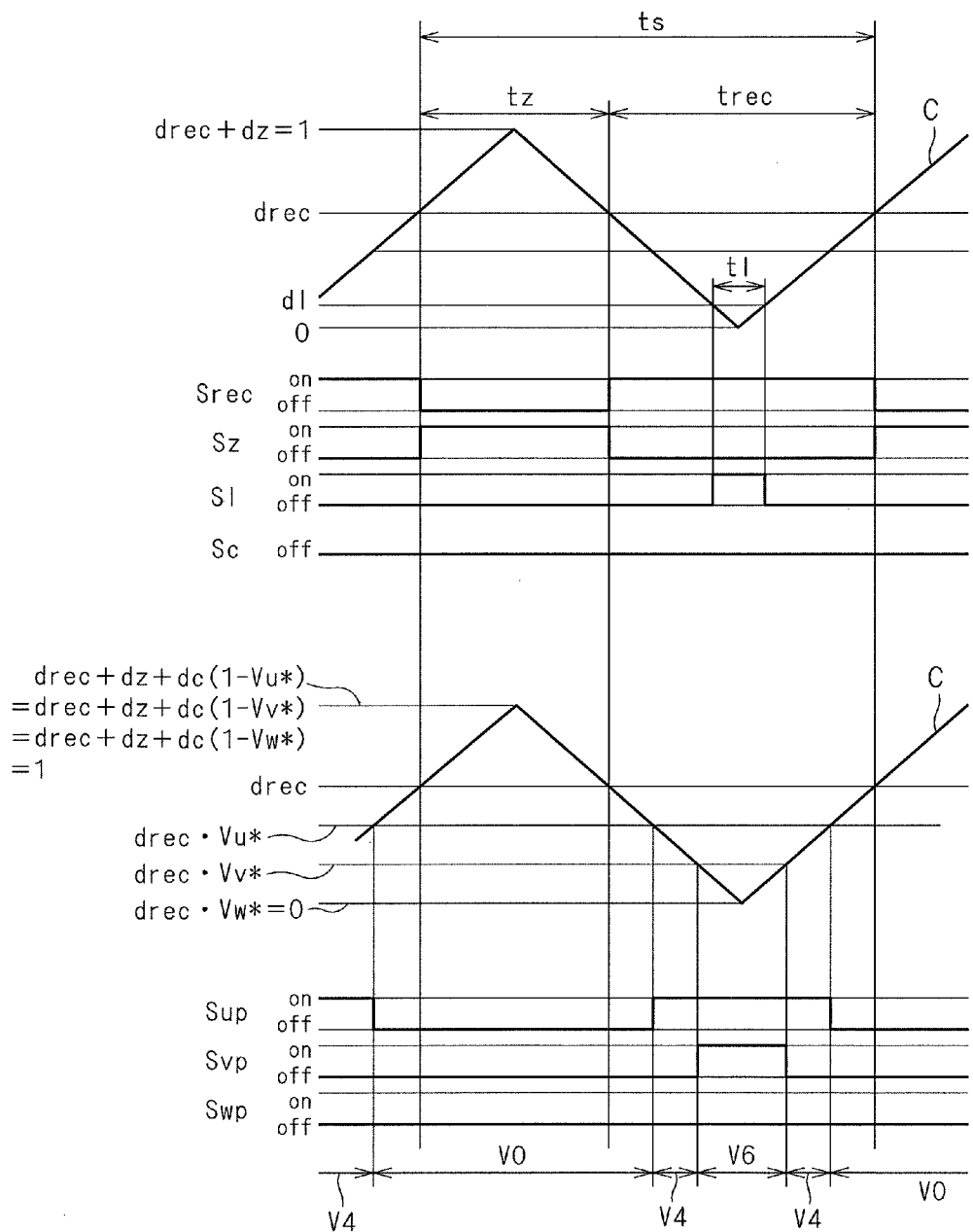

F I G. 7
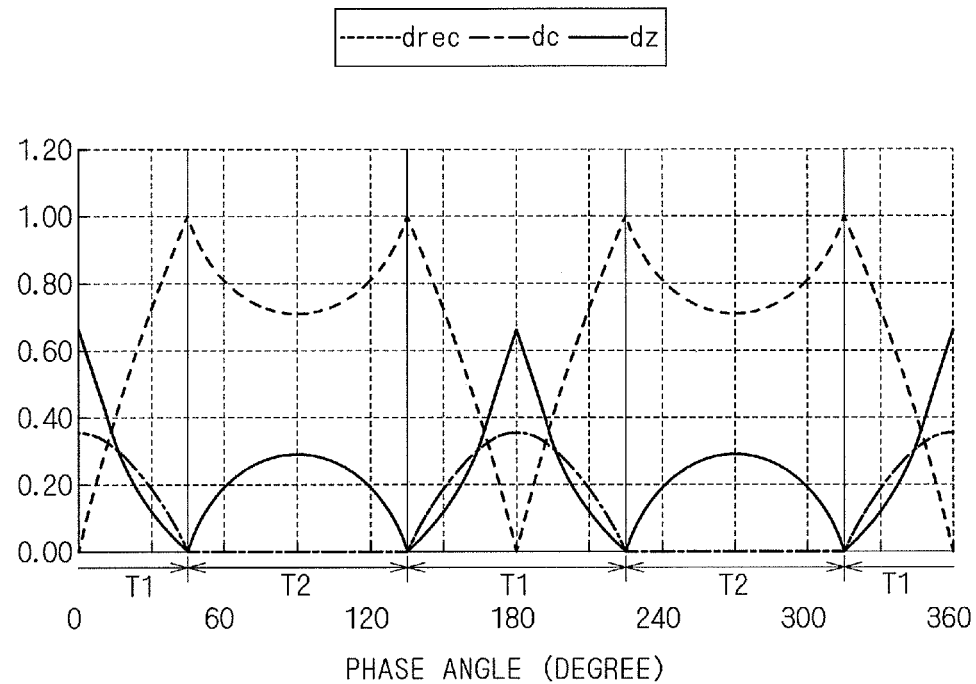
F I G. 8
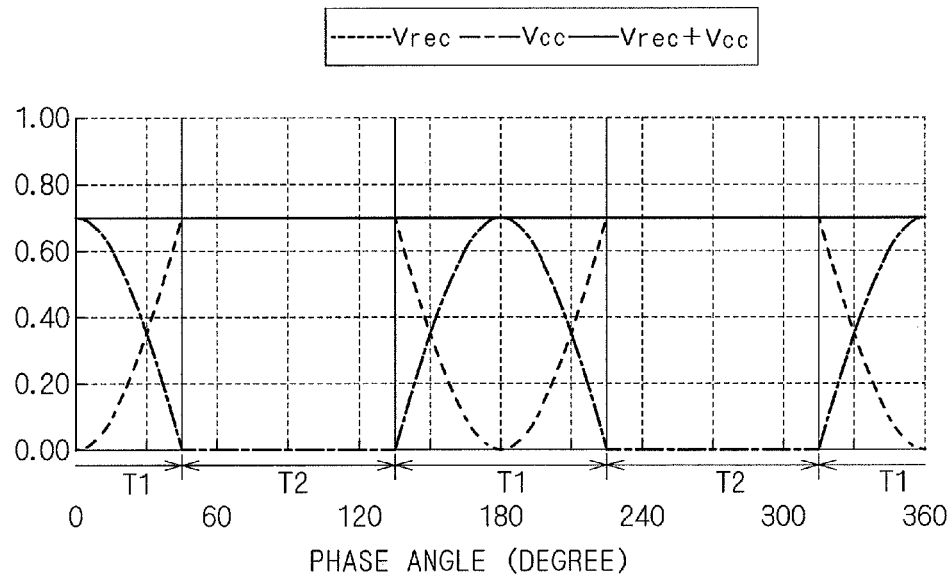

F I G. 9
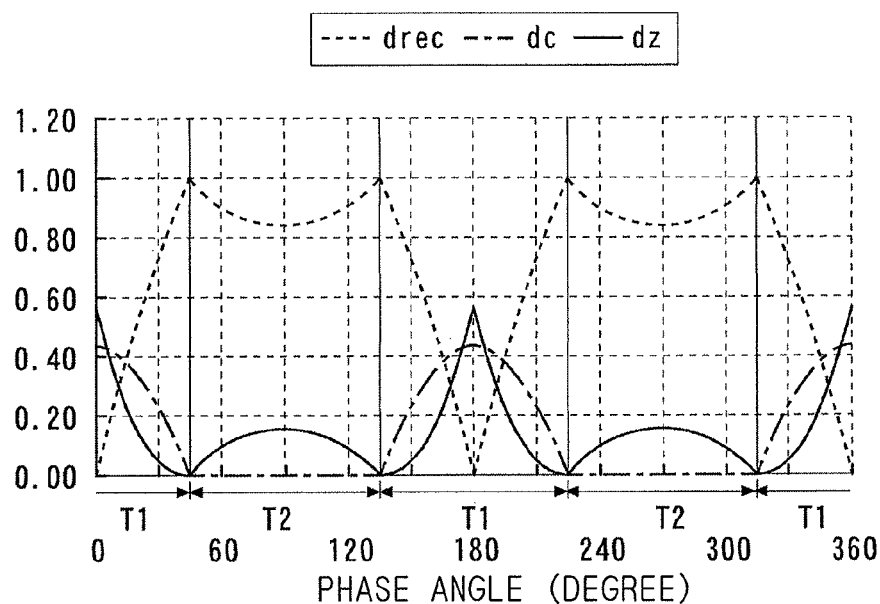
F I G. 1 0
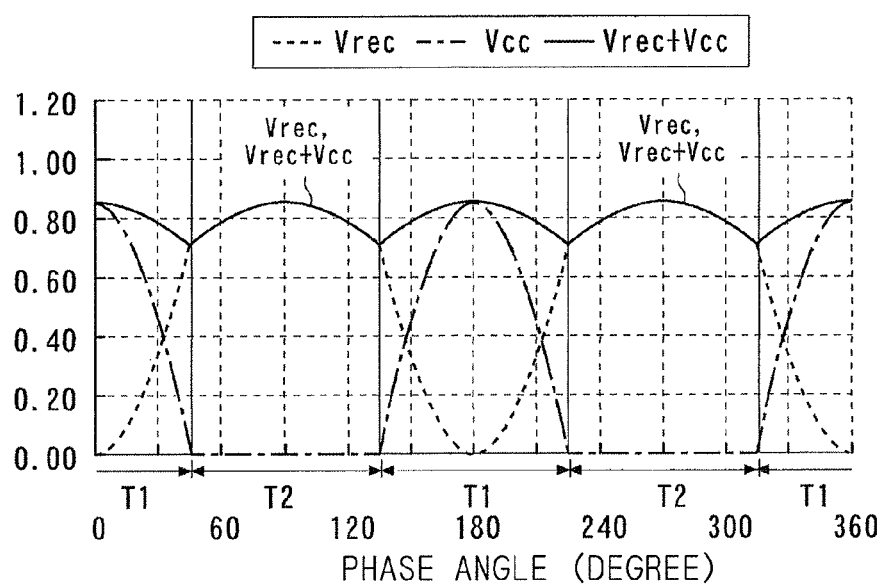

F I G. 1 1
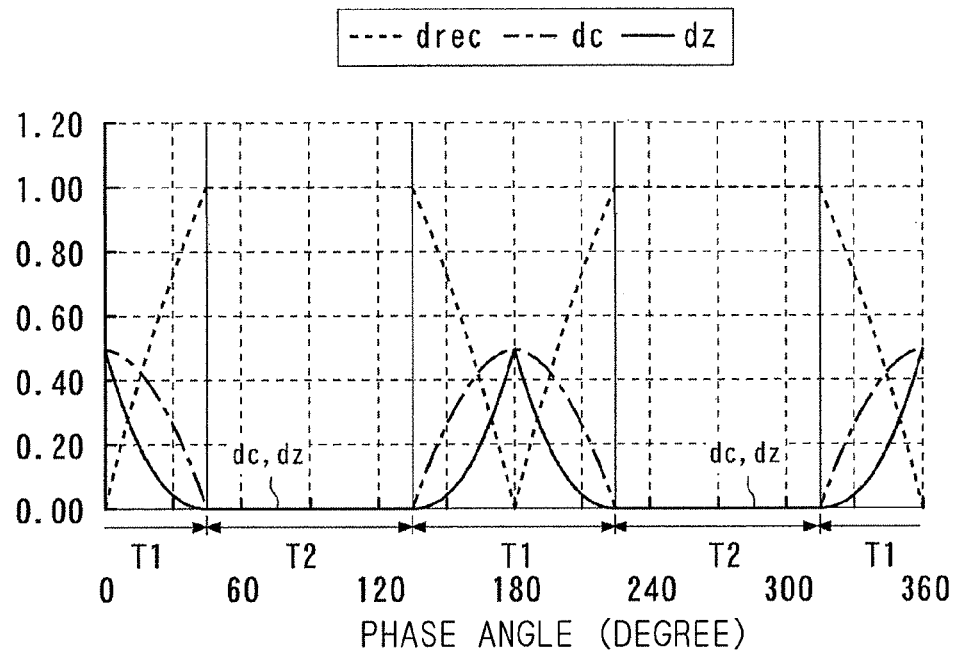
F I G. 1 2
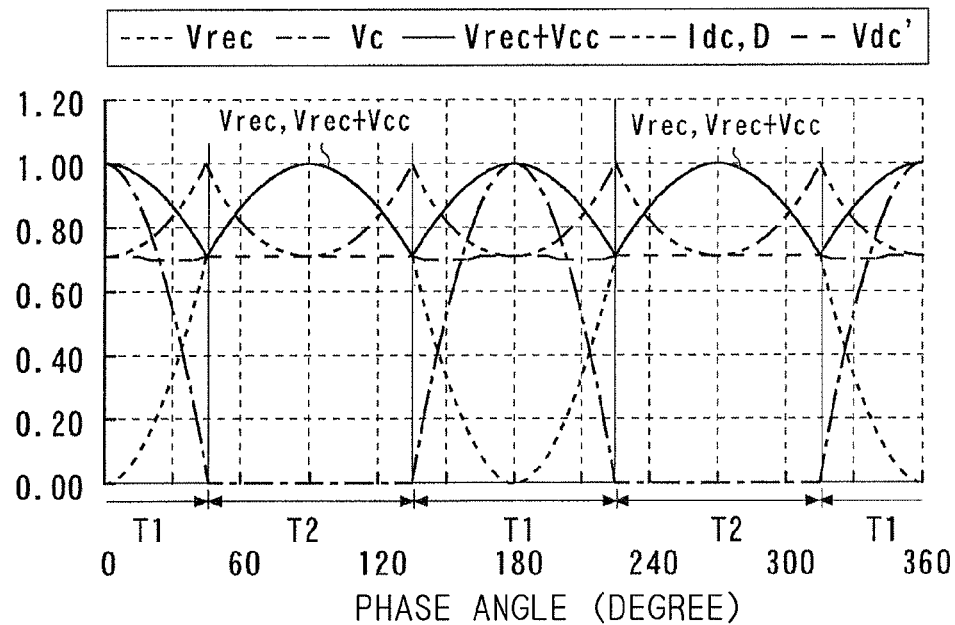

F I G. 1 3
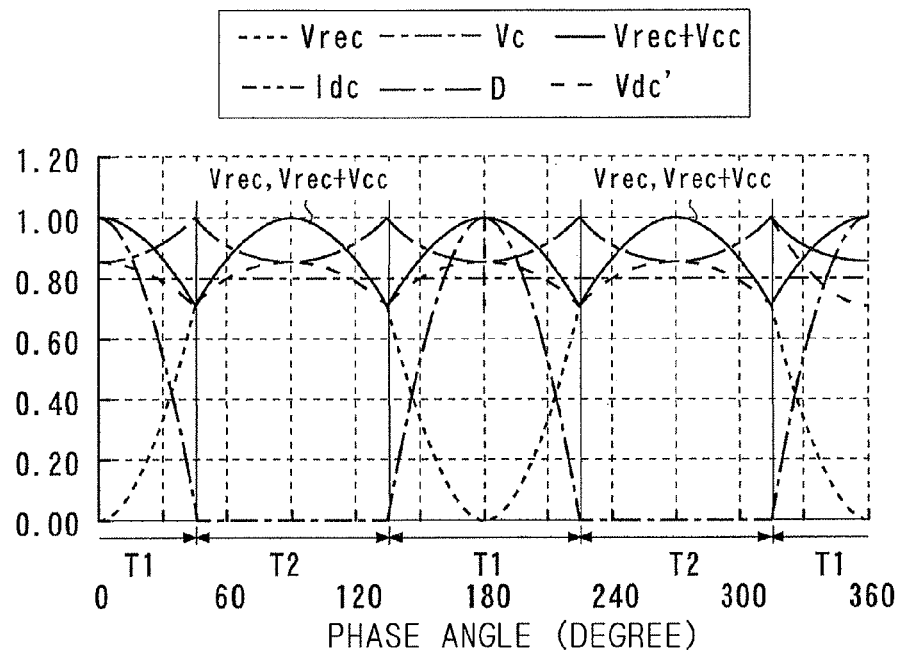
F I G. 1 4
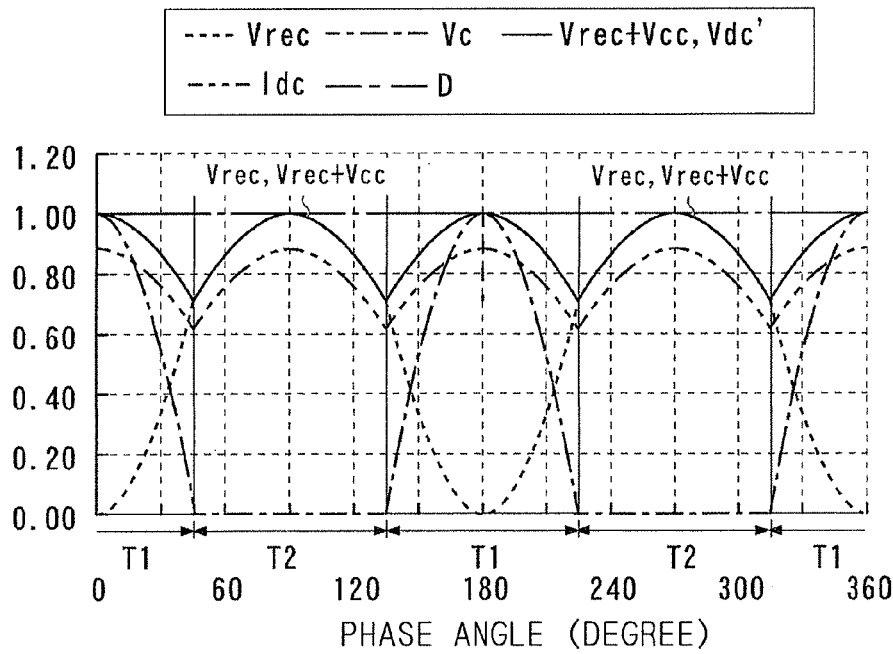

F I G. 1 5
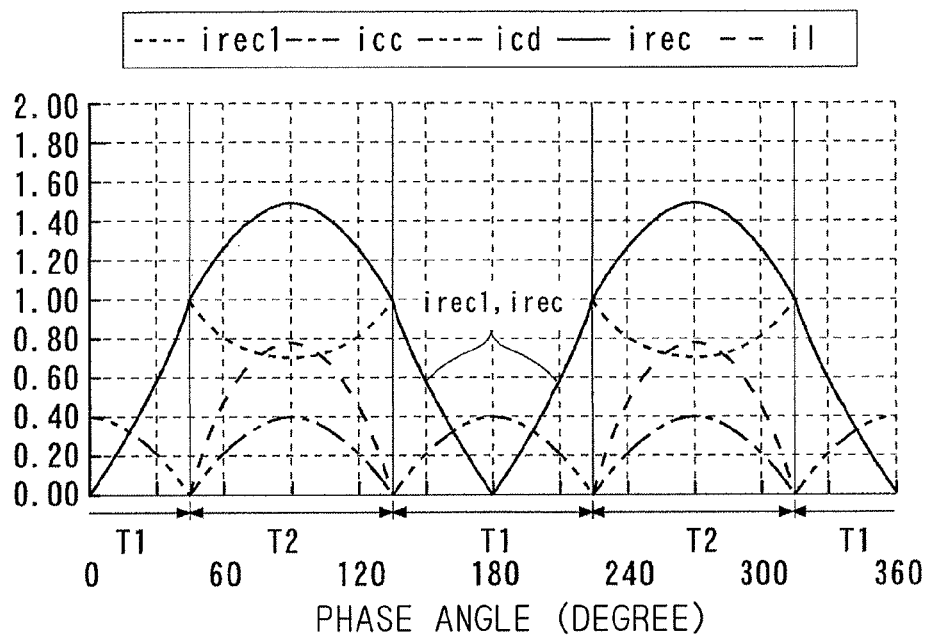
F I G. 1 6
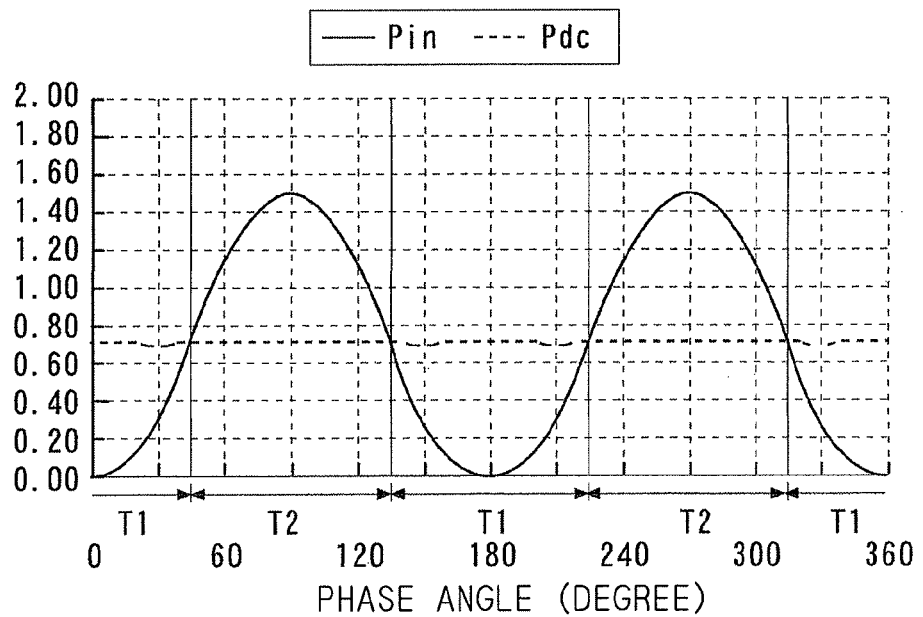

F I G. 2 1
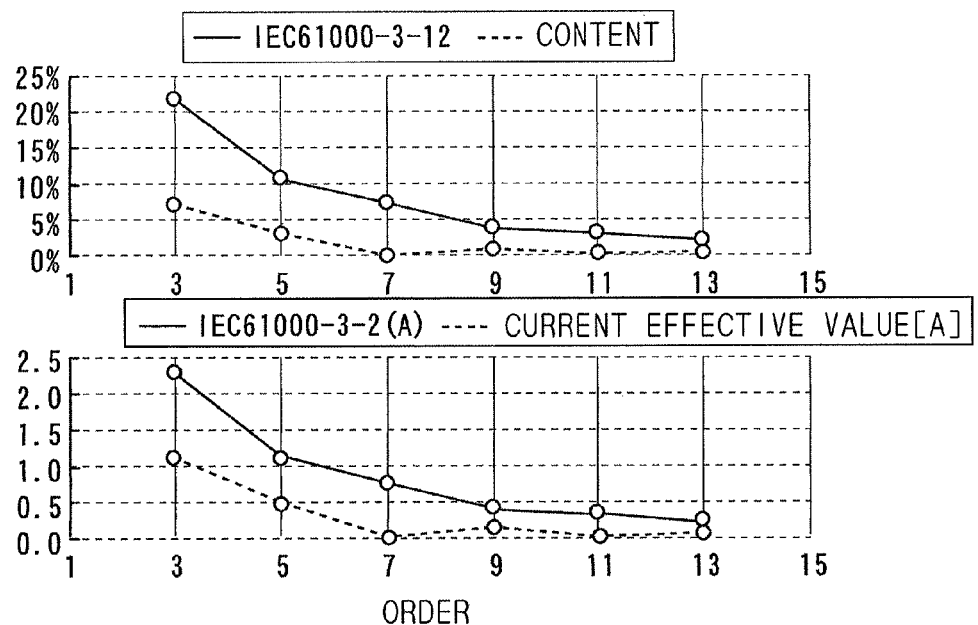
F I G. 2 2
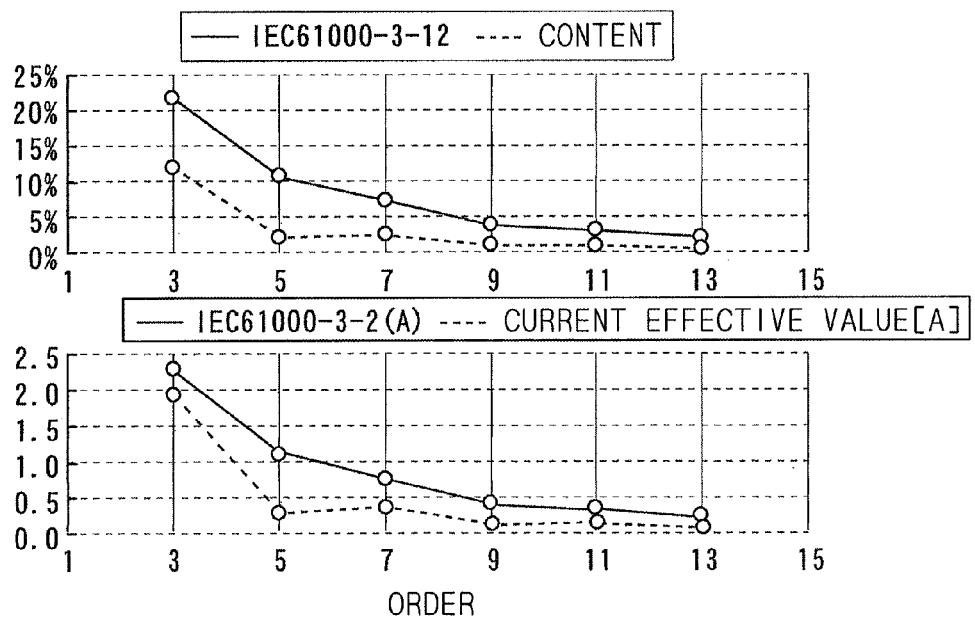

F I G . 2 3
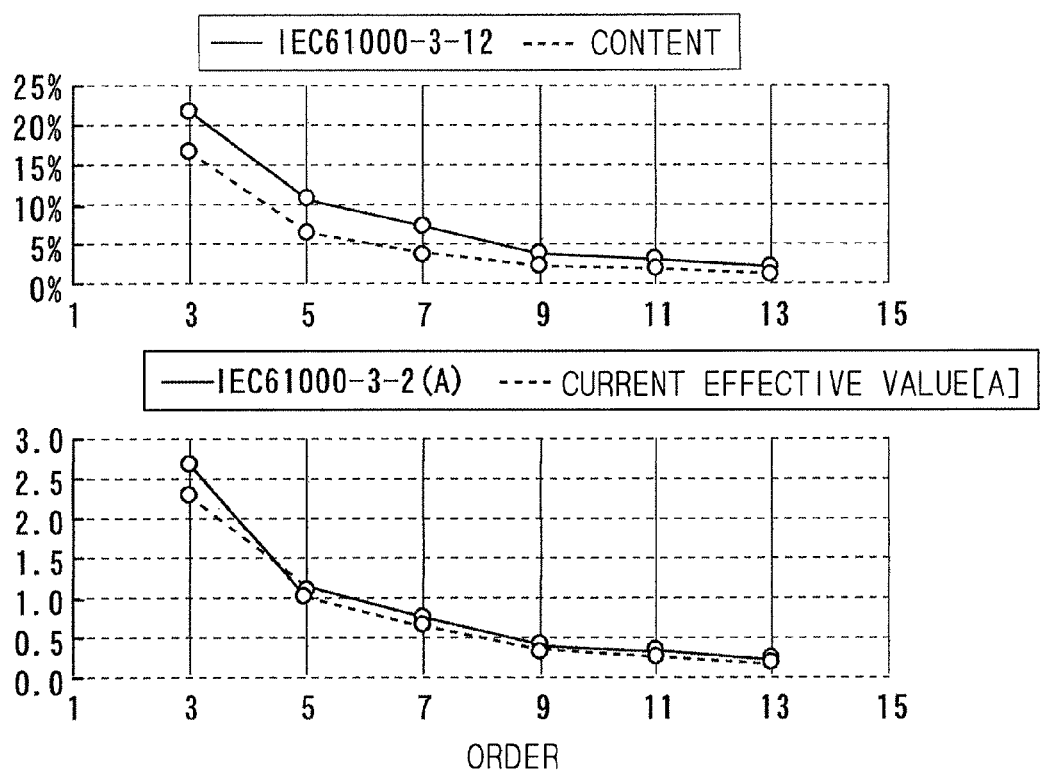

F I G. 2 7
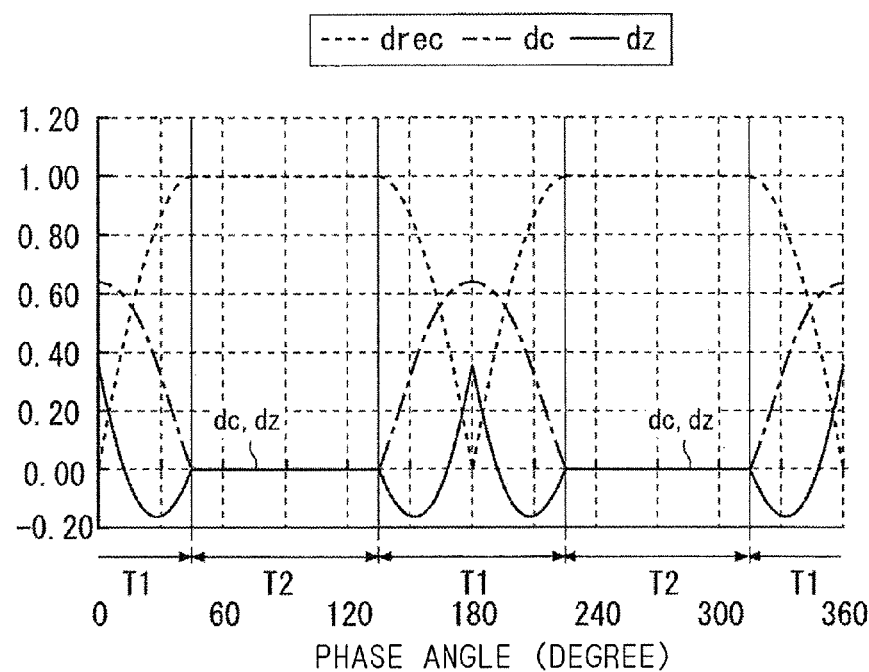
F I G. 2 8
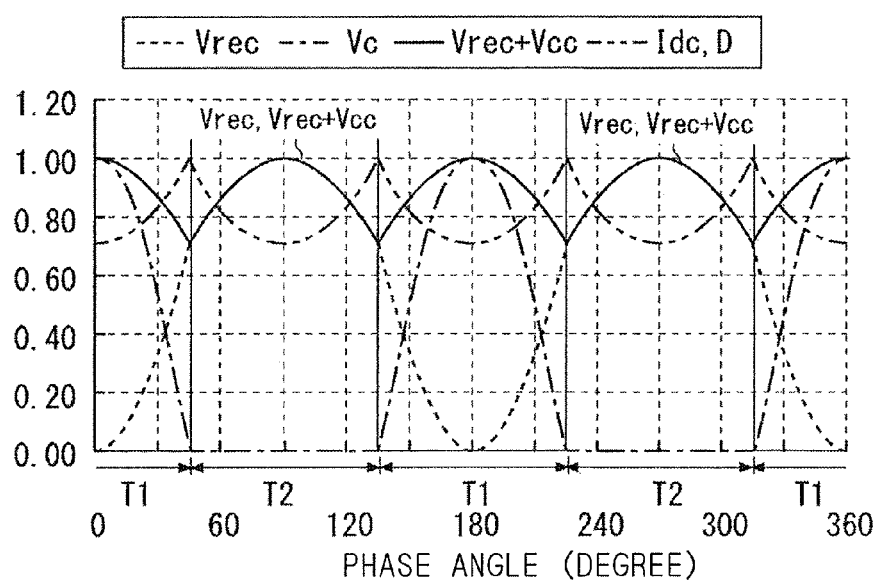

F I G. 2 9
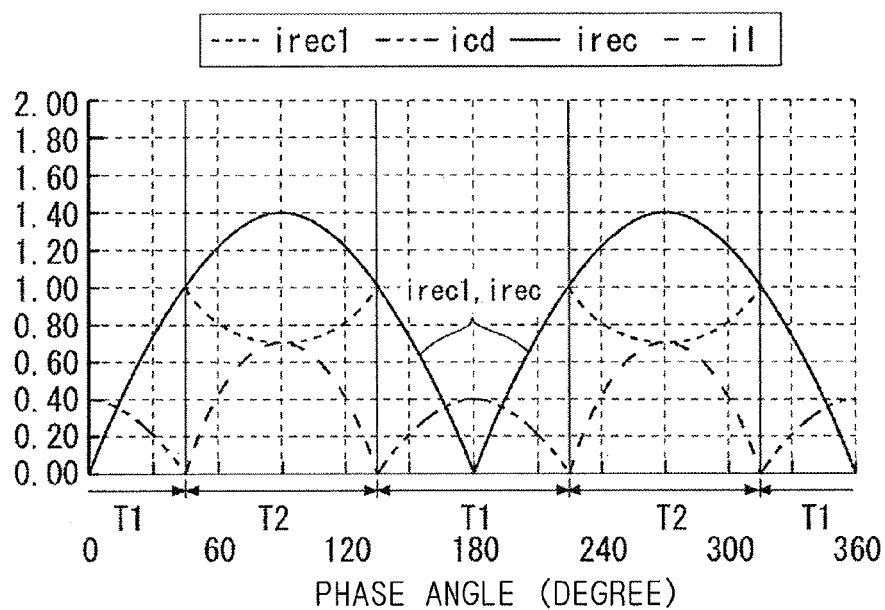
F I G. 3 0
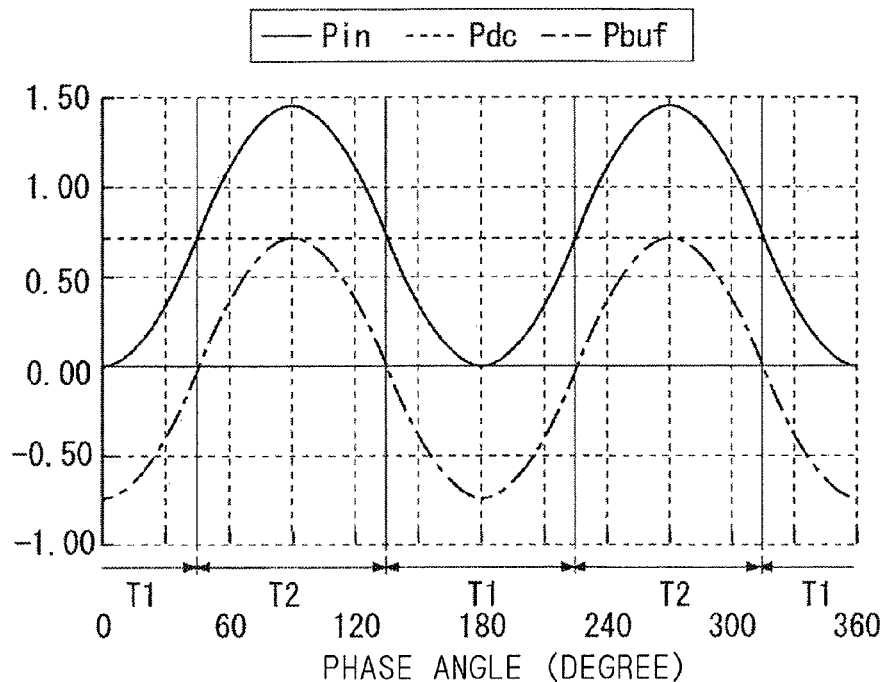

F I G . 3 1
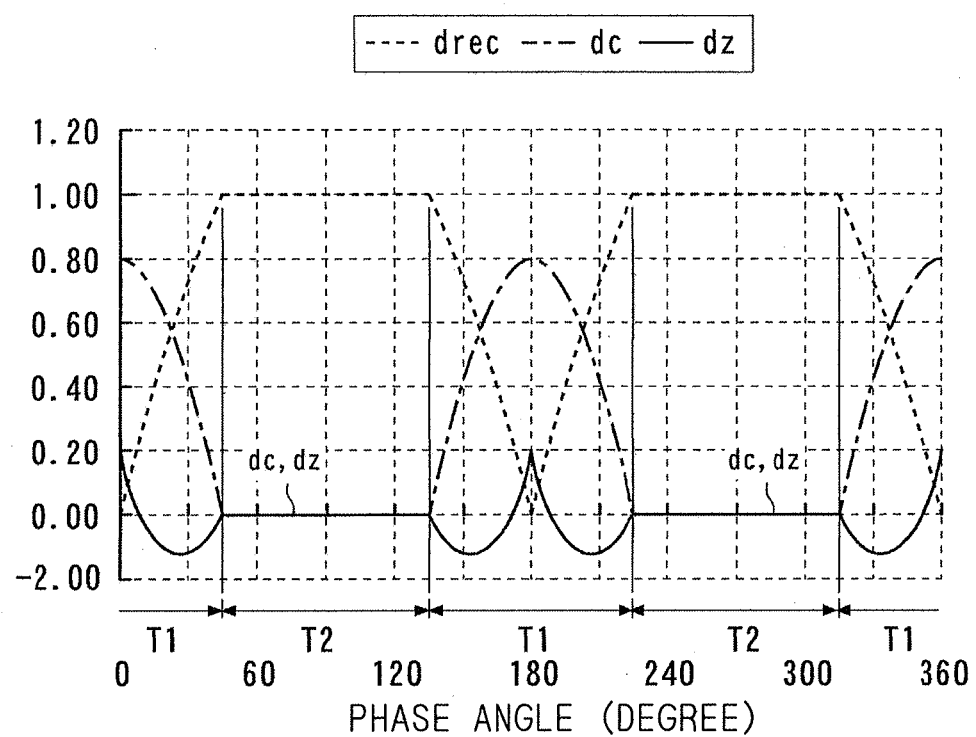

F I G. 4 2
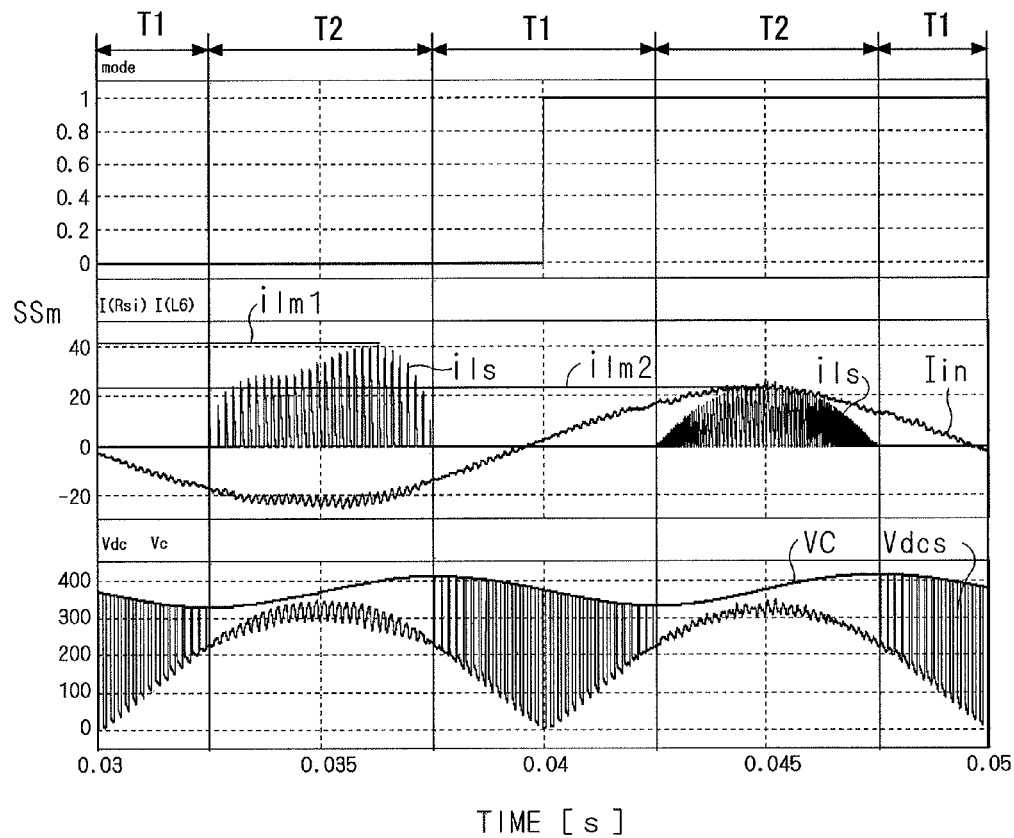
F I G. 4 3
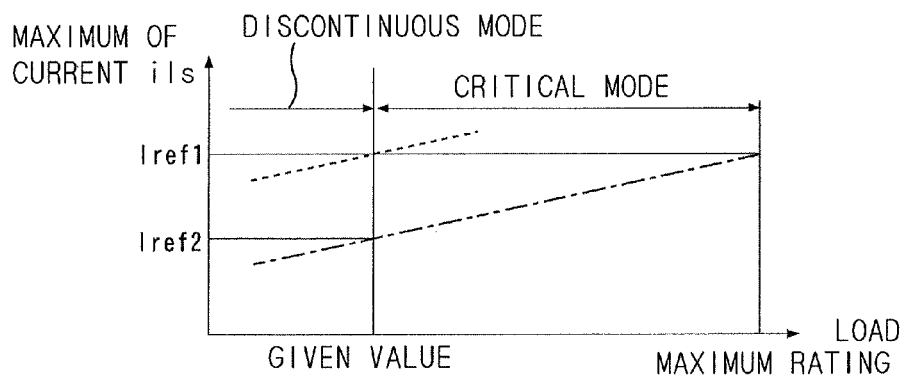

METHOD OF CONTROLLING DIRECT POWER CONVERTER

TECHNICAL FIELD

The present disclosure relates to a method of controlling a direct power converter.

BACKGROUND ART

Japanese Patent Application Laid-Open No. 2011-193678 describes a direct power converter. The direct power converter includes a diode rectifier, an inverter, and a charge-discharge circuit. The diode rectifier full-wave rectifies a single-phase AC voltage and outputs the resultant voltage to a DC link. The diode rectifier full-wave rectifies the single-phase AC voltage and outputs the resultant voltage to a pair of DC power lines (DC link). The charge-discharge circuit is provided in the DC link and includes a buffer circuit and a booster circuit. The buffer circuit has a switch and a capacitor connected in series between the pair of the DC power lines. The switch is located on a positive side of the DC link relative to the capacitor. Making the switch conducting discharges the capacitor to feed power to the DC link. The booster circuit raises the rectified voltage from the diode rectifier to charge the capacitor. In this way, the charge-discharge circuit receives the power from the DC link. The DC voltage is input from the DC link to the inverter. The inverter converts the input DC voltage to an AC voltage and outputs the resultant voltage.

Japanese Patent No. 4135026, Japanese Patent No. 4718041, Japanese Patent No. 3070598, "Capacitance Reduction and Basic Investigation method of A Novel Single-Phase to Three-Phase Power Converter," written by Yoshiya OHNUMA and Jun-ichi ITOH, Papers of Technical Meeting on Semiconductor Power Converter, IEE-Japan, SPC-08-162 (2008), "Circuit Configuration and Control Strategy of Single-Phase to Three-Phase Power Converter using Active Buffer with Charge Circuit," written by Yoshiya OHNUMA and Jun-ichi ITOH, IEE-Japan 2010 National Convention, 4-057 (2010) and "Experimental Verification of Single-Phase to Three-Phase Power Converter Using Active Buffer with Charge Circuit," written by Yoshiya OHNUMA and Jun-ichi ITOH, IEE-Japan 2010 Industry Applications Society Conference, 1-124 (2010) disclose techniques relating to the present disclosure.

SUMMARY

Problems to be Solved

As described in detail later, according to Japanese Patent Application Laid-Open No. 2011-193678, a ratio of a DC voltage to an amplitude of a voltage input to the diode rectifier (input amplitude modulation factor) is $1/\sqrt{2}$ at a maximum.

It is an object of the present disclosure to provide a method of controlling a direct power converter contributing to increase in an input amplitude modulation factor.

Means of Solving Problems

According to a first aspect of a method of controlling a direct power converter of the present disclosure, the direct power converter includes: a first power line (LH); a second power line (LL), a potential applied to the second power line being lower than a potential applied to the first power line; a diode rectifier (3) that performs single-phase full-wave rectification, the diode rectifier having an input side connected to a single-phase AC power source (1, 2) and an output side connected to the first and second power lines; a charge-discharge circuit (4) provided between the first and second power lines; and an inverter (5) that converts a DC voltage (Vdc) between the first and second power lines to an AC voltage. The charge-discharge circuit includes: a buffer circuit (4a) including a capacitor (C4) and a first switch (Sc, D42) connected in series to the capacitor between the first and second power lines on the side of the first power line relative to the capacitor, the buffer circuit transferring power between the first and second power lines; and a booster circuit (4b) that boosts a rectified voltage from the diode rectifier (3) to charge the capacitor. According to this method, power is fed from the buffer circuit (4a) to the first and second power lines in a first period (T1) when a cosine value ($\cos(2\omega t)$) of a value ($2\omega t$) twice a phase angle ($\omega t$) is positive. The phase angle ($\omega t$) is determined when an AC waveform output from the single-phase AC power source (1, 2) is regarded as a sine value of the phase angle ($\omega t$). Power from the first and second power lines is received by the buffer circuit (4a) in a second period (T2) when the cosine value is negative. A discharge duty (dc) for making the first switch (Sc, D42) conducting is set to be higher than a first value ($V_m \cdot \cos(2\omega t)/(\sqrt{2} \cdot v_c)$) in the first period and/or a rectifying duty (drec) for making the diode rectifier conducting is set to be higher than a second value ($1/\sqrt{2}|\sin(\omega t)|$) in the second period. The first value is determined by dividing the product of an amplitude (Vm) of an AC voltage of the single-phase AC power source and the cosine value by the product of an across voltage (vc) of the capacitor and $\sqrt{2}$. The second value is the reciprocal of the product of the absolute value of the sine value and $\sqrt{2}$.

According to a second aspect of the method of controlling the direct power converter of the present disclosure, in the method of controlling the direct power converter according to the first aspect, the rectifying duty (drec) in the second period (T2) is set to be higher than the second value. The discharge duty (dc) in the first period (T1) is set at a value determined by multiplying the first value by a factor (>1) such that a maximum of ripple of a virtual DC link voltage caused by the rectifying duty becomes the same as a maximum of ripple of the virtual DC link voltage caused by the discharge duty. The virtual DC link voltage is expressed as the sum of the product (dc·vc) of the discharge duty (dc) and the across voltage (vc) and the product (drec·Vrec) of the rectifying duty (drec) and a rectified voltage (Vrec) of the AC voltage.

According to a third aspect of the method of controlling the direct power converter of the present disclosure, in the method of controlling the direct power converter according to the first or second aspect, the rectifying duty (drec) in the second period (T2) is 1.

According to a fourth aspect of the method of controlling the direct power converter of the present disclosure, in the method of controlling the direct power converter according to the third aspect, the discharge duty (dc) in the first period (T1) is a value determined by multiplying the first value by $\sqrt{2}$ as a factor.

According to a fifth aspect of the method of controlling the direct power converter of the present disclosure, in the method of controlling the direct power converter according to any one of the second to fourth aspects, the booster circuit (4b) includes: a diode (D40) having a cathode and an anode connected between the first switch (Sc, D42) and the capacitor (C4); a reactor (L4) connected between the first power line (LH) and the cathode; and a second switch (Sl, D41) connected between the second power line (LL) and the cathode. The second switch of the booster circuit is controlled such that in the second period (T2), a current (il) flowing through the reactor (L4) becomes a value determined by multiplying a value ($|\sin(\omega t)|-1/(2|\sin(\omega t)|)$) by a third value (Im), the factor, and a ratio of an average of a DC current input to the inverter to a fourth value (Idc"). The value ($|\sin(\omega t)|-1/(2|\sin(\omega t)|)$) is determined by subtracting a half of the reciprocal of the absolute value of the sine value from the absolute value of the sine value. The third value is determined by multiplying a value of an input current input to the diode rectifier (3) by $\sqrt{2}$ at a boundary between the first and second periods. The fourth value is determined by multiplying the third value by $1/\sqrt{2}$.

According to a sixth aspect of the method of controlling the direct power converter of the present disclosure, in the method of controlling the direct power converter according to any one of the second to fifth aspects, an amplitude modulation factor (D) is reduced as the virtual DC link voltage increases as a result of ripple. The amplitude modulation factor is a ratio of an amplitude (Vm') of an output of the inverter (5) to the virtual DC link voltage. The inverter is controlled based on the amplitude modulation factor.

According to a seventh aspect of the method of controlling the direct power converter of the present disclosure, in the method of controlling the direct power converter according to any one of the first to sixth aspects, a switching signal with a pulse width modulated in a period (tc) determined by multiplying a cycle (ts) of a carrier and the discharge duty to make the first switch conducting is applied to the inverter. When a zero duty (dz) expressed as a value determined by subtracting the sum of the rectifying duty (drec) and the discharge duty (dc) from 1 is higher than zero, a switching signal with a pulse width modulated in a period (ts·drec) determined by multiplying a cycle of the carrier and the rectifying duty is applied to the inverter and the inverter is made to adopt a zero-voltage vector in a period (tz) determined by multiplying the cycle of the carrier and the zero duty. When the zero duty is lower than zero, a switching signal with a pulse width modulated in a period (ts·(drec+dz)) determined by multiplying the cycle of the carrier by the sum of the rectifying and zero duties (drec+dz) is applied to the inverter.

According to an eighth aspect of the method of controlling the direct power converter of the present disclosure, in the method of controlling the direct power converter according to any one of the first to seventh aspects, the booster circuit (4b) includes: a diode (D40) having a cathode and an anode connected between the first switch (Sc, D42) and the capacitor (C4); a reactor (L4) connected between the first power line (LH) and the cathode; and a second switch (Sl, D41) connected between the second power line (LL) and the cathode. In the first period (T1), the second switch is turned on and off repeatedly in a critical mode or a discontinuous mode. The critical mode is a mode in which the second switch is turned on at a time when a reactor current (ils) flowing through the reactor becomes zero and the discontinuous mode is a mode in which the second switch is turned on after the reactor current becomes zero. The critical mode is adopted when a load of the inverter is higher than a given value and the discontinuous mode is adopted when the load is lower than the given value.

According to a ninth aspect of the method of controlling the direct power converter of the present disclosure, in the method of controlling the direct power converter according to the eighth aspect, when a maximum (ilm) of the reactor current (ils) in the discontinuous mode exceeds a current reference value (Iref), the load is determined to be higher than the given value and the critical mode is adopted. The current reference value is smaller than a maximum of the reactor current when the critical mode is adopted in a state that the load is at a maximum rating.

According to a tenth aspect of the method of controlling the direct power converter of the present disclosure, in the method of controlling the direct power converter according to the eighth or ninth aspect, when a maximum (ilm) of the reactor current (ils) in the critical mode is smaller than a second current reference value (Iref2), the load is determined to be lower than the given value and the discontinuous mode is adopted. The second current reference value is the same as or smaller than a maximum of the reactor current when the critical mode is adopted in a state that the load takes the given value.

According to an eleventh aspect of the method of controlling the direct power converter of the present disclosure, in the method of controlling the direct power converter according to any one of the eighth to tenth aspects, a switching frequency of the second switch (Sl, D41) in the discontinuous mode is the same as a minimum of the switching frequency in the critical mode.

According to a twelfth aspect of the method of controlling the direct power converter of the present disclosure, in the method of controlling the direct power converter according to any one of the eighth to tenth aspects, a switching frequency of the second switch (Sl, D41) in the discontinuous mode is higher than a minimum of the switching frequency in the critical mode.

According to a thirteenth aspect of the method of controlling the direct power converter of the present disclosure, in the method of controlling the direct power converter according to any one of the eighth to tenth aspects, a switching frequency of the second switch (Sl, D41) in the discontinuous mode is lower than a minimum of the switching frequency in the critical mode.

According to a fourteenth aspect of the method of controlling the direct power converter of the present disclosure, in the method of controlling the direct power converter according to any one of the eighth to thirteenth aspects, the first switch is made to keep non-conducting in the first period (T1) and the critical and discontinuous modes are switched in the second period (T2).

Advantageous Effects

According to the first aspect of the method of controlling the direct power converter of the present disclosure, the discharge duty for discharging the capacitor is increased in the first period and/or the rectifying duty is increased in the second period, thereby allowing increase in the DC voltage. This allows the inverter to output a voltage higher than a conventional voltage, thereby contributing to increase in an input amplitude modulation factor.

Additionally, the DC voltage can be increased more easily by increasing the discharge duty in the first period when the absolute value of a single-phase AC voltage is small than by increasing the rectifying duty in the first period.

According to the second aspect of the method of controlling the direct power converter of the present disclosure, the DC voltage is allowed to ripple to the substantially same degree in the first and second periods. This contributes to reduction in distortion of an input current of the diode rectifier.

According to the third aspect of the method of controlling the direct power converter of the present disclosure, the DC voltage can become highest in the second period.

According to the fourth aspect of the method of controlling the direct power converter of the present disclosure, a maximum of ripple of the DC voltage in the second period can theoretically be the same as a maximum of ripple of the DC voltage in the first period. This allows the DC voltage to ripple to the substantially same degree in the first and second periods.

According to the fifth aspect of the method of controlling the direct power converter of the present disclosure, a discharge current of the capacitor in the first period can theoretically be the same as the discharge current of the capacitor in the second period. This can prevent the voltage of the capacitor from increasing or reducing continuously on a long-term basis.

The sixth aspect of the method of controlling the direct power converter of the present disclosure can suppress a degree of ripple of the DC voltage to be transmitted to an amplitude of an output voltage of the inverter.

The seventh aspect of the method of controlling the direct power converter of the present disclosure can suppress distortion of an input current to be caused by the zero duty being lower than zero.

According to the eighth aspect of the method of controlling the direct power converter of the present disclosure, with the same average of the reactor current in a switching cycle, a maximum of the reactor current in the discontinuous mode is smaller than that of the reactor current in the critical mode. According to the eighth aspect of method of controlling the direct power converter, the critical mode is adopted when a load is high. This can reduce the maximum of the reactor current, compared to adoption of the discontinuous mode under a high load. Thus, a reactor of a small current capacity can be adopted, thereby contributing to size reduction and cost reduction of the direct power converter.

According to the ninth aspect of the method of controlling the direct power converter of the present disclosure, a mode can be switched from the discontinuous mode to the critical mode based on a maximum of the reactor current. This allows the maximum of the reactor current not to exceed the given reference value (maximum under a maximum load and in the critical mode) more properly.

According to the tenth aspect of the method of controlling the direct power converter of the present disclosure, a mode can be switched from the critical mode to the discontinuous mode when a maximum of the reactor current is set more appropriately so as not to exceed the given reference value (maximum under the maximum load and in the critical mode).

According to the eleventh aspect of the method of controlling the direct power converter of the present disclosure, with the same average of the reactor current in the switching cycle, a maximum of the reactor current in the discontinuous mode is smaller than that of the reactor current in the critical mode. According to the eleventh aspect of method of controlling the direct power converter, the critical mode is adopted when a load is high. This can reduce the maximum of the reactor current, compared to adoption of the discontinuous mode under a high load. Thus, a reactor of a small current capacity can be adopted, thereby contributing to size reduction and cost reduction of the direct power converter.

The twelfth aspect of the method of controlling the direct power converter of the present disclosure narrows an operating range in the critical mode. Thus, the discontinuous mode can also be adopted under a middle load and a light load, thereby contributing to enhanced efficiency under the middle and light loads.

The thirteenth aspect of the method of controlling the direct power converter of the present disclosure extends an operating range in the critical mode. A switching frequency is dispersed in the critical mode, so that a specific switching frequency to become a cause for noise of the reactor can be reduced.

According to the fourteenth aspect of the method of controlling the direct power converter of the present disclosure, a mode is switched when the first switch keeps non-conducting. This can suppress fluctuation of the reactor current to occur in response to mode switching, for example.

These and other objects, features, aspects, and advantages of the present disclosure will become more apparent from the following detailed description of the present disclosure and the accompanying drawings.

BRIEF DESCRIPTION OF DRAWINGS

FIG. 4 is a voltage vector;

FIG. 5 is a timing diagram explaining operation of the direct power converter in a feeding period;

FIG. 6 is a timing diagram explaining operation of the direct power converter in a receiving period;

FIG. 7 is a graph illustrating a duty in the direct power converter;

FIG. 8 is a graph illustrating an average voltage in the direct power converter;

FIG. 9 is a graph illustrating a duty in the direct power converter;

FIG. 10 is a graph illustrating an average voltage in the direct power converter;

FIG. 11 is a graph illustrating a duty in the direct power converter;

FIG. 12 is a graph illustrating an average voltage, an output amplitude modulation factor, a DC current, and an equivalent DC voltage in the direct power converter;

FIG. 13 is a graph illustrating an average voltage, an output amplitude modulation factor, a DC current, and an equivalent DC voltage in the direct power converter;

FIG. 14 is a graph illustrating an average voltage, an output amplitude modulation factor, a DC current, and an equivalent DC voltage in the direct power converter;

FIG. 15 is a graph illustrating a current in the direct power converter;

FIG. 16 is a graph illustrating a current in the direct power converter;

FIG. 21 is a graph illustrating a harmonic component of an input current in the direct power converter;

FIG. 22 is a graph illustrating a harmonic component of an input current in the direct power converter;

FIG. 23 is a graph illustrating a harmonic component of an input current in the direct power converter;

FIG. 27 is a graph illustrating a duty in the direct power converter;

FIG. 28 is a graph illustrating an average voltage, an output amplitude modulation factor, a DC current, and an equivalent DC voltage in the direct power converter;

FIG. 29 is a graph illustrating a current in the direct power converter;

FIG. 30 is a graph illustrating power in the direct power converter;

FIG. 31 is a graph illustrating a duty in the direct power converter;

FIG. 42 is a graph illustrating quantities in the direct power converter;

FIG. 43 is an explanation of switching between the critical and discontinuous modes.

DESCRIPTION OF EMBODIMENT(S)

A. Structure of Direct Power Converter

Figure 1:
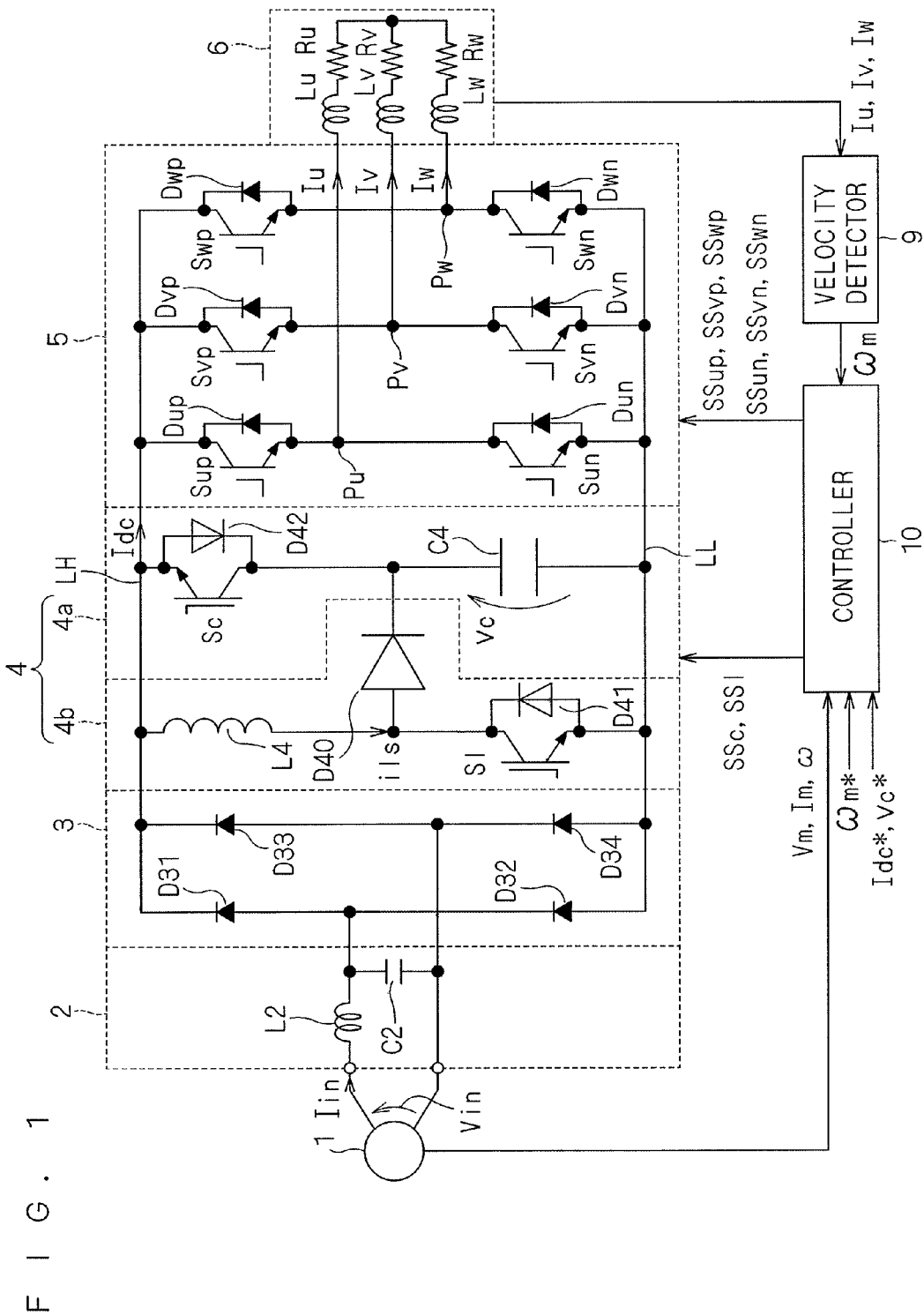
FIG. 1 is a block diagram showing an exemplary conceptual structure of a direct power converter.

As shown in FIG. 1, a direct power converter includes a diode rectifier 3, a charge-discharge circuit 4, and an inverter 5.

The diode rectifier 3 is connected for example through a filter 2 to a single-phase AC power source 1. The filter 2 includes a reactor L2 and a capacitor C2. The reactor L2 is provided between one of two output terminals of the single-phase AC power source 1 and the diode rectifier 3. The capacitor C2 is provided between the two output terminals of the single-phase AC power source 1. The filter 2 removes a high-frequency component of a current. The filter 2 may be omitted. For the sake of simplicity, the function of the filter 2 is disregarded in the following description.

The diode rectifier 3 includes a diode D31, a diode D32, a diode D33, and a diode D34. The diodes D31 to D34 form a bridge circuit that single-phase full-wave rectifies a single-phase AC voltage Vin as an input voltage from the singe-phase AC power source 1 to convert the single-phase AC voltage Vin to a rectified voltage and output the rectified voltage to between a DC power line LH and a DC power line LL. The DC power line LH receives a potential higher than a potential applied to the DC power line LL. An input current Iin flows from the single-phase AC power source 1 into the diode rectifier 3.

The charge-discharge circuit 4 includes a buffer circuit 4a and a booster circuit 4b. Power is transferred between the DC power lines LH and LL and the buffer circuit 4a which includes a capacitor C4. The booster circuit 4b raises the rectified voltage to charge the capacitor C4.

The buffer circuit 4a further includes a diode D42 and a transistor (here, an insulated gate bipolar transistor: hereinafter abbreviated as an "IGBT") Sc connected in antiparallel to the diode D42. The transistor Sc is connected in series to the capacitor C4 between the DC power lines LH and LL on the side of the DC power line LH relative to the capacitor C4. The antiparallel connection mentioned herein means parallel connection in which forward directions are opposite to each other. More specifically, the forward direction of the transistor Sc is a direction from the DC power line LL to the DC power line LH. The forward direction of the diode D42 is a direction from the DC power line LH to the DC power line LL. The transistor SC and the diode D42 can collectively be understood as one switch element (first switch).

The booster circuit 4b includes a diode D40, a reactor L4, and a transistor (here, an IGBT) Sl, for example. The diode D40 has a cathode and an anode. The cathode is connected between the first switch and the capacitor C4. This structure is known as what is called a booster chopper.

The reactor L4 is connected between the DC power line LH and the anode of the diode D40. The transistor S1 is connected between the DC power line LL and the anode of the diode D40. The transistor S1 is connected in antiparallel to a diode D41. The transistor S1 and the diode D41 can collectively be understood as one switch element (second switch).

The capacitor C4 is charged by the booster circuit 4b to generate an across voltage vc higher than the rectified voltage. More specifically, a current is caused to flow from the DC power line LH through the second switch to the DC power line LL to accumulate energy in the reactor L4. Then, the second switch is turned off, so that this energy is transferred through the diode D40 to be accumulated in the capacitor C4.

The across voltage vc is higher than the rectified voltage, so that a current basically does not flow into the diode D42. Thus, whether the first switch is conducting or non-conducting depends solely on whether the transistor Sc is conducting or non-conducting. For this reason, in the below, not only the transistor Sc but also the first switch including the transistor Sc and the diode D42 may also be called a switch Sc.

The DC power line LH is higher in potential than the DC power line LL, so that a current basically does not flow into the diode D41. Thus, whether the second switch is conducting or non-conducting depends solely on whether the transistor S1 is conducting or non-conducting. For this reason, in the below, not only the transistor S1 but also the second switch including the transistor S1 and the diode D41 may also be called a switch S1.

The inverter 5 converts a DC voltage between the DC power lines LH and LL to an AC voltage and outputs the AC voltage to an output terminal Pu, an output terminal Pv, and an output terminal Pw. The inverter 5 includes six switching elements Sup, Svp, Swp, Sun, Svn, and Swn. The switching elements Sup, Svp, and Swp are connected between the output terminals Pu, Pv, and Pw respectively and the DC power line LH. The switching elements Sun, Svn, and Swn are connected between the output terminals Pu, Pv, and Pw respectively and the DC power line LL. The inverter 5 forms what is called a voltage source inverter and includes six diodes Dup, Dvp, Dwp, Dun, Dvn, and Dwn.

Each of the diodes Dup, Dvp, Dwp, Dun, Dvn, and Dwn is arranged such that its cathode is pointed toward the DC power line LH and its anode is pointed toward the DC power line LL. The diode Dup is connected in parallel to the switching element Sup between the output terminal Pu and the DC power line LH. Likewise, the diodes Dvp, Dwp, Dun, Dvn, and Dwn are connected in parallel to the switching elements Svp, Swp, Sun, Svn, and Swn respectively.

IGBTs are used as the switching elements Sup, Svp, Swp, Sun, Svn, and Swn, for example.

An inductive load 6 is a rotary machine, for example. The inductive load 6 is illustrated in an equivalent circuit corresponding to an inductive load. More specifically, a reactor Lu and a resistor Ru are connected in series. One end of this series connection is connected to the output terminal Pu. This applies to a reactor Lv and a resistor Rv and to a reactor Lw and a resistor Rw. The respective opposite ends of these series connections are connected to each other.

B. Method of Controlling Direct Power Converter According to Japanese Patent Application Laid-Open No. 2011-193678

A conventional control method is described first. An input amplitude modulation factor determined by the conventional control is descried next. Then, a control method of this embodiment is described.

(b-1) Basic Way of Thinking Power Ripple Reduction

In the direct power converter of FIG. 1, the diode rectifier 3 performs full-wave rectification. Thus, if the inverter 5 and the inductive load 6 consumes constant power (as applied to many inductive loads, if the inductive load 6 is a three-phase symmetric load, for example), power to be supplied to the DC power lines LH and LL will have a frequency twice the frequency of a single-phase AC voltage to ripple if no attention is given to the charge-discharge circuit 4. This ripple is reduced by the charge-discharge circuit 4. More specifically, power is transferred between the buffer circuit 4a and the DC power lines LH and LL whereby the power ripple is reduced. In the below, instantaneous power transferred by the buffer circuit 4a is called instantaneously transferred power.

Instantaneous power Pin input to the diode rectifier 3 is expressed by the following formula with an input power factor 1. An amplitude Vm and a power angular velocity ω of the single-phase AC voltage Vin, an amplitude Im of the input current Iin, and time t are introduced. The product ωt of the power angular velocity ω and the time t expresses the phase angle of the single-phase AC voltage Vin. An AC waveform is regarded as a sine value of the phase angle ωt of this AC waveform.

$$Pin = Vm \cdot Im \cdot \sin^2(\omega t) \qquad (1)$$
$$= \frac{1}{2} Vm \cdot Im - \frac{1}{2} Vm \cdot Im \cdot \cos(2\omega t)$$

The second term of the right side of formula (1) shows power ripple. This power ripple should be cancelled out by transferring instantaneously power Pbuf that has the same value as and a different polarity to the second term between the buffer circuit 4a and the DC power lines LH and LL. The instantaneously transferred power Pbuf is expressed by the following formula:

$$Pbuf = \frac{1}{2} Vm \cdot Im \cdot \cos(2\omega t) \qquad (2)$$

Specifically, the instantaneously transferred power Pbuf is expressed as the product of a DC component (Vm·Im/2) of instantaneous power input from the single-phase AC power source 1 (or through the filter 2: this trues for the description given below) and a cosine value cos(2ωt) of a value (2ωt) twice the phase angle ωt.

It is seen from formula (2) that the instantaneously transferred power Pbuf can take a positive or negative value. More specifically, the instantaneously transferred power Pbuf takes a positive value in a period when the phase angle ωt of a single-phase AC voltage is from 0 to π/4, from 3π/4 to 5π/4, or from 7π/4 to 2π (this period is hereinafter called a "feeding period"). The instantaneously transferred power Pbuf takes a negative value in the other period (this period is hereinafter called a "receiving period"). Specifically, the buffer circuit 4a feeds the absolute value of the instantaneously transferred power Pbuf to the DC power lines LH and LL in the feeding period. The buffer circuit 4a receives the absolute value of the instantaneously transferred power Pbuf from the DC power lines LH and LL in the receiving period. As a result, the power ripple is cancelled out.

The single-phase AC voltage Vin is expressed as Vm·sin(ωt). Thus, the aforementioned range can be equivalent to the understanding that the charge-discharge circuit 4 outputs positive power when the absolute value of the single-phase AC voltage Vin is smaller than a value determined by multiplying its amplitude Vm by $1/\sqrt{2}$, while the charge-discharge circuit 4 outputs negative power when this absolute value is larger than the value determined by multiplying the amplitude Vm by $1/\sqrt{2}$.

Specific operation in the feeding and receiving periods is described in detail below. Before this description, formulation necessary for consideration is given.

Figure 2:
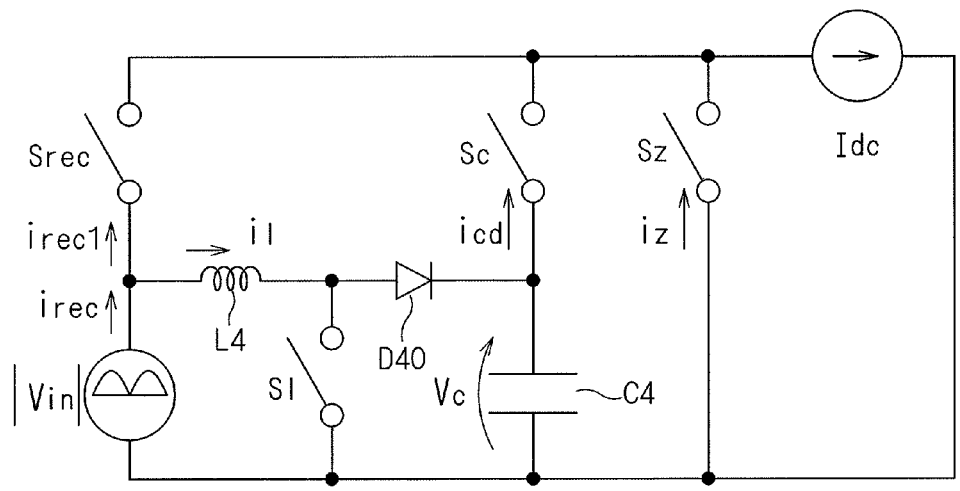
FIG. 2 is a circuit diagram of an equivalent circuit of the direct power converter shown in FIG. 1.

Japanese Patent Application Laid-Open No. 2011-193678 introduces FIG. 2 corresponding to an equivalent circuit of the circuit shown in FIG. 1. In the equivalent circuit of FIG. 2, a current irec1 from the diode rectifier 3 to the inverter 5 is shown equivalently as a current irec1 flowing through a switch Srec. Likewise, a discharge current icd flowing from the capacitor C4 to the inverter 5 is shown equivalently as a discharge current icd flowing through the switch Sc. A current flowing into the inductive load 6 through the inverter 5 when the output terminals Pu, Pv, and Pw are commonly connected to one of the DC power lines LH and LL in the inverter 5 is also shown equivalently as a current iz flowing through a switch Sz. A voltage vector including a zero-voltage vector is described in detail later. FIG. 2 shows the reactor L4, the diode D40, and the switch Sl forming the booster circuit 4b. FIG. 2 additionally shows a current il flowing through the reactor L4.

Regarding the equivalent circuit thereby formed, the following formula is established by introducing a duty drec, a duty dc, and a duty dz for making the switches Srec, Sc, and Sz conducting respectively and a DC current Idc input to the inverter 5:

$$\begin{bmatrix} irec \\ icd \\ iz \end{bmatrix} = \begin{bmatrix} drec & 1 \\ dc & 0 \\ dz & 0 \end{bmatrix} \cdot \begin{bmatrix} idc \\ il \end{bmatrix} \quad (3)$$

As seen from FIG. 2, a current irec flowing through the diode rectifier 3 is the same as the sum of the current irec1 for making the switch Srec conducting and the current il flowing through the reactor L4. Thus, as shown by formula (3), the current irec is expressed as the sum of drec·Idc and the current il.

The currents irec1, icd, and iz are determined by multiplying the DC current Idc by the duties drec, dc, and dz respectively, so that they correspond to averages in switching cycles of the switches Srec, Sc, and Sz respectively. Likewise, the current il is an average in a switching cycle of the switch Sl.

The DC current Idc is the total sum of the currents irec1, icd, and iz for making the switches Srec, Sc, and Sz conducting respectively. Then, the following formula is established:

$$drec + dc + dz = 1 \quad (4)$$

Thus, the duties drec, dc, and dz can be considered to be current distribution factors of the DC current Idc relative to the currents Irec1, icd, and iz respectively. In the below, the duties drec, dc, and dz may be called a rectifying duty drec, a discharge duty dc, and a zero duty dz respectively.

(b-2) Operation in Feeding Period

In the feeding period, the switch Sc is operated to cause the discharge current icd flowing from the capacitor C4, thereby transferring the instantaneously transferred power Pbuf from the buffer circuit 4a to the DC power lines LH and LL. Thus, the switch Sl is not made to conduct to make the current il zero. Specifically, the booster circuit 4b is not operated in the feeding period.

The current irec flowing through the diode rectifier 3 is required to satisfy the following formula in order to have a sine waveform:

$$irec = Im \cdot |\sin(\omega t)| \quad (5)$$

A relationship il=0 is established in formula (3), thereby establishing irec=drec·Idc. Thus, the rectifying duty drec is set by the following formula using formula (5):

$$drec = \frac{Im}{Idc} |\sin(\omega t)| \quad (6)$$

Power ripple can be reduced by making the product of the across voltage vc of the capacitor C4 and the discharge current icd (vc·icd) same as the instantaneously transferred power Pbuf (formula (2)). Thus, the discharge duty dc is set by the following formula using formulas (2) and (3). This achieves discharge of the capacitor C4 to cancel out the power ripple.

$$dc = \frac{Vm \cdot Im}{2vc \cdot Idc} \cdot \cos(2\omega t) \quad (7)$$

As understood from formula (4), the zero duty dz is determined by subtracting the rectifying and discharge duties drec and dc from 1.

The switch Srec is not actually prepared but it merely appears in the equivalent circuit. Whether the switch Srec is conducting or non-conducting depends on the operation of the switch Sc and that of the inverter 5. Such operation is described later together with the operation of the inverter 5.

(b-3) Operation in Receiving Period

In the receiving period, the buffer circuit 4a does not feed power to the DC power lines LH and LL. Thus, the switch Sc is not made to conduct to make the discharge duty dc zero.

The following formula is derived from formula (3):

$$irec = drec \cdot Idc + il \quad (8)$$

It is desirable that the product of the current irec1 (=drec·Idc) and a value |Vin| determined by full-wave rectifying the single-phase AC voltage Vin be made to be equal to the DC component (Vm·Im/2) of the instantaneous power Pin shown by formula (1). This is for the reason that transferring the instantaneously transferred power Pbuf can make power to be consumed in a latter stage of the diode rectifier 3 to become a constant value, DC component of the instantaneous power Pin. Thus, the following formula is derived:

$$|Vin| \cdot irec1 = \frac{Vm \cdot Im}{2} \quad (9)$$

The single-phase AC voltage Vin is expressed as Vm sin (ωt) and the current irec1 is expressed as drec·Idc. Thus, the rectifying duty drec is set by the following formula using formula (9):

$$drec = \frac{Im}{2Idc \cdot |\sin(\omega t)|} \quad (10)$$

The zero duty dz is set by subtracting the rectifying duty drec from 1 (formula (4)). Setting the zero duty dz in this way can set a period of a zero-voltage vector required to cancel out ripple of output power.

The current il flowing through the reactor L4 is described next. Like in the feeding period, the current irec flowing through the diode rectifier 3 is required to satisfy formula (5) in order to have a sine waveform. Thus, the current il is set by the following formula in consideration of formulas (8) and (10):

$$il = Im \cdot |\sin(\omega t)| - \frac{Im}{2 \cdot |\sin(\omega t)|} \quad (11)$$

Specifically, the current il is determined to make the input current Iin input to the diode rectifier 3 have a sine waveform in the receiving period. This can be achieved by controlling the booster circuit 4b such that the current il flowing through the reactor L4 satisfies formula (11). The booster circuit 4b may be controlled in any of what is called a continuous mode, a discontinuous mode, and a critical mode. In the example mentioned here, the discontinuous mode is adopted. The current il is an average in a switching cycle of the switch Sl. In the below, an instantaneous value of the current il is called a current ils for discrimination from the average.

Figure 3:
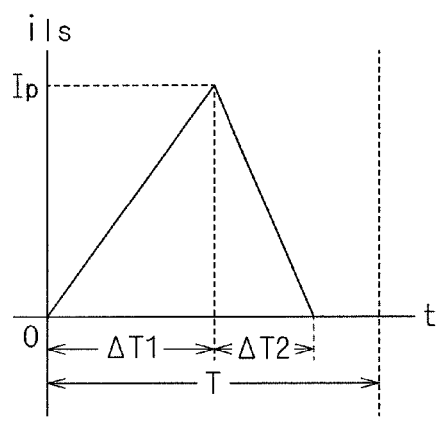
FIG. 3 is a conceptual view showing the waveform of a current flowing through a reactor.

FIG. 3 is a conceptual view of the waveform of the current ils in the discontinuous mode. A switching cycle of the switch Sl is identified by T and a conducting period of the switch Sl is identified by ΔT1. Then, a boosting duty dl for making the switch Sl conducting is expressed as ΔT1/T. As shown in FIG. 3, a period when the current ils flows through the reactor L4 after the switch Sl is turned off is identified by ΔT2. The current ils flows discontinuously in the example of FIG. 3, so that the sum of the periods ΔT1 and ΔT2 is shorter than the cycle T. For the sake of simplicity, the waveform of the current ils is approximate to a triangular wave. The current ils takes a value between zero and a peak value Ip.

In terms of a relationship between time t assuming the beginning of a switching cycle as a basis (zero) and the periods ΔT1 and ΔT2, the following formulas are established. The across voltage vc of the capacitor C4 is charged by the booster circuit 4b to a higher amplitude than the amplitude Vm of the input voltage Vin. The inductance of a charging path is expressed as a value Lm. The inductance of the charging path is actually determined mainly by the inductance of the reactor L4, so that the value Lm can be considered to be the inductance of the reactor L4.

$$ils = \frac{Vin}{Lm}t \quad (0 < t < \Delta T1) \tag{12}$$

$$ils = \frac{Vin}{Lm}\Delta T1 - \frac{1}{Lm}(vc - Vin)(t - \Delta T1) \quad (\Delta T1 < t < \Delta T2) \tag{13}$$

$$ils = 0 \quad (\Delta T1 + \Delta T2 < t < T) \tag{14}$$

The peak value Ip shows the current ils determined when t=ΔT1 is established. Thus, by substituting t=ΔT1 into formula (12), the peak value Ip is expressed as Ip=Vin·ΔT1/Lm.

A relationship il=0 is established when t=ΔT2 is established in formula (13). Then, a relationship ΔT2=Vin·ΔT1/(vc−Vin) is established. In consideration of these relationships, an integrated value of the current ils in the switching cycle T is determined using formulas (12) and (13) and the integrated value is divided by the switching cycle T. As a result, the following formula is derived to determine the current il:

$$il = \frac{Vin \cdot vc \cdot T}{2 \cdot Lm(vc - Vin)}dl^2 \tag{15}$$

Then, in consideration of formula (11), the boosting duty dl for making the switch Sl conducting is expressed by the following formula:

$$dl = \sqrt{\frac{2 \cdot Lm(vc - Vin) \cdot il}{vc \cdot Vin \cdot T}} \tag{16}$$

(b-4) Control on Operation of Inverter

The switches Sc and Sl are provided in the direct power converter of FIG. 1, so that the respective duties of the switches Sc and Sl can be determined in the aforementioned way. Meanwhile, the switches Srec and Sz are not actually provided in the direct power converter of FIG. 1. The switches Srec and Sz in the equivalent circuit of FIG. 2 are controlled equivalently by switching the switch Sc and the inverter 5. A general way of controlling an inverter is described first to show a method of controlling the switches Srec and Sz equivalently.

A pair of the switching elements Sup and Sun corresponding to a U phase, a pair of the switching elements Svp and Svn corresponding to a V phase, and a pair of the switching elements Swp and Swn corresponding to a W phase are controlled mutually exclusively. This generates the following eight switching patterns as viewed in the entire inverter 5 in response to the switching state of each switching element. A switching state where an upper switching element is conducting and a lower switching element is non-conducting is expressed as "1." A switching state where the upper switching element is non-conducting and the lower switching element is conducting is expressed as "0." The following eight switching patterns develop that show the respective switching states in all the phases aligned in the order of the U phase, the V phase, and the W phase: (0, 0, 0), (0, 0, 1), (0, 1, 0), (0, 1, 1), (1, 0, 0), (1, 0, 1), (1, 1, 0), and (1, 1, 1).

These switching patterns develop in the inverter 5 to output a current Iu, a current Iv, and a current Iw from the output terminals Pu, Pv, and Pw respectively in response to corresponding switching patterns.

FIG. 4 shows a voltage vector V0, a voltage vector V1, a voltage vector V2, a voltage vector V3, a voltage vector V4, a voltage vector V5, a voltage vector V6, and a voltage vector V7 corresponding to the aforementioned switching patterns. A number determined by considering the aforementioned three numbers indicating a switching state as a three-digit binary number and converting this binary number to a decimal number is adopted as "x" in a symbol "Vx" indicating a voltage vector. As an example, the switching pattern (1, 0, 0) is expressed as the voltage vector V4.

The voltage vectors V1 to V6 are arranged such that their starting points agree with a center point and their end points are pointed outward in a radial pattern. Connecting the respective end points of the voltage vectors V1 to V6 forms a regular hexagon. The output terminals Pu, Pv, and Pw are shorted with the voltage vectors V0 and V7, so that the voltage vectors V0 and V7 do not have a magnitude. Thus, the voltage vectors V0 and V7 are arranged at the center point. The voltage vectors V0 and V7 are called zero-voltage vectors.

Regular triangular regions formed by two adjacent ones of the voltage vectors V1 to V6 and each of the voltage vectors V0 and V7 are called a region S1, a region S2, a region S3, a region S4, a region S5, and a region S6.

The aforementioned switching patterns are adopted selectively to make the inverter 5 operate. When the inverter 5 is to be controlled using a voltage vector, a command value V* of the voltage vector can be synthesized from the voltage vectors V0 to V7. By adjusting a period when each of these voltage vectors is adopted, the command value V* can be determined arbitrarily in a corresponding one of the regions S1 to S6. A period when one voltage vector is adopted continuously is set to be sufficiently shorter than a cycle of a single-phase AC voltage.

FIG. 5 is a timing diagram illustrating operation of the direct power converter in the feeding period. For the sake of simplicity, a triangular wave having a cycle ts is adopted as a carrier C. As an example, this triangular wave takes a minimum of 0 and a maximum of 1. Further, the absolute value of a tilt of this wave during increase is the same as that of a tilt during decrease, for example.

As described above, the booster circuit 4b is not operated in the feeding period. Thus, the boosting duty dl is zero, the rectifying and discharge duties drec and dc are set using formulas (6) and (7) respectively, and the zero duty dz is set using formula (4) based on the rectifying and discharge duties drec and dc.

The switch Srec is determined to be conducting when the carrier C takes a value not falling below the rectifying duty drec, then the switch Srec is conducting with the rectifying duty drec (is conducting equivalently in a period trec=drec·ts). Further, because formula (4) is established, by determining the switch Sc to be conducting when the carrier C takes a value not falling below the sum of duties (drec+dz), then the switch Sc is conducting with the discharge duty dc (becomes conducting in a period tc=dc·ts). When the carrier C takes a value of the rectifying duty drec or more and not exceeding the sum (drec+dz), the switch Sz is conducting (is conducting in a period tz/2=dz·ts/2 appearing twice in one cycle ts: the period tz is divided in two equal parts as the absolute value of the tilt of the carrier C during increase is the same as that of the tilt during decrease.) In this way, the command value based on the duties drec and dz is compared to the carrier C, thereby determining the periods drec, tc, and tz wherein the switches Srec, Sc, and Sz respectively are to be conducting equivalently in one cycle ts of the carrier C. As a result of the comparison to the carrier, timing of making the switch Sc conducting is determined.

To make the diode rectifier 3 do operation equivalent to making the switch Srec conducting in the period trec and to make the inverter 5 do operation equivalent to making the switch Sz conducting in the period tz, the inverter 5 is subjected to the following control. FIG. 5 does not show whether the switching elements Sun, Svn, and Swn controlled exclusively of the switching elements Sup, Svp, and Swp respectively are conducting or non-conducting.

For the sake of simplicity, a carrier same as the carrier C used for deriving the respective conducting periods trec, tc, and tz of the switches Srec, Sc, and Sz is used in the description herein showing how a conducting period of each switching element of the inverter 5 is determined.

FIG. 5 shows an example where the command value V* of a voltage vector is synthesized from the voltage vectors V0, V4, and V6. This synthesis is adopted when the command value V* of a voltage vector is in the region S1, for example. When the zero-voltage vector V7 is not adopted in this example for the sake of simplicity, adoption of the zero-voltage vector V7 may be permitted.

For control on the operation of the inverter 5, a phase voltage command Vu*, a phase voltage command Vv*, and a phase voltage command Vw* are adopted generally as command values of output voltages at the output terminals Pu, Pv, and PW respectively. FIG. 5 illustrates modulation using the voltage vectors V0, V4, and V6, so that a relationship 0=Vw*<Vv*<Vu* is established.

To make the diode rectifier 3 commutate when the inverter 5 operates by adopting a zero-voltage vector, a command value to be compared to the carrier C is changed at a boundary when the carrier C takes a value of the rectifying duty drec. More specifically, the switching element Sup is made to conduct when the carrier C is drec·Vu* or less. The switching element Svp is made to conduct when the carrier C is drec·Vv* or less. The switching element Swp is made to conduct when the carrier C is drec·Vw* or less.

These conducting patterns correspond to comparisons between a conventional triangular wave and the phase voltage commands Vu*, Vv*, and Vw* in the period trec. This is for the reason that a part of the triangular wave of the carrier C taking a value from 0 to drec is divided internally by Vu*, Vv*, and Vw*. Meanwhile, Vw* is 0 in the example of FIG. 5, so that drec·Vw* becomes 0. This means the switching element Swp is not conducting in the period trec. As a result of the foregoing operation, the voltage vectors V0, V4, V6, V4, and V0 are adopted in this order in the period trec, for example.

The carrier C being drec+dz+dc·(1−Vu*) or more makes the switching element Sup conducting. The carrier C being drec+dz+dc·(1−Vv*) or more makes the switching element Svp conducting. The carrier C being drec+dz+dc·(1−Vw*) or more makes the switching element Swp conducting.

These conducting patterns correspond to comparisons between the conventional triangular wave and the phase voltage commands Vu*, Vv*, and Vw* in the period tc. This is for the reason that a part of the triangular wave of the carrier C taking a value from drec+dz to 1 (=drec+dz+dc) is divided internally by Vu*, Vv*, and Vw*. Meanwhile, Vw* is 0 in the example of FIG. 5, so that drec+dz+dc·Vw*=0 is established and the switching element Swp is not conducting in the period tc. As a result of the foregoing operation, like in the period trec, the voltage vectors V0, V4, V6, V4, and V0 are output in this order in the period tc.

As a result of the control on each switching element in the periods trec and tc, the switching elements Sup, Svp, and Swp are non-conducting in a period tz/2 between the periods trec and tc. As a result, the voltage vector V0 is output as a zero-voltage vector in the period tz/2.

Meanwhile, the inverter 5 is allowed to operate with a voltage vector except a zero-voltage vector when the inverter 5 receives a current from the DC power lines LH and LL. Thus, the inverter 5 operates with a voltage vector except a zero-voltage vector when the switch Sz is non-conducting.

As clearly understood from the aforementioned description, the period tz is a period determined by the duty dz. In other words, this is a period when the inverter 5 adopts a zero-voltage vector irrespectively of (free from) the phase voltage commands Vu*, Vv*, and Vw*. Specifically, the duty dz can be understood as a duty to make the inverter 5 operate with a zero-voltage vector irrespectively of the magnitude of a voltage output from the inverter 5. In consideration of formula (4), the rectifying duty drec can be understood as a duty obtained by subtracting the sum of the discharge and zero duties dc and dz from 1.

FIG. 6 is a timing diagram illustrating operation of the direct power converter in the receiving period. A carrier adopted in the receiving period is the same as the carrier C adopted in the feeding period. The rectifying and boosting duties drec and dlI are set using formulas (10) and (16) respectively (the current il adopted in formula (16) is determined using formula (11)).

Like in the feeding period, the switch Srec is determined to be conducting when the carrier C takes a value not falling below the rectifying duty drec. Meanwhile, as described above, the discharge duty do is zero and drec+dz=1 is established using formula (4) in the receiving period. Thus, unlike in the feeding period, the switches Srec and Sz are to become conducting or non-conducting exclusively.

A command value based on the duty drec is compared to the carrier C in this way, thereby determining the periods tree and tz where the switches Srec and Sz respectively are to become conducting equivalently in one cycle ts of the carrier C.

In the receiving period, regarding the operation of the inverter 5, a command value drec·Vu*, a command value drec·Vv*, and a command value drec·Vw* are also compared to the value of the carrier C in the period trec. Then, the respective operations of the switching elements Sup, Svp, and Swp are determined and the voltage vectors V0, V4, V6, V4, and V0 are adopted in this order.

As a result of establishing dc=0, all of a command value drec+dz+dc·(1−Vu*), a command value drec+dz+dc·(1−Vv*), and a command value drec+dz+dc·(1−Vw*) become 1. The inverter 5 is to operate based on the zero-voltage vector V0 in the period tz.

The switch Sl is controlled for example as follows. When the discontinuous mode is adopted, for example, the switching cycle T is allowed to be a constant value. Thus, for the sake of simplicity, the cycle ts of the carrier C is adopted as the switching cycle T. The switch Sl is determined to be conducting when the carrier C takes a value not exceeding the duty dl, then the switch Sl is conducting with the duty dl. The duty dl can be determined by adopting T=ts in formula (16). Specifically, a period tl when the switch Sl is conducting is determined as the product of the duty dl and the cycle ts. This period corresponds to the period ΔT1 of FIG. 3.

In this example, the switch Sl is switched in the period trec in synchronization with the carrier C. Alternatively, the switch Sl may be switched in the period tz or both in the periods tz and trec. Still alternatively, the switch Sl may be switched based on a carrier except the carrier C.

C. Consideration on Maximum of Input Amplitude Modulation Factor

An input amplitude modulation factor mentioned herein is a ratio of a virtual DC link voltage (described in detail later) to a maximum of the input voltage Vin (specifically, amplitude Vm).

As understood from formulas (1) and (4), the rectifying duty drec can adopt 1 as a maximum. As understood from formulas (6) and (10), the rectifying duty drec takes the maximum when the phase angle ωt is π/4 (=45 degrees), specifically at a boundary between the receiving and feeding periods. It is thus understood from formulas (6) and (10) that Im/Idc takes a maximum of $\sqrt{2}$.

At this time, power input to the inverter 5 takes a constant value that is the product Idc·Vdcm of a maximum Vdcm of a virtual DC link voltage Vdc and the DC current Idc input to the inverter 5. Power ripple is cancelled out by the instantaneously transferred power Pbuf, so that the DC component (Vm·Im/2) of instantaneous power input from the single-phase AC power source 1 becomes the same as the product Idc·Vdcm. Thus, a ratio of the maximum Vdcm to the amplitude Vm, namely a maximum of the input amplitude modulation factor is expressed by the following formula:

$$\frac{Vdcm}{Vm} = \frac{1}{\sqrt{2}} \qquad (17)$$

The graph of FIG. 7 shows examples of the duties drec, dc, and dz determined when Im/Idc=$\sqrt{2}$ established in order for the input amplitude modulation factor to take a maximum. A symbol T1 and a symbol T2 show the feeding and receiving periods respectively. In the feeding period T1, the duties drec and dc are expressed by the following formulas using formulas (6) and (7) respectively. For the sake of simplicity, the across voltage vc of the capacitor C4 is considered to be a constant value in FIG. 7.

$$drec = \sqrt{2}\,|\sin(\omega t)| \qquad (18)$$

$$dc = \frac{Vm}{\sqrt{2}\,vc}\cos(2\omega t) \qquad (19)$$

The product of a rectified voltage output from the diode rectifier 3 and the rectifying duty drec is introduced as an average voltage Vrec. Likewise, the product of the across voltage vc of the capacitor C4 and the discharge duty dc is introduced as an average voltage Vcc. The graph of FIG. 8 shows the average voltages Vrec and Vcc when the input amplitude modulation factor takes a maximum of 1/$\sqrt{2}$. These average voltages Vrec and Vcc are averages relative to the switching cycles (herein, the cycle of the carrier C) of the switches Srec and Sc. As described in detail later, the aforementioned virtual DC link voltage Vdc is the sum of these average voltages (Vrec+Vcc).

In the feeding period T1, a rectified voltage is expressed as a voltage Vm sin(ωt) input to the diode rectifier 3. Thus, the following formula is established:

$$\left. \begin{array}{l} Vrec = \sqrt{2}\,Vm\cdot\sin^2(\omega t) \\ Vcc = \dfrac{Vm}{\sqrt{2}}\cdot\cos(2\omega t) \\ Vrec + Vcc = \dfrac{Vm}{\sqrt{2}} \end{array} \right\} \qquad (20)$$

The graph of FIG. 8 shows values determined by normalizing the average voltages by the amplitude Vm. This applies to other corresponding drawings referred to later. It is understood from FIG. 8 and formula (20) that the sum of the average voltages (Vrec+Vcc) in the feeding period is maintained at a value determined by multiplying the amplitude Vm by 1/$\sqrt{2}$.

A relationship dc=0 is established in the receiving period T2, thereby establishing Vcc=0. Meanwhile, when Im/Idc=$\sqrt{2}$ is established in order for the input amplitude modulation factor to take a maximum, the rectifying duty drec is expressed by the following formula using formula (10):

$$drec = \frac{1}{\sqrt{2}}\cdot\frac{1}{|\sin(\omega t)|} \qquad (21)$$

As seen from above, by multiplying a rectified voltage |Vin| resulting from rectifying the single-phase AC voltage Vin (=Vm·sin (ωt)) by the rectifying duty drec shown in formula (10), the sum of the average voltages (Vrec+Vcc) in the receiving period is also maintained at the value determined by multiplying the amplitude Vm by 1/$\sqrt{2}$.

First Embodiment

According to Japanese Patent Application Laid-Open No. 2011-193678, the input amplitude modulation is 1/$\sqrt{2}$ at a maximum. This embodiment is intended for a control method contributing to further increase in the input amplitude modulation factor.

<Setting of Rectifying Duty drec and Discharge Duty dc>

Attention is given to the rectifying duty drec in the receiving period T2 and the discharge duty dc in the feeding period T1. In the below, in the absence of any particular explanation, the discharge duty dc in the receiving period T2 and the rectifying and zero duties drec and dz in the feeding period T1 are set in the aforementioned ways, for example.

The rectifying duty drec in the receiving period T2 is described first. The rectifying duty drec in the receiving period T2 described herein is set to be higher than a value determined by formula (21) (the rectifying duty drec in the receiving period T2 of FIG. 7).

Setting the rectifying duty drec in this way can increase the average voltage Vrec (=drec·|Vin|) in the receiving period T2. This can increase the sum of the average voltages (Vrec+Vcc) in the receiving period T2.

By referring to FIG. 1, a DC voltage applied to the DC power lines LH and LL takes the across voltage vc when the switch Sc is conducting and takes a rectified voltage when the switch Sc is non-conducting. Meanwhile, for the presence of the equivalent circuit of FIG. 2 considered herein, a DC voltage in the equivalent circuit takes a rectified voltage |Vin| when the switch Sc is conducting, takes the across voltage vc when the switch Sc is conducting, and takes zero when the switch Sz is conducting. Thus, the sum of the average voltages (Vrec+Vcc) can be understood as an average of this DC voltage in the equivalent circuit (this average is hereinafter called the virtual DC link voltage Vdc). In the below, the sum of the average voltages (Vrec+Vcc) is also called the virtual DC link voltage Vdc. The virtual DC link voltage Vdc can also be understood as an average of a DC voltage input to a current source (specifically, the inverter 5 and the load 6) in the equivalent circuit. In terms of the actual circuit of FIG. 1, the virtual DC link voltage Vdc can also be understood as an average of a voltage the inverter 5 can output.

As shown in FIG. 9, by setting the rectifying duty drec in the receiving period T2 to be higher than the rectifying duty drec of FIG. 7, for example, the sum of the average voltages (Vrec+Vcc) in the receiving period T2 becomes larger than $Vm/\sqrt{2}$ as shown in FIG. 10. Specifically, the sum of the average voltages (Vrec+Vcc) in the receiving period T2 can be larger than that of FIG. 8. Meanwhile, as shown in FIG. 10, the sum of the average voltages (Vrec+Vcc) in the receiving period T2 does not take a constant value but it fluctuates.

In the case that the virtual DC link voltage Vdc (=Vrec+Vcc) fluctuates in this way, the input amplitude modulation factor can be considered to be a value determined by dividing an average of the virtual DC link voltage Vdc in one cycle of the input voltage Vin by the amplitude Vm.

The rectifying duty drec in the receiving period T2 can be set for example by the following formula:

$$drec = 1 - x + \frac{x}{\sqrt{2}} \cdot \frac{1}{|\sin(\omega t)|} \quad (22)$$

In this formula, x is 0 or more and less than 1. FIGS. 9 and 10 each show an example where 0.5 is adopted as x.

The rectifying duty drec set by formula (22) has a waveform with a downwardly extending projection in the receiving period T2 and takes 1 at each of the beginning and the end of the receiving period T2 (FIG. 9, for example). Thus, a when where the rectifying duty drec fluctuates is not shorter than the receiving period T2.

The rectifying duty drec is required only to be set to be higher than that set by formula (21). Meanwhile, it is desirable that the rectifying duty drec be set using formula (22). The reason therefor is as follows. The virtual DC link voltage Vdc is the sum of the average voltage Vrec (=drec·Vrec) and Vcc, whereas the average voltage Vrec has the rectifying duty drec as a factor. Thus, when the rectifying duty drec fluctuates minutely, its harmonic component is superimposed further on the virtual DC link voltage Vdc. Meanwhile, the rectifying duty drec set by formula (22) does not ripple minutely, so that such a harmonic component can be suppressed. In the example of FIG. 10, the virtual DC link voltage Vdc has a waveform with an upwardly extending projection in the receiving period T2 and takes its minimum ($Vm/\sqrt{2}$) at each of the beginning and the end of the receiving period T2.

The input current Iin (=drec·Idc+dc·Idc+il) also has the rectifying duty drec, so that a harmonic component of the input current Iin can also be suppressed.

In terms of increasing the virtual DC link voltage Vdc, together with the aforementioned setting of the rectifying duty drec in the receiving period T2 or as an alternative to this setting, the discharge duty do in the feeding period T1 may be set as follows. The discharge duty dc in the feeding period T1 is set to be higher than a value determined by formula (19) (the discharge duty do in the feeding period T1 of FIG. 7).

Setting the discharge duty do in this way can increase the average voltage Vcc (=dc·vc) in the feeding period T1. This can increase the sum of the average voltages (Vrec+Vcc) in the feeding period T1.

As shown in FIG. 9, by setting the discharge duty do in the feeding period T1 to be higher than the discharge duty do of FIG. 7, for example, the sum of the average voltages (Vrec+Vcc) in the feeding period T1 becomes larger than $Vm/\sqrt{2}$ as shown in FIG. 10. Specifically, the sum of the average voltages (Vrec+Vcc) in the feeding period T1 can be larger than that of FIG. 8. This can increase the input amplitude modulation factor. Meanwhile, as shown in FIG. 10, the sum of the average voltages (Vrec+Vcc) does not take a constant value but it fluctuates further in the feeding period T1.

The virtual DC link voltage Vdc can be increased more easily by increasing the discharge duty dc in the feeding period T1 than by increasing the rectifying duty drec. The reason therefor is as follows. The virtual DC link voltage Vdc is expressed as drec·|Vin|+dc·vc. The rectified voltage |Vin| takes a relatively small value in the feeding period T1, whereas the voltage vc charging the capacitor C4 is made higher than the rectified voltage |Vin| by the booster circuit 4b.

The discharge duty do in the feeding period T1 can be set for example by the following formula. FIGS. 9 and 10 each show an example where x=0.5 is adopted and vc/Vm=2 is adopted in the following formula:

$$dc = (\sqrt{2} - \sqrt{2}\,x + x)\frac{Vm}{\sqrt{2}\,vc}\cos(2\omega t) \quad (23)$$

In formula (23), x is 0 or more and less than 1. Meanwhile, x in formula (23) is not required to be the same as x in formula (22).

In the examples of FIGS. 9 and 10, the rectifying duty drec in the receiving period T2 is set using formula (22) and the discharge duty dc in the feeding period T1 is set using formula (23). This makes the virtual DC link voltage Vdc to ripple both in the feeding and receiving periods T1 and T2. Thus, the virtual DC link voltage Vdc is to ripple in a cycle that is a quarter of a cycle of the input voltage Vin.

An average of the virtual DC link voltage Vdc of FIG. 10 (an average in one cycle of the input voltage Vin) is calculated. This average is found to be about 0.8 times the amplitude Vm. Thus, the input amplitude modulation factor determined here is about 0.8. This can increase the input amplitude modulation factor by about 14%, compared to the input amplitude modulation factor of $1/\sqrt{2}$.

The discharge duty dc is required only to be set to be higher than that set by formula (19). Meanwhile, the discharge duty dc set by formula (23) has a waveform with an upwardly extending projection in the feeding period T1 and takes 0 at each of the beginning and the end of the feeding period T1 (FIG. 9, for example). This discharge duty do does not fluctuate minutely.

The virtual DC link voltage Vdc is the sum of the average voltage Vrec and Vcc (=dc·vc), whereas the average voltage Vcc has the discharge duty do as a factor. Thus, when the discharge duty dc fluctuates minutely, its harmonic component is superimposed further on the virtual DC link voltage Vdc. Meanwhile, the discharge duty dc set by formula (23) does not ripple minutely, so that such a harmonic component can be suppressed. Likewise, the input current Iin has the discharge duty dc, so that a harmonic component of the input current Iin can also be suppressed.

Additionally, by determining the rectifying duty drec using formula (22), determining the discharge duty dc using formula (23), and adopting the same value for x in formulas (22) and (23), a maximum of the virtual DC link voltage Vdc in the feeding period T1 can theoretically be the same as a maximum of the virtual DC link voltage Vdc in the receiving period T2. The following describes how this maximum is derived in each of the periods T1 and T2.

The discharge duty do is zero in the receiving period T2, so that the average voltage Vcc becomes zero. Thus, the virtual DC link voltage Vdc is determined as the product (=average voltage Vrec) of the rectifying duty drec of formula (22) and Vm·|sin(ωt)|. As shown in FIG. 10, the virtual DC link voltage Vdc takes a maximum with the phase angle ωt of 90 degrees. Thus, a maximum Vdcmax2 of the virtual DC link voltage Vdc in the receiving period T2 is expressed by the following formula:

$$Vdcmax2 = \left\{(1-x)\sin(\pi/2 + \frac{x}{\sqrt{2}}\right\}Vm \quad (24)$$
$$= \left\{(1-x) + \frac{x}{\sqrt{2}}\right\}Vm$$

The virtual DC link voltage Vdc in the feeding period T1 is the sum of the average voltage Vrec of formula (20) and the product (=average voltage Vcc) of the discharge duty dc and the voltage vc of formula (23). As understood from FIG. 10, the virtual DC link voltage Vdc in the feeding period T1 takes a maximum with the phase angle ωt of 180 degrees. Thus, a maximum Vdcmax1 of the virtual DC link voltage Vdc in the feeding period T1 is expressed by the following formula:

$$Vdcmax1 = \sqrt{2}\,Vm\cdot\sin^2(\pi) + (\sqrt{2} - \sqrt{2}\,x + x)\frac{Vm}{\sqrt{2}}\cos(2\pi) \quad (25)$$
$$= \left\{(1-x) + \frac{x}{\sqrt{2}}\right\}Vm$$

As understood from formulas (24) and (25), the maximums Vdcmax1 and Vdcmax2 are the same. This can make the virtual DC link voltage Vdc ripple to the substantially same degree in the feeding and receiving periods T1 and T2.

In other words, setting of the discharge duty do in the feeding period T1 can be understood as follows. The discharge duty do in the feeding period T1 is set at a value determined by multiplying the right side of formula (19) by a factor (such as $(\sqrt{2}-x\cdot\sqrt{2}+x)$ that is larger than 1) in order for a maximum of ripple of the virtual DC link voltage Vdc to occur resulting from the rectifying duty drec to be the same as a maximum of ripple of the virtual DC link voltage Vdc to occur resulting from the discharge duty dc.

<Charging Current icc and Discharge Current icd in Capacitor C4>

Power to be fed by the buffer circuit 4a in the feeding period T1 is expressed as the product vc·icd of the voltage vc of the capacitor C4 and a discharge current icd in the capacitor C4. In Japanese Patent Application Laid-Open No. 2011-193678, this power is set to be the same as the second term of the second part of formula (1). Thus, the discharge current icd in Japanese Patent Application Laid-Open No. 2011-193678 is expressed by the following formula:

$$icd = \frac{1}{2vc}Vm\cdot Im\cdot\cos(2\omega t) \quad (26)$$
$$= \frac{Vm\cdot Im}{vc}\left[\sin^2(\omega t) - \frac{1}{2}\right]$$

In contrast, in this embodiment, the discharge duty do is set to be higher than that of formula (19). Thus, the discharge current icd of this embodiment becomes larger than that of formula (26). As an example, in the case that the discharge duty dc is determined using formula (23), the discharge duty dc becomes a value determined by multiplying the right side of formula (19) by $(\sqrt{2}-x\cdot\sqrt{2}+x)$. The discharge current icd also becomes a value determined by multiplying the right side of formula (26) by $(\sqrt{2}-x\cdot\sqrt{2}+x)$. Thus, the discharge current icd is expressed by the following formula:

$$icd = (\sqrt{2} - \sqrt{2}\,x + x)\frac{Vm\cdot Im}{Vc}\left[\sin^2(\omega t) - \frac{1}{2}\right] \quad (27)$$

Here, increasing a charging current icc (current to charge the capacitor C4) in the receiving period T2 is intended in response to increase in the discharge current icd in the feeding period T1. The current il flowing through the reactor L4 is the same as the charging current icc when the switch Sl is non-conducting. Thus, the current il in the receiving period T2 is increased with the intention of increasing the charging current icc. More specifically, the current il in the receiving period T2 is set to be larger than that of formula (11). This can reduce a difference between the discharge current icd in the feeding period T1 and the charging current icc in the receiving period T2.

As an example, when an integrated value of the discharge current icd in the feeding period T1 is larger than an integrated value of the charging current icc in the receiving period T2, the voltage vc of the capacitor C4 is reduced on a long-term basis (as seen in a period longer than a cycle of the input voltage Vin).

In this embodiment, setting the current il to be larger than that of formula (11) can reduce a difference between these integrated values, thereby suppressing reduction in the voltage vc on a long-term basis.

In the case that the discharge duty do is determined using formula (23), it is desirable that the current il be determined using the following formula:

$$il = \left(\sqrt{2} - \sqrt{2}x + x\right)\left[Im \cdot |\sin(\omega t)| - \frac{Im}{2 \cdot |\sin(\omega t)|}\right] \quad (28)$$

Specifically, it is desirable that the current il be set at a value determined by multiplying the right side of formula (11) by ($\sqrt{2}$−x·$\sqrt{2}$+x) as a factor. In other words, the switch Sl in the booster circuit 4b is controlled such that the current il satisfies formula (28). This can be achieved by controlling the switch Sl by adopting the boosting duty dl determined by substituting formula (28) into formula (16). As a result, the charging current icc and the discharge current icd can be the same, as described in detail below.

The booster circuit 4b is a booster chopper circuit that generally establishes the following formula:

$$E2 = \frac{E1}{dcc} \quad (29)$$

In this formula, E1 is an input voltage of the booster chopper circuit, E2 is an output voltage of the booster chopper circuit, and dcc is a duty for making a diode of the booster chopper circuit conducting. The following formula is established by adopting formula (29) to this embodiment:

$$dcc = \frac{Vm \cdot |\sin(\omega t)|}{vc} \quad (30)$$

The charging current icc of the capacitor C4 is expressed as the product of the current il (formula (28)) and the duty dc (formula (30)). Thus, the charging current icc is expressed by the following formula:

$$icc = \frac{Vm \cdot |\sin(\omega t)|}{vc} \cdot \left(\sqrt{2} - \sqrt{2}x + x\right) \quad (31)$$
$$\left[Im \cdot |\sin(\omega t)| - \frac{Im}{2 \cdot |\sin(\omega t)|}\right]$$
$$= \left(\sqrt{2} - \sqrt{2}x + x\right)\frac{Vm \cdot Im}{vc}\left[\sin^2(\omega t) - \frac{1}{2}\right]$$

As seen from comparison between formulas (27) and (31), the charging current icc and the discharge current icd can theoretically be the same. This can stable the across voltage vc of the capacitor C4 in a long-term basis, thereby allowing stable operation of this direct power converter.

<Maximum of Input Amplitude Modulation Factor>

If x=0 is adopted in formula (22), the rectifying duty drec maintains a maximum of 1 in the receiving period T2. In this case, the virtual DC link voltage Vdc in the receiving period T2 becomes highest. Likewise, when x=0 is adopted in formula (23), the discharge duty dc in the feeding period T1 is set by the following formula:

$$dc = \frac{Vm}{vc}\cos(2\omega t) \quad (32)$$

Specifically, the discharge duty dc in the feeding period T1 is set at a value determined by multiplying the right side of formula (19) by $\sqrt{2}$ as a factor.

FIG. 11 shows the duties drec, dc, and dz when the rectifying duty drec in the receiving period T2 is set at 1 and the discharge duty do in the feeding period T1 is set using formula (32). FIG. 12 shows respective examples of the average voltages Vrec and Vcc and the sum of the average voltages (Vrec+Vcc). An output amplitude modulation factor D, an equivalent DC voltage Vdc', and the DC current Idc shown in FIG. 12 are described later.

The rectifying duty drec and the discharge duty do in the receiving period T2 are set at 1 and 0 respectively. This makes the virtual DC link voltage Vdc (=drec·|Vin|+dc·vc) in this period the same as the absolute value of the input voltage Vin. Thus, the virtual DC link voltage Vdc in the receiving period T2 is expressed by the following formula (33):

$$Vdc = Vm \cdot |\sin(\omega t)| \quad (33)$$

Meanwhile, like in the conventional example, the rectifying duty drec in feeding period T1 is set by formula (18), and the discharge duty do in the feeding period T1 is set by formula (32), for example. As a result, the virtual DC link voltage Vdc (=drec·|Vin|+dc·vc) in the feeding period T1 is expressed by the following formula:

$$Vdc = \frac{Vm}{\sqrt{2}}\left\{1 + \left(\sqrt{2} - 1\right)|\cos(2\omega t)|\right\} \quad (34)$$

An average of the virtual DC link voltage Vdc in one cycle of the input voltage Vin is calculated based on formulas (33) and (34). This average is found to be about 0.9 times the amplitude Vm. Thus, the input amplitude modulation factor is about 0.9. This can increase the input amplitude modulation factor by about 29%, compared to the input amplitude modulation factor of 1/$\sqrt{2}$.

In this case, the virtual DC link voltage Vdc has a waveform (FIG. 12) comparable to that of a two-phase rectified waveform obtained by full-wave rectifying a two-phase AC voltage with the same amplitude as the amplitude Vm. More specifically, the virtual DC link voltage Vdc in the receiving period T2 is expressed by formula (33), so that it agrees with a two-phase rectified waveform (Vm·|Sin(ωt)|) in this period. Meanwhile, the virtual DC link voltage Vdc in the feeding period T1 is expressed by formula (34). In a strict sense, this virtual DC link voltage Vdc differs from a two-phase rectified waveform (Vm·|cos(ωt)|) in this period. However, the virtual DC link voltage Vdc fluctuates substantially along Vm·|cos(ωt)|. Then an error between an integrated value of the two-phase rectified waveform in the feeding period T1 and an integrated value of the virtual DC link voltage Vdc in the feeding period T1 is less than 1%. As a result, the virtual DC link voltage Vdc in this case can be considered to be the same as the two-phase rectified waveform.

<Correction of Ripple>

If the virtual DC link voltage Vdc ripple as in this embodiment, a component of this ripple might be superimposed on an output voltage of the inverter 5. In response, reducing ripple of the amplitude of the output voltage is intended by setting the output amplitude modulation factor D properly. The output amplitude modulation factor D mentioned herein is a ratio of the equivalent DC voltage Vdc' to the virtual DC link voltage Vdc. The equivalent DC voltage Vdc' mentioned herein is a DC voltage output to a DC load which is equivalently considered to a three-phase AC load (inductive load 6) illustrated in FIG. 1. Thus, the equivalent DC voltage Vdc' corresponds to the amplitude of the output voltage of the inverter 5.

With the output amplitude modulation factor D defined in the foregoing way, the following formula is established:

$$Vdc'=D \cdot Vdc \quad (35)$$

The inverter 5 is controlled based on the output amplitude modulation factor D. As an example, the phase voltage commands Vu*, Vv*, and Vw* are multiplied by the output amplitude modulation factor D and the inverter 5 are controlled based on the multiplied phase voltage commands Vu*, Vv*, and Vw*. This control is the same as that described by referring to FIGS. 5 and 6, so that the same description is not given repeatedly.

The output amplitude modulation factor D is set as follows based on the virtual DC link voltage Vdc. Specifically, the output amplitude modulation factor D is set so as to become lower as the virtual DC link voltage Vdc increases in response to ripple. As understood from formula (35), reducing the output amplitude modulation factor D when the virtual DC link voltage Vdc increases can reduce fluctuation of the equivalent DC voltage Vdc'.

In the example considered below, the rectifying duty drec, the discharge duty dc, and the zero duty dz are set as shown in FIG. 11. In this case, the output amplitude modulation factor D in the receiving period T2 is set using the following formula (36) and that in the feeding period T1 is set using the following formula (37), for example:

$$D = \frac{1}{\sqrt{2}|\sin(\omega t)|} \quad (36)$$

$$D = \frac{1}{\sqrt{2}|\cos(\omega t)|} \quad (37)$$

Specifically, the output amplitude modulation factor D is set at a value determined by standardizing the reciprocal of the virtual DC link voltage Vdc by the amplitude Vm. The virtual DC link voltage Vdc is equivalent to a two-phase rectified waveform in the receiving period T2, so that the output amplitude modulation factor D mentioned herein is set at a value determined by standardizing the reciprocal of the two-phase rectified waveform by the amplitude Vm. As a result, a ripple component of the virtual DC link voltage Vdc is cancelled out substantially with a fluctuation component of the output amplitude modulation factor D. This allows the equivalent DC voltage Vdc' to be substantially constant. In other words, the amplitude of the output voltage of the inverter 5 can be substantially constant.

As described above, in a strict sense, the virtual DC link voltage Vdc in the feeding period T1 differs from a ripple component cos(ω)t of the two-phase rectified waveform. This makes the equivalent DC voltage Vdc' fluctuate slightly in the feeding period T1 as shown in FIG. 12.

Formulas (33) and (36) are substituted into formula (35). Then, the equivalent DC voltage Vdc' in the receiving period T2 is expressed as Vm/√2. This idea is substantially true for the feeding period T1. Thus, the equivalent DC voltage Vdc' in the feeding period T1 is also determined by multiplying the amplitude Vm by about 1/√2. An average of the equivalent DC voltage Vdc' to the amplitude Vm (an average in one cycle of the input voltage Vin) is called a voltage utilization factor. The voltage utilization factor determined herein is about 1/√2 (about 0.7).

<Overmodulation Operation>

In the example of FIG. 13, the duties drec, dc, and dz are set in the same manner as in FIG. 11. Meanwhile, in the example of FIG. 13, the output amplitude modulation factor D is set to be higher than that of FIG. 12. More specifically, the output amplitude modulation factor D in the receiving period T2 is set using the following formula (38) and that in the feeding period T1 is set using the following formula (39):

$$D = \frac{1}{2} + \frac{1}{2\sqrt{2}|\sin(\omega t)|} \quad (38)$$

$$D = \frac{1}{2} + \frac{1}{2\sqrt{2}|\cos(\omega t)|} \quad (39)$$

Like the output amplitude modulation factor D of FIG. 12, the output amplitude modulation factor D determined here takes 1 at a boundary between the feeding and receiving periods T1 and T2. Thus, like the equivalent DC voltage Vdc' of FIG. 12, the equivalent DC voltage Vdc' takes Vm/√2 at the boundary between the feeding and receiving periods T1 and T2. Further, the output amplitude modulation factor D has a waveform with a downwardly extending projection in each of the periods T1 and T2, whereas its fluctuation range (amplitude) is a half of that of the output amplitude modulation factor D of FIG. 12. Thus, a half of a ripple component of the virtual DC link voltage Vdc is superimposed on the equivalent DC voltage Vdc', so that the waveform of the equivalent DC voltage Vdc' has an upwardly extending projection in each of the periods T1 and T2.

As a result, the equivalent DC voltage Vdc' can be higher than the equivalent DC voltage Vdc' (≈Vm/√2) of FIG. 2.

In FIG. 13, an average of the equivalent DC voltage Vdc' relative to one cycle of the input voltage Vin is about 0.8 times the amplitude Vm, resulting in the voltage utilization factor of 0.8. This can increase the voltage utilization factor by about 14%, compared to the voltage utilization factor of 1/√2.

The output amplitude modulation factor D may also be set as follows. The output amplitude modulation factor D in the receiving period T2 may be set using the following formula (40) and that in the feeding period T1 may be set using the following formula (41):

$$D = 1 - y + \frac{y}{\sqrt{2}|\sin(\omega t)|} \quad (40)$$

$$D = 1 - y + \frac{y}{\sqrt{2}|\cos(\omega t)|} \quad (41)$$

In this formula, y is 0 or more and less than 1. Making y take a larger value can reduce a degree of ripple of the virtual DC link voltage Vdc to be superimposed on the equivalent DC voltage Vdc'. In other words, making y take a smaller value can increase an average of the equivalent DC voltage Vdc' to increase the voltage utilization factor.

In the example of FIG. 14, the duties drec, dc, and dz are set in the same manner as in FIG. 11. Meanwhile, in the example of FIG. 14, the output amplitude modulation factor D is maintained at 1 independently of the ripple of the virtual DC link voltage Vdc. In other words, y=0 is adopted in formulas (40) and (41).

By adopting the output amplitude modulation factor D determined in this way, the ripple component of the virtual DC link voltage Vdc is superimposed as it is on the equivalent DC voltage Vdc'. Thus, in FIG. 14, the equivalent DC voltage Vdc' and the sum of the average voltages (Vrec+Vcc) agree with each other.

In this case, an average of the equivalent DC voltage Vdc' is about 0.9 times the amplitude Vm, resulting in the voltage utilization factor of 0.9. This can increase the voltage utilization factor by about 29%, compared to the voltage utilization factor of $1/\sqrt{2}$.

As described above, only setting the output amplitude modulation factor D allows the voltage utilization factor to be higher than $1/\sqrt{2}$. This is for the reason that setting the rectifying duty drec in the receiving period T2 in the aforementioned way and/or setting the discharge duty do in the feeding period T1 in the aforementioned way can increase the virtual DC link voltage Vdc. Specifically, with the input amplitude modulation factor (Vdc/Vm) of $1/\sqrt{2}$, setting the output amplitude modulation factor D at a maximum of 1 can only achieve the voltage utilization factor of $1/\sqrt{2}$. In contrast, in this embodiment, the input amplitude modulation factor can be higher than $1/\sqrt{2}$. Thus, the voltage utilization factor can be increased only by setting the output amplitude modulation factor D.

In this embodiment, operation with the voltage utilization factor falling below $1/\sqrt{2}$ is called normal modulation operation and operation with the voltage utilization factor exceeding $1/\sqrt{2}$ is called overmodulation operation. The virtual DC link voltage Vdc can be increased in this embodiment. Thus, the normal modulation operation and the overmodulation operation can be switched only by controlling the inverter 5, specifically by setting the output amplitude modulation factor D.

<Explanation of how Input Current Satisfies Regulation on Harmonic>

The input current Iin is considered next. In each of FIGS. 12 to 14, the duties drec, dc, and dz are set in the manner of FIG. 11. Specifically, x=0 is adopted in formulas (22) and (23). Thus, x=0 is also adopted in formula (28) for the current il in the receiving period T2.

The DC current Idc also ripples in response to the sum of the average voltages (Vrec+Vcc). This DC current Idc (hereinafter called a conventional DC current Idc") takes a constant value (=Im/$\sqrt{2}$) (not shown in the drawings) when the duties drec, dc, and dz of FIG. 7 are adopted, so that the DC current Idc becomes smaller than the conventional DC current Idc". Thus, it is preferable that the current il be reduced in response to this difference. The following ratio is adopted as the difference mentioned herein. A ratio of an average of the DC current Idc in one cycle to the conventional DC current Idc" (=Im/$\sqrt{2}$) is adopted. To calculate this ratio, an average of the sum of the average voltages (Vrec+Vcc) in one cycle is calculated first. In the example of FIG. 12, this average is $2\sqrt{2}/\pi$. This value is standardized by $\sqrt{2} \cdot Vm$. A voltage ratio is considered using this average. Then, the aforementioned ratio is expressed as power Pdc/(an average of the sum of the average voltages (Vrec+Vcc)) =Idc"/$\sqrt{2}(2\sqrt{2}/\pi)$=Idc"·$\pi/4$.

Thus, the current il is set by the following formula:

$$i1 = \sqrt{2} \cdot \frac{\pi}{4} \cdot \left[ Im \cdot |\sin(\omega t)| - \frac{Im}{2 \cdot |\sin(\omega t)|} \right] \quad (42)$$

Power on the input side and that on the output side of the inverter 5 are the same, so that the following formula is established:

$$Vdc' \cdot Idc' = Vdc \cdot Idc \quad (43)$$

In this formula, Idc' is a DC current output to the DC load which is equivalently considered to be the three-phase AC load (inductive load 6) illustrated in FIG. 1. Thus, the equivalent DC current Idc' corresponds to the amplitude of the output current of the inverter 5. Formula (35) is substituted into formula (43) to derive the following formula:

$$D \cdot Vdc \cdot Idc' = Vdc \cdot Idc$$

$$D \cdot Idc' = Idc \quad (44)$$

In the example of FIG. 12, the output amplitude modulation factor D is expressed using formulas (36) and (37). In this case, the equivalent DC voltage Vdc' becomes substantially constant. Controlling the inverter 5 such that the inductive load 6 becomes a resistance load makes the equivalent DC current Idc' substantially constant. The DC current Idc is expressed by formula (44). Thus, controlling the inverter 5 such that the inductive load 6 becomes a resistance load makes the DC current Idc of FIG. 12 substantially agree with the output amplitude modulation factor D. In FIG. 12, the DC current Idc is shown to be standardized by a maximum of the equivalent DC current Idc'. This applies to different drawings to be referred to later and to different currents.

FIG. 15 shows the current irec1, the discharge current icd, the charging current icc, and the currents irec and il determined under a condition same as that of FIG. 12.

The current irec1 is expressed as the product of the DC current Idc and the rectifying duty drec. In FIG. 12, the rectifying duty drec in the receiving period T2 is 1 as shown in FIG. 11, thereby making the current irec1 agree with the DC current Idc in the receiving period T2. Thus, like the output amplitude modulation factor D, the current irec1 takes 1 at the beginning and the end of the receiving period T2 and has a waveform with a downwardly extending projection in the receiving period T2.

The current il in the receiving period T2 is set using formula (42). Thus, the current il takes 0 at the beginning and the end of the receiving period T2 and has a waveform with an upwardly extending projection in the receiving period T2. The amplitude of the current il is larger than that of the current irec1, so that the current irec as the sum of the currents il and irec1 also has a waveform with an upwardly extending projection in the receiving period T2.

In the feeding period T1, the rectifying duty drec conforms to the absolute value of a sine wave ($|\sin(\omega t)|$) (formula (18)). The DC current Idc is to ripple in the same manner as the output amplitude modulation factor D, so that the current irec1 as the product thereof becomes distorted compared to a sine wave in the feeding period T1. The current il is set at zero in the feeding period T1, so that the current irec becomes the same as the current irec1. This causes distortion of the current irec in the feeding period T1 compared to a sine wave.

The distortion of the current irec causes distortion of the input current Iin. This results from ripple of the DC current Idc shown in FIG. 12.

FIG. 16 shows the power Pin on the input side of the diode rectifier 3 and the power Pdc supplied to the inverter 5 that are determined under a condition same as that of FIG. 15. The power Pin is the product of the average voltage Vrec of FIG. 12 and the current irec of FIG. 15. The power Pdc is the product of the sum of the average voltages (Vrec+Vcc) of FIG. 12 and the DC current Idc of FIG. 15. The power Pdc is substantially constant as seen from FIG. 16, meaning that the control mentioned herein substantially eliminates power ripple of the power Pin.

Figure 17:
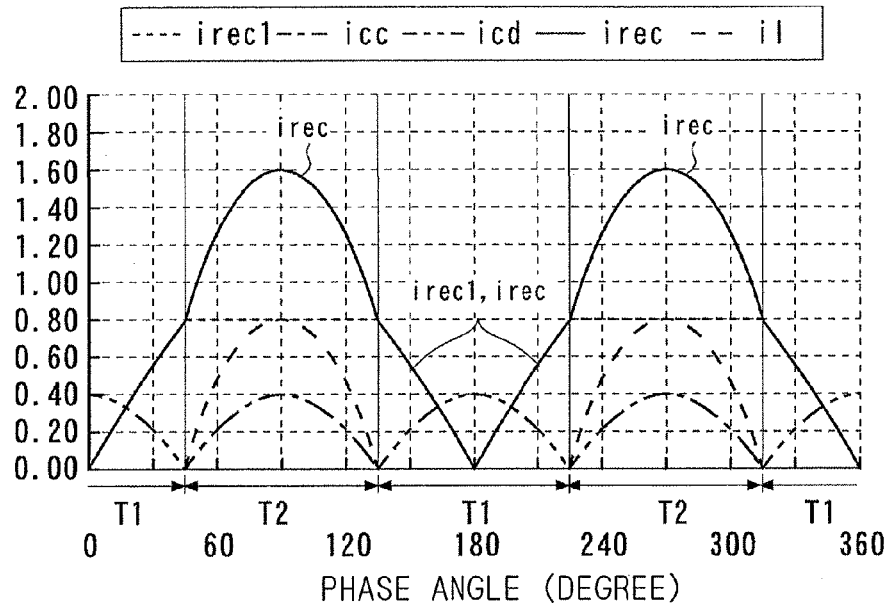
FIG. 17 is a graph illustrating a current in the direct power converter.
Figure 18:
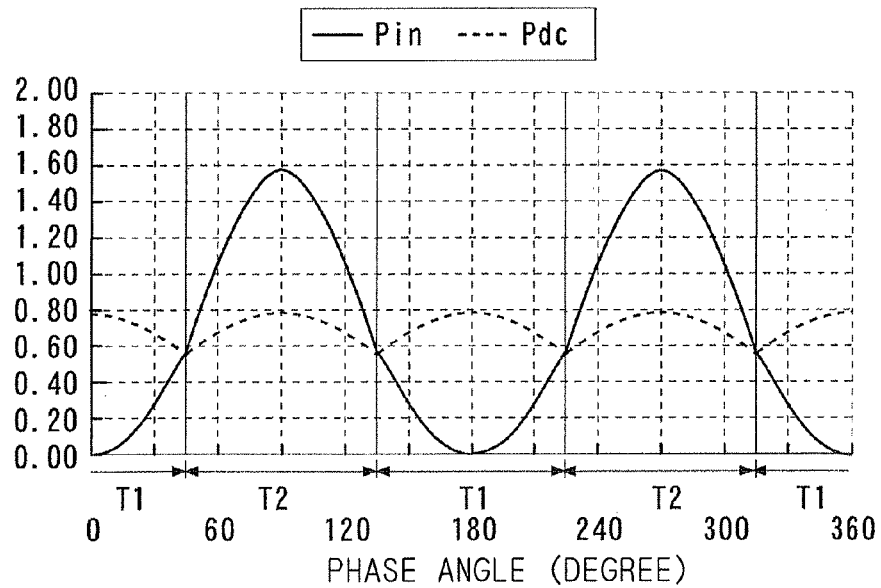
FIG. 18 is a graph illustrating a current in the direct power converter.

In FIGS. 17 and 18, a condition same as that of FIG. 15 is adopted. The equivalent DC voltage Vdc' of FIG. 13 ripples. Thus, controlling the inverter 5 such that the inductive load 6 becomes a resistance load makes the equivalent DC current Idc' ripple. Meanwhile, the DC current Idc is amplitude-modulated by the output amplitude modulation factor D relative to the equivalent DC current Idc', so that the DC current Idc takes a substantially constant value. This constant value can be derived from a relationship between power on the input side and power on the output side of the inverter 5 being the same. In FIG. 13, this constant value is $\pi/4$.

The rectifying duty drec conforms to a sine wave and the DC current Idc takes a substantially constant value in the feeding period T1, thereby making the current irec (=drec·Idc) conform to a sine wave.

Meanwhile, in the receiving period T2, the rectifying duty drec maintains 1. This maintains the current irec1 (=drec·Idc) at a constant value in this period. In the example of FIG. 17, the current irec1 is lower than the current irec1 of FIG. 15 at the beginning and the end of the receiving period T2. Meanwhile, the current irec1 is higher than the current irec1 of FIG. 15 at the center of the receiving period T2.

The current il of FIG. 17 is the same as the current il of FIG. 15 and takes a maximum at the center of the receiving period T2. Thus, compared to the current irec (=irec1+il) of FIG. 15, the current irec of FIG. 17 is reduced at the beginning and the end of the receiving period T2 and increases at the center of the receiving period T2. Specifically, the current irec becomes distorted compared to a sine wave in the receiving period T2.

The power Pdc ripples as shown in FIG. 18. This results from ripple of the sum of the average voltages (Vrec+Vcc) while the DC current Idc maintains a substantially constant value. A maximum of the power Pin is larger than that of FIG. 16. This results from increase in the current irec1 at the center of the receiving period T2.

As shown for example in FIG. 17, increase in the amplitude of the current irec (=|Iin|) increases the amplitude of the input current Iin. This makes the value of the aforementioned amplitude Im disagree with the amplitude of the input current Iin. The amplitude Im mentioned herein is a wave height value determined by converting the input current Iin to a sine wave relative to an effective value of the input current Iin. As an example, a sine wave having the same cycle as the input current Iin and having an effective value same as a time average of the square of the input current Iin (average of one cycle) can be understood as the converted sine wave.

Figure 19:
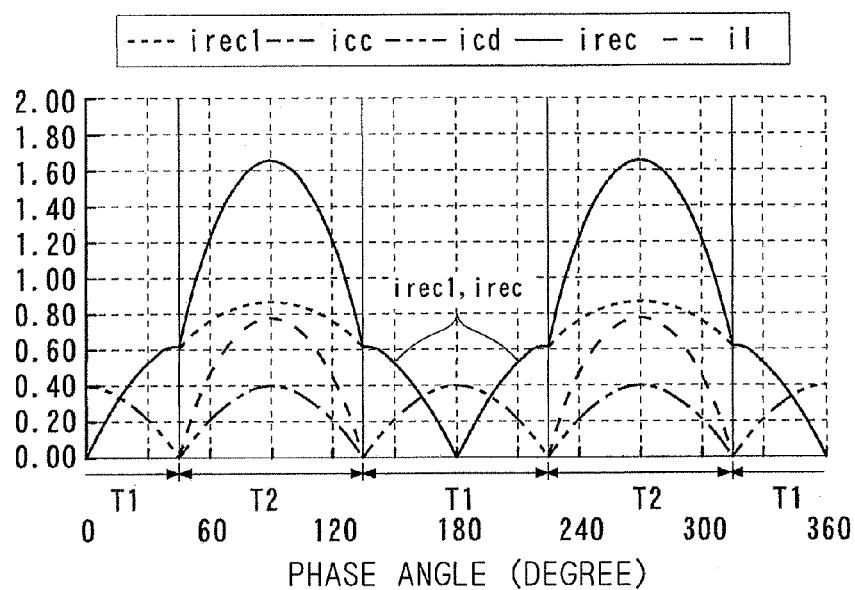
FIG. 19 is a graph illustrating a current in the direct power converter.
Figure 20:
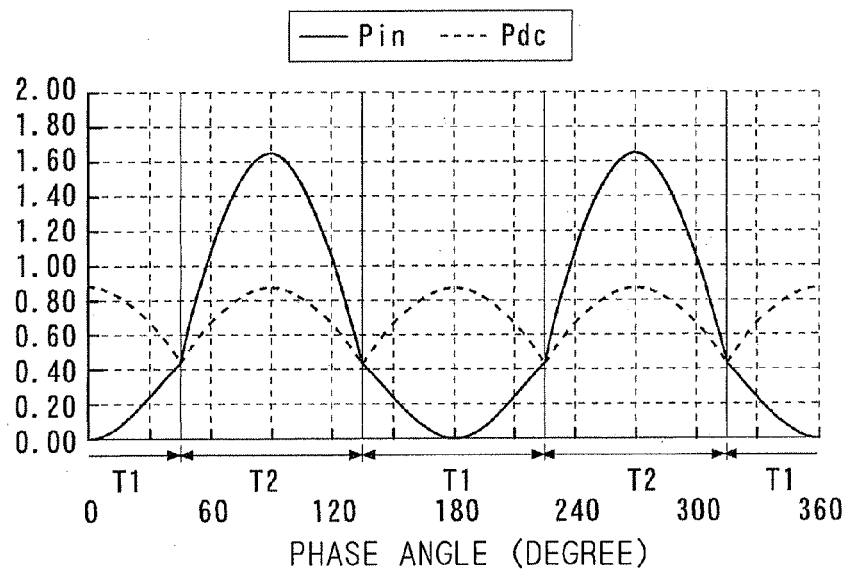
FIG. 20 is a graph illustrating a current in the direct power converter.

In FIGS. 19 and 20, a condition same as that of FIG. 14 is adopted. The output amplitude modulation factor D of FIG. 14 is 1, so that the equivalent DC voltage Vdc' ripples in the same manner as the virtual DC link voltage Vdc. Thus, controlling the inverter 5 such that the inductive load 6 becomes a resistance load makes the equivalent DC current Idc' ripple in the same manner. This further makes the DC current Idc ripple in the same manner as the virtual DC link voltage Vdc. Specifically, the DC current Idc ripples depending on $(|\cos(\omega t)|)$ in the feeding period T1 while rippling depending on $(|\sin(\omega t)|)$ in the receiving period T2.

The amplitude of the DC current Idc is $\pi \cdot \pi/8\sqrt{2}$.

The rectifying duty drec maintains 1 in the receiving period T2. This makes the current irec1 ripple in the same manner as the DC current Idc in the receiving period T2. In the example of FIG. 19, the current irec1 is higher than the current irec1 of FIG. 17 at the center of the receiving period T2 and lower than the current irec1 of FIG. 17 at the beginning and the end of the receiving period T2. This makes the current irec higher than the current irec of FIG. 17 at the center of the receiving period T2 and lower than the current irec of FIG. 17 at the beginning and the end of the receiving period T2. As a result, the current irec becomes distorted further than the current irec of FIG. 17.

In the feeding period T1, the rectifying duty drec is proportionate to a sine wave. Meanwhile, the aforementioned ripple of the DC current Idc causes distortion of the current irec.

The current irec is distorted further in this way to cause further distortion of the input current Iin. This results from ripple of the DC current Idc shown in FIG. 14. As shown in FIG. 20, a maximum of the power Pin is increased further to make the power Pdc ripple in a wider range.

As descried above, according to this control method, ripple of the virtual DC link voltage Vdc distorts the input current Iin. This distortion becomes larger as the equivalent DC voltage Vdc' ripples more, in other words, as the output amplitude modulation factor D becomes closer to 1.

The input current Iin of any value satisfies regulation on a harmonic defined by IEC 61000-3-12 (regulation targeted to a unit exceeding 16 A per phase and not exceeding 75 A per phase). The input current Iin of each of FIGS. 15 and 17 satisfies regulation on a harmonic defined by IEC 61000-3-2 (A) (regulation targeted to a unit not exceeding 16 A per phase), as described below.

The current irec of each of FIGS. 15, 17, and 19 is the absolute value of the input current Iin. The input current Iin agrees with the current irec in a half cycle corresponding to a phase degree from zero to 180 degrees and with a value determined by multiplying the current irec by −1 in a half cycle corresponding to a phase angle from 180 to 360 degrees. A Fourier coefficient of this input current Iin is calculated to determine a harmonic component of the input current Iin.

As understood from the waveform of the current irec, the input current Iin is an odd function and does not have a DC component, so that an even-ordered harmonic component thereof is not considered. The rectifying duty drec, the current il, and the DC current Idc for defining the input current Iin are determined. Thus, the Fourier function can be calculated by a well-known method.

FIG. 21 shows the content and the effective value of a harmonic component of the input current Iin corresponding to that of FIG. 15. FIG. 22 shows the content and the effective value of a harmonic component of the input current Iin corresponding to that of FIG. 17. FIG. 23 shows the content and the effective value of a harmonic component of the input current Iin corresponding to that of FIG. 19.

As shown in these drawings, this control method can satisfy the regulation on a harmonic defined by IEC 61000-3-12. The input current Iin of each of FIGS. 15 and 17 can satisfy the regulation on a harmonic defined by IEC 61000-3-2(A).

If the output amplitude modulation factor D is set using formulas (40) and (41), an upper limit may be set on the value of y so as to satisfy regulation on a harmonic of the inductive load 6. This may be achieved for example by preparing a comparator to compare the value of y and the upper limit and a limiter to limit the value of y to the upper limit when the value of y exceeds the upper limit. This upper limit can be determined in advance by calculating a harmonic component in the aforementioned way while changing the value of y or by experiment.

Figure 24:
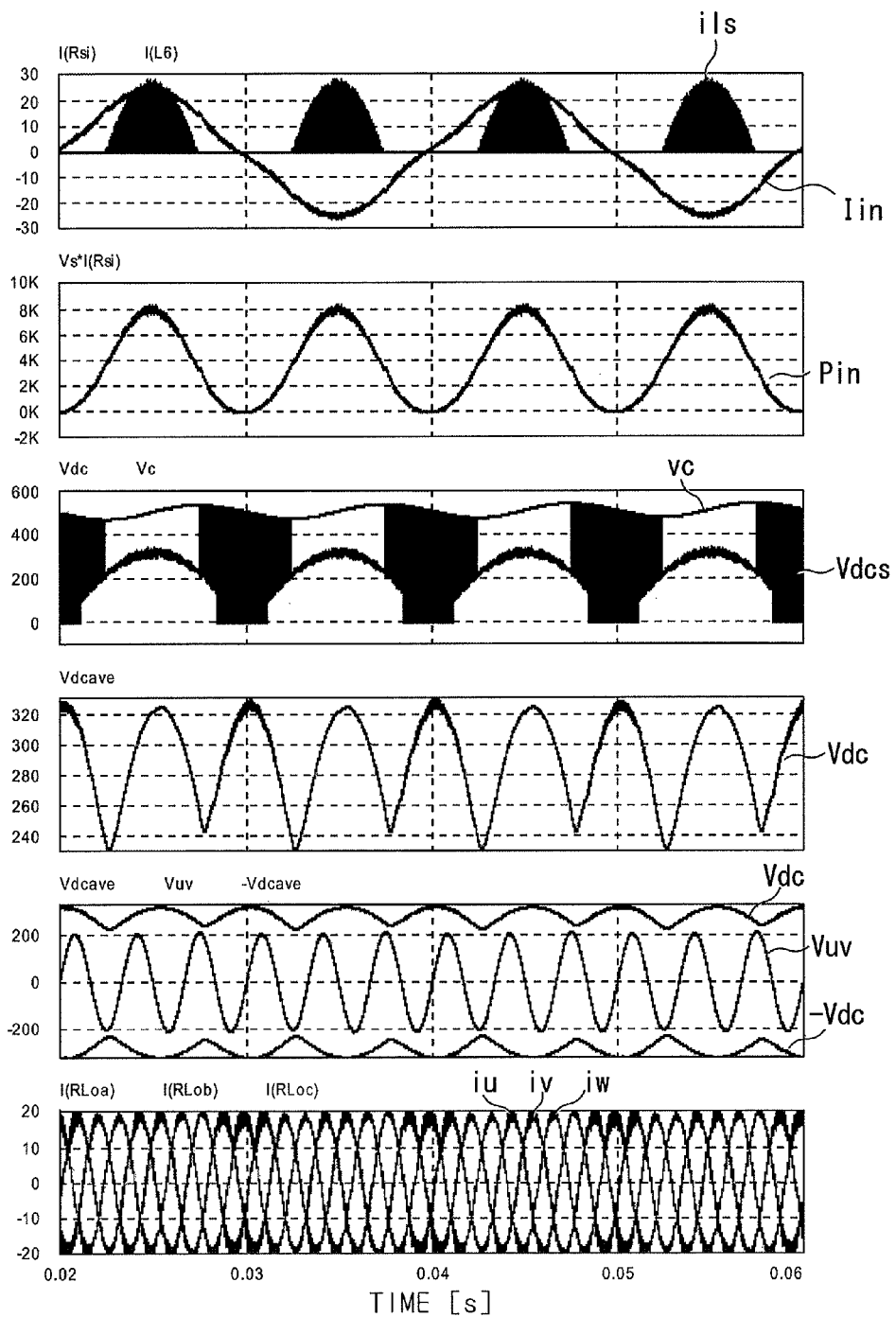
FIG. 24 is a graph illustrating quantities in the direct power converter.
Figure 25:
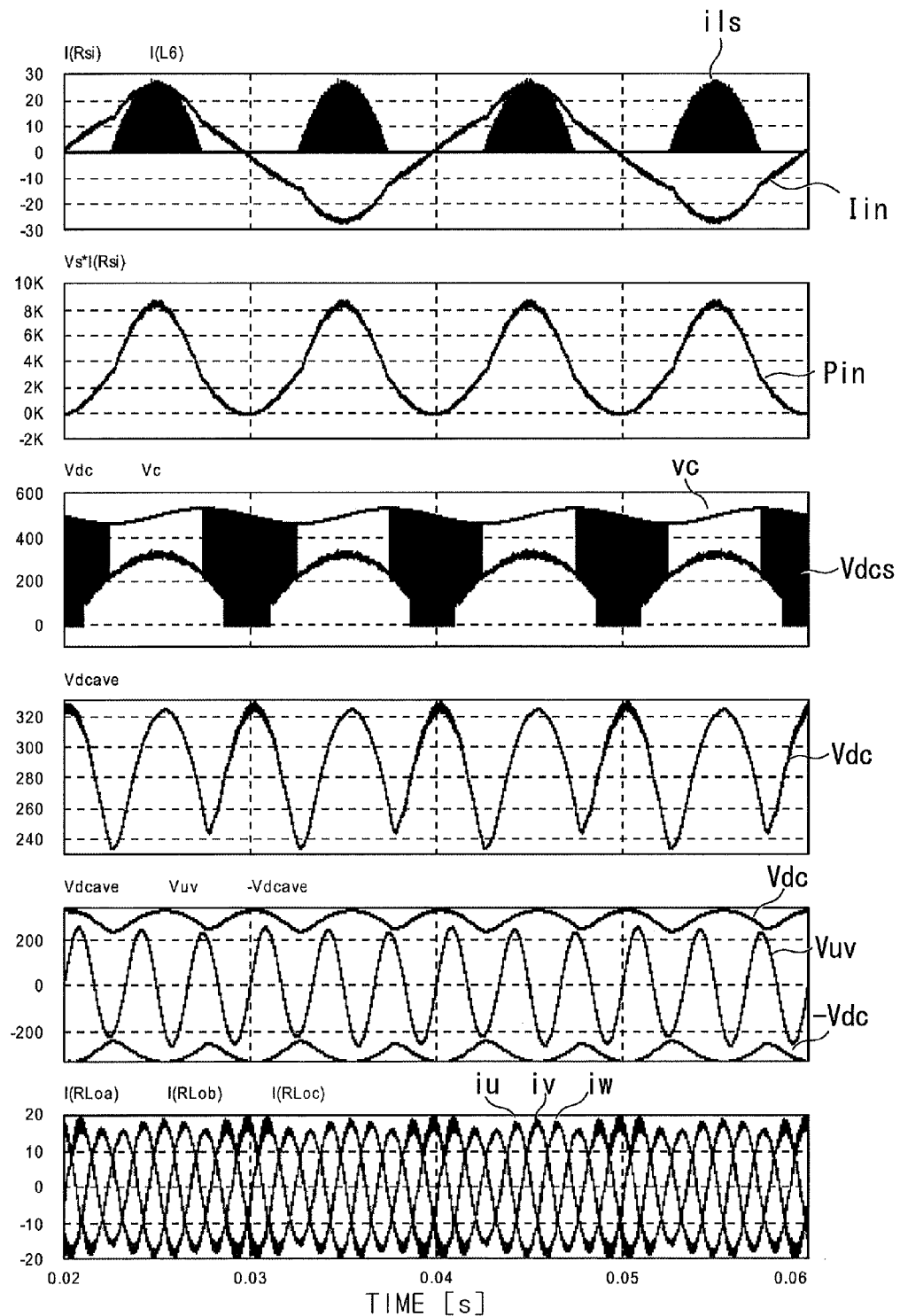
FIG. 25 is a graph illustrating quantities in the direct power converter.
Figure 26:
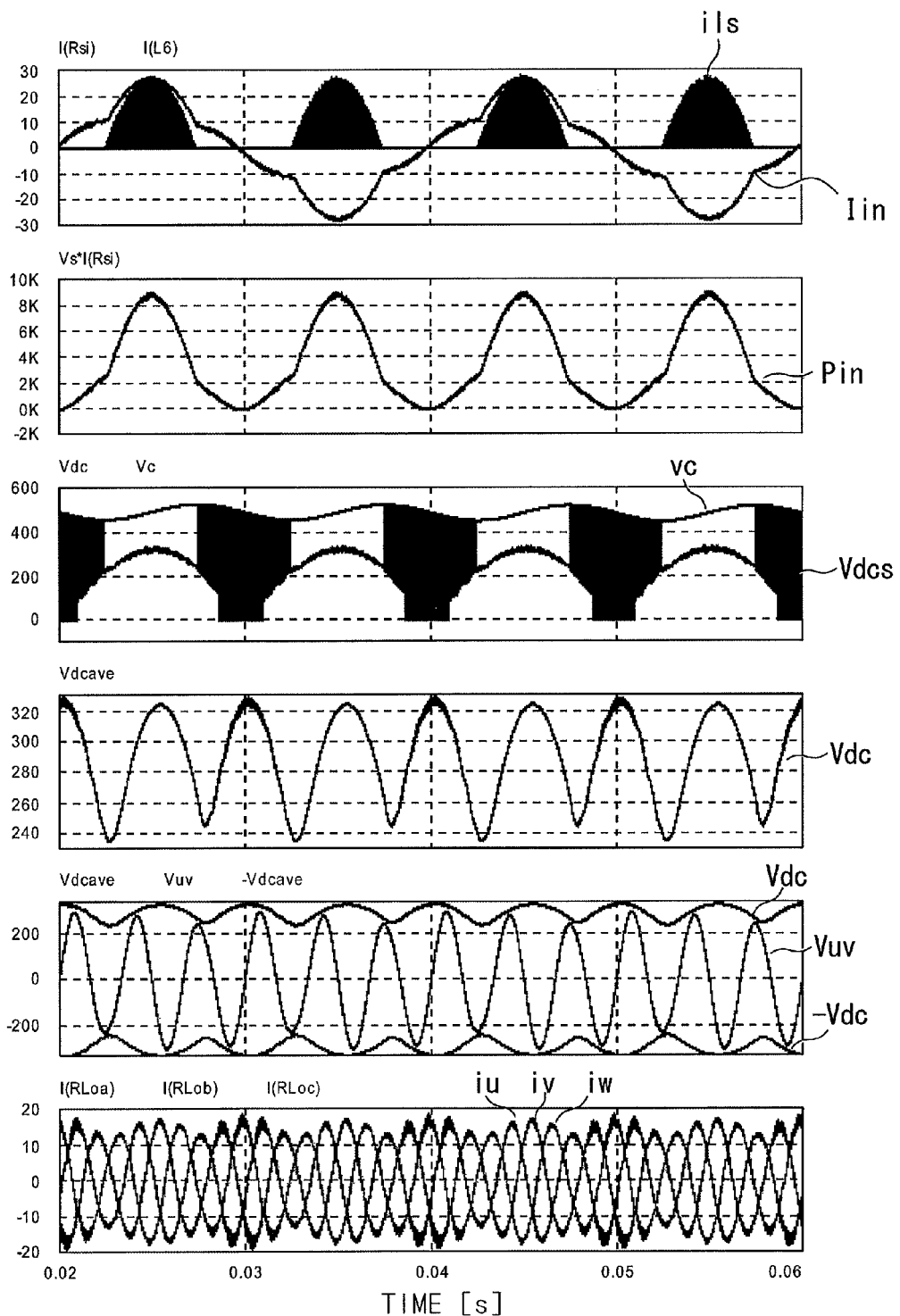
FIG. 26 is a graph illustrating quantities in the direct power converter.

For reference, results of simulation conducted by adopting the conditions of FIGS. 12 to 14 are shown in FIGS. 24 to 26 respectively. FIGS. 24 to 26 each show the input current Iin, the instantaneous value ils of the current il, the power Pin, the voltage vc, the virtual DC link voltage Vdc, an instantaneous value Vdcs of the virtual DC link voltage Vdc, a single-phase line voltage Vuv output from the inverter 5, and a line current iu, a line current iv, and a line current iw output from the inverter 5.

<Method of Achieving Two-Phase Full Waveform Theoretically>

FIG. 12 shows the virtual DC link voltage Vdc equivalent to a two-phase full waveform. In the below, a virtual DC link voltage agreeing with a two-phase full waveform theoretically is presented.

As described above by referring to FIGS. 11 and 12, in the receiving period T2, the duties drec, dc, and dz are set at 1, zero, and zero respectively. This can make the virtual DC link voltage Vdc in the receiving period T2 agree with a two-phase full waveform.

To make the input current Iin have a sine wave in the feeding period T1, the rectifying duty drec is set using formula (6). To reduce power ripple in the feeding period T1, the discharge duty dc is set using formula (7).

The virtual DC link voltage Vdc is expressed using the average voltage Vrec (=drec·|Vin|) and the average voltage Vcc (=dc·vc). Thus, in consideration of formulas (6) and (7), the virtual DC link voltage Vdc is expressed by the following formula:

$$Vdc = Vrec + Vcc \quad (45)$$
$$= \frac{Vm \cdot Im}{Idc}\sin^2(\omega t) + \frac{Vm \cdot Im}{2Idc} \cdot \cos(2\omega t)$$
$$= \frac{Vm \cdot Im}{2Idc}$$

Formula (45) is deformed to derive the following formula:

$$\frac{Im}{Idc} = \frac{2 \cdot Vdc}{Vm} \quad (46)$$

Formula (46) is substituted into formulas (6) and (7) to derive the following formulas:

$$drec = \frac{2 \cdot Vdc}{Vm}|\sin(\omega t)| \quad (47)$$

$$dc = \frac{Vdc}{vc}|\cos(\omega t)| \quad (48)$$

Specifically, the rectifying and discharge duties drec and dc set using formulas (47) and (48) respectively and the zero duty dz set using these duties drec and dc and formula (4) are used. Making the right side of formula (45) agree with Vm·cos(ωt) is required in order for the virtual DC link voltage Vdc to agree with a two-phase full waveform (Vm·cos(ωt)). Specifically, establishing Idc=Im/(2·cos(ωt)) is required. This allows the virtual DC link voltage Vdc to agree with the two-phase full waveform also in the feeding period T1.

FIG. 27 shows the duties drec, dc, and dz thereby set. FIG. 28 shows the average voltages Vrec and Vcc and the sum of the average voltages (Vrec+Vcc) (specifically, virtual DC link voltage Vdc) determined using these duties drec, dc, and dz.

In this case, the inverter 5 is controlled with the output amplitude modulation factor D described by referring to FIG. 12. This can make the equivalent DC voltage Vdc' constant. Further, controlling the inverter 5 such that the inductive load 6 becomes a resistance load makes the equivalent DC current Idc' substantially constant. The DC current Idc is expressed by formula (44). Thus, controlling the inverter 5 such that the inductive load 6 becomes a resistance load makes the DC current Idc substantially agree with the output amplitude modulation factor D in FIG. 12, thereby causing the DC current Idc to flow that satisfies Idc=Im/(2·cos(ωt)).

FIG. 29 shows the input current Iin, the discharge current icd, and the currents irec and il. The input current Iin of FIG. 29 has a shape conforming to a sine wave. FIG. 30 shows the input power Pin, the power Pdc, and the transferred power Pbuf. A shown in FIG. 30, the power Pdc can be constant.

Second Embodiment

In the first embodiment, the discharge duty dc in the feeding period T1 is set using formula (32) and the rectifying duty drec in the feeding period T1 is set using formula (18) as an example (see FIG. 11). In this case, the zero duty dz in the feeding period T1 is expressed by the following formula using formula (4):

$$dz = 1 - \sqrt{2}\,|\sin(\omega t)| - \frac{Vm}{vc}\cos(2\omega t) \quad (49)$$

FIG. 31 shows the rectifying duty drec, the discharge duty dc, and the zero duty dz determined when the ratio of the voltage vc to the amplitude Vm (vc/Vm) is about 1.123. For the sake of simplicity, the voltage vc is considered to be constant in FIG. 31. In the example of FIG. 31, the zero duty dz takes a negative value in a certain initial period and a certain end period of the feeding period T1.

As understood from formula (49), the zero duty dz may take a negative value depending on the ratio (vc/Vm). As understood from the waveform of the zero duty dz in each of FIGS. 11 and 31, when a tangent to the zero duty dz tilts negatively at the end of the feeding period T1 (at the phase angle ωt of 45 degrees, for example), the zero duty dz is always positive in the feeding period T1. To determine the tilt of the zero duty dz at the phase angle ωt of 45 degrees, formula (49) is differentiated with respect to the phase angle ωt (also denoted by θ in the following formula) and the phase angle ωt=45 degrees is substituted into a result of this differentiation, thereby deriving the following formula:

$$\frac{\partial}{\partial \theta}(dz) = -\sqrt{2}\,|\cos(\pi/4)| + \frac{2Vm}{vc}\sin(\pi/2) \quad (50)$$

By substituting ∂/∂θ(dz)=0, vc/Vm=2 is derived. Thus, when the voltage vc is twice the amplitude Vm of the input voltage Vin or more, the zero duty dz always is positive in the feeding period T1. When the voltage vc is less than twice of the amplitude Vm, the zero duty dz takes a negative value. Alternatively, as shown in FIG. 27, the rectifying duty drec increased from the rectifying duty drec of FIG. 12 may make the zero duty dz take a negative value.

Figure 32:
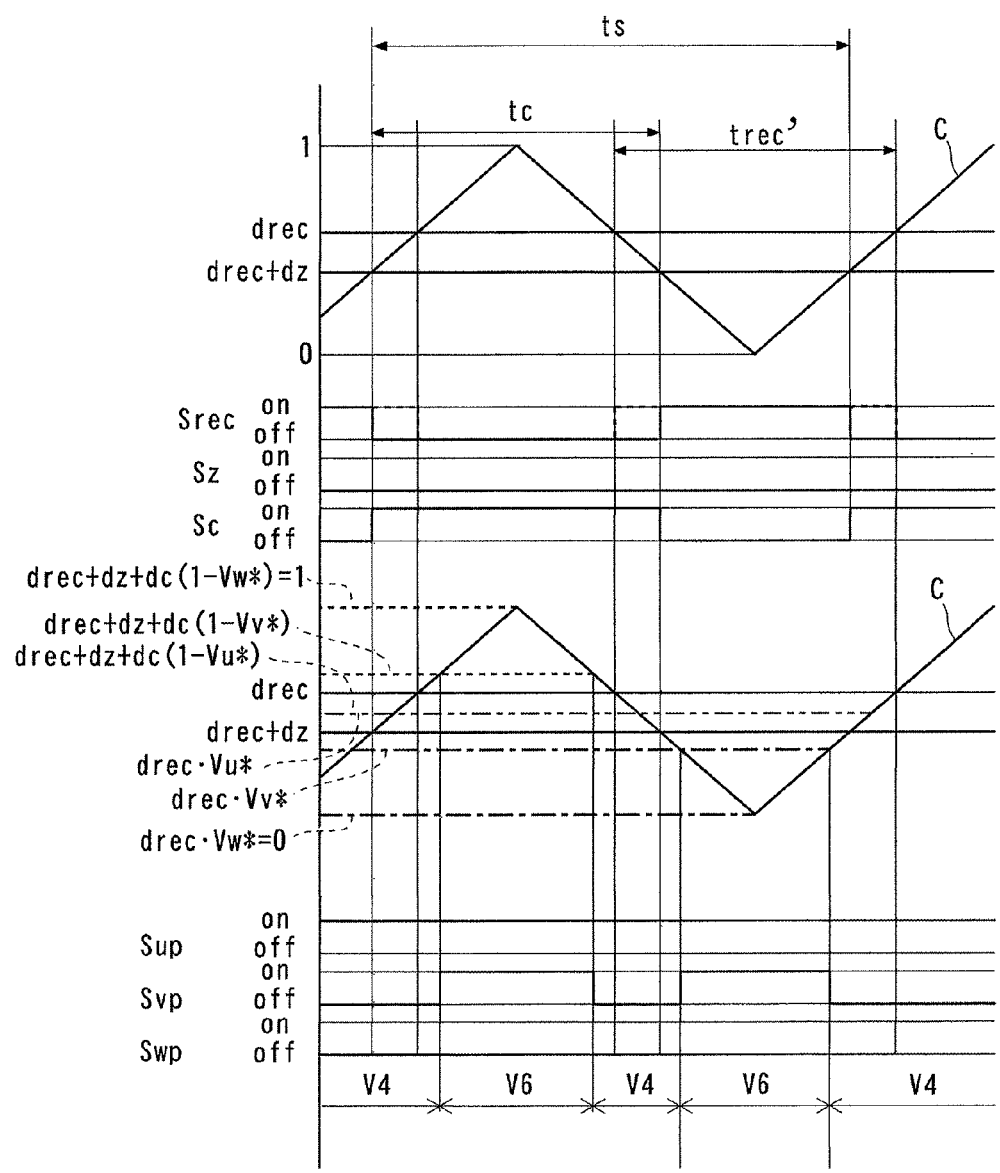
FIG. 32 is a timing chart explaining operation of the direct power converter in the feeding period.

FIG. 32 is a timing diagram illustrating how the direct power converter operates when the zero duty dz is negative. The timing diagram of FIG. 32 is similar to the timing diagram of FIG. 5. Meanwhile, in FIG. 32, the rectifying and discharge duties drec and dc are set using formulas (18) and (32) respectively.

The zero duty dz mentioned herein is negative, so that the sum of the rectifying and zero duties drec and dz (drec+dz) is smaller than the rectifying duty drec.

The conventional control is adopted in the description given herein. First, the switch Sc is made to conduct in a period when the carrier C is a value (drec+dz) or more.

The switching element Sup is made to conduct with the carrier C of drec·Vu* or less. The switching element Svp is made to conduct with the carrier C of drec·Vv* or less. The switching element Swp is made to conduct with the carrier C of drec·Vw* or less. As a result of this control, a part of the triangular wave of the carrier C taking a value from 0 to drec is divided internally by the phase voltage commands Vu*, Vv*, and Vw*.

The switching element Sup is made to conduct with the carrier C of drec+dz+dc·(1−Vu*) or more. The switching element Svp is made to conduct with the carrier C of drec+dz+dc (1−Vv*) or more. The switching element Swp is made to conduct with the carrier C of drec+dz+dc·(1−Vw*) or more. As a result of this control, a part of the triangular wave of the carrier C taking a value from drec+dz to 1 is divided internally by the phase voltage commands Vu*, Vv*, and Vw*.

Although not shown in FIG. 32, the switch Sl is made to conduct in the manner described by referring to FIG. 5, for example.

As illustrated in FIG. 32, this control makes the switching element Sup keep conducting in a period ts. Meanwhile, 0 is adopted as the phase voltage command Vw* in this example, so that the switching element Swp keeps non-conducting in the period ts. Thus, in the example of FIG. 32, a zero-voltage vector is not output in the period ts. In FIG. 32, the voltage vectors V4, V6, V4, V6, and V4 are output in this order.

This is for the reason as follows. According to the conventional control, a part of the triangular wave of the carrier C taking a value from 0 to drec is divided internally by Vu*, Vv*, and Vw*. Meanwhile, in the case that the zero duty dz is negative, a period trec' when the carrier C takes a value from 0 to drec partially overlaps a part of the period tc when the carrier C takes a value from drec+dz to 1. Dividing these overlapping periods trec' and tc internally by the phase voltage commands Vu*, Vv*, and Vw* makes it impossible to internally divide the conducting period of each of the switching elements Su, Sv, and Sw properly in the periods tc and trec. This for example makes the switching element Sup keep conducting in the period ts as illustrated in FIG. 32.

Thus, according to the aforementioned control, a conventional triangular wave is not to be compared to the phase voltage commands Vu*, Vv*, and Vw*, so that a larger phase voltage is output. In response, the current irec1 flowing from the diode rectifier 3 into the inverter 5 increases to distort the current irec. This causes distortion of the input current Iin.

Figure 33:
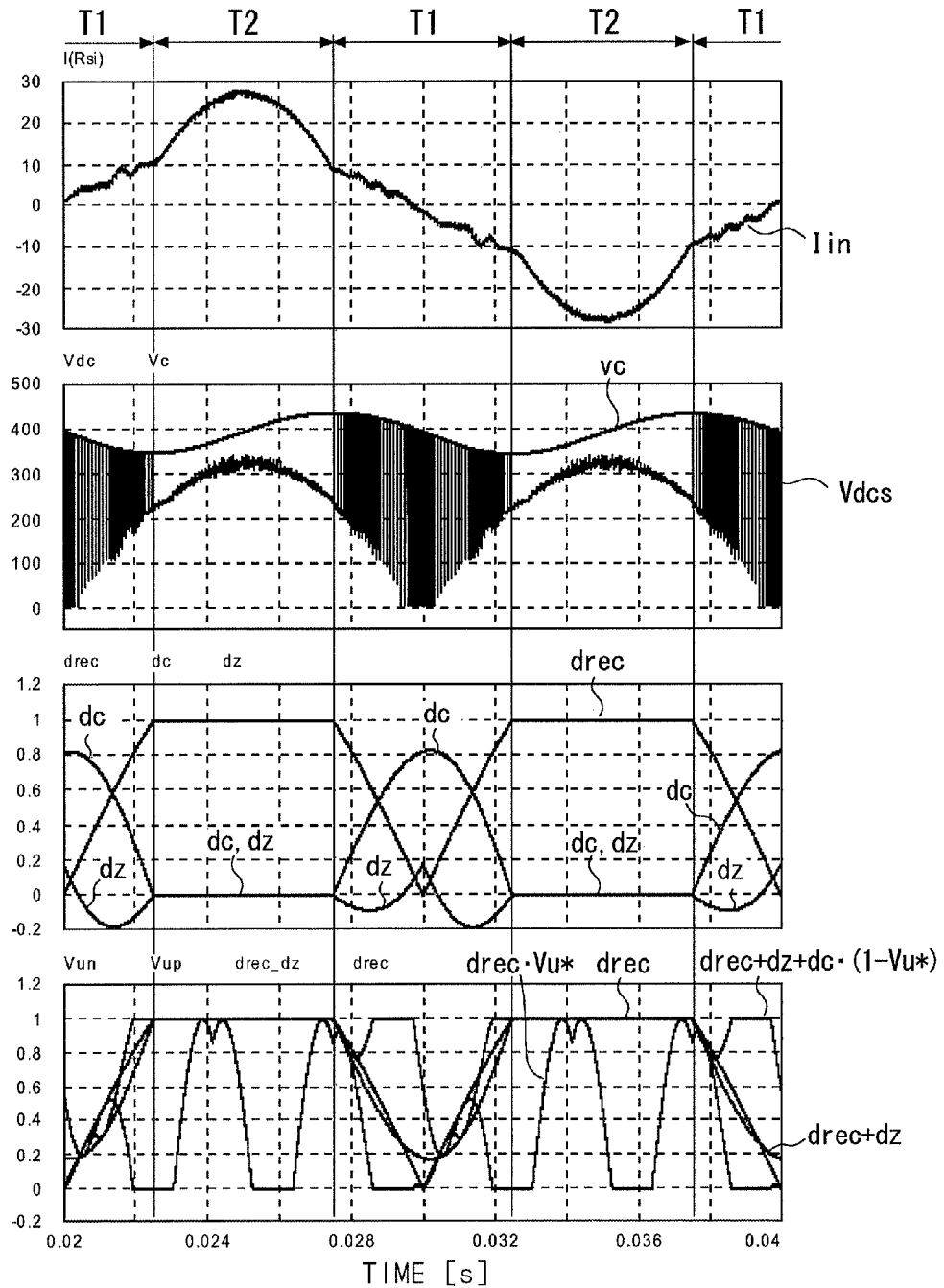
FIG. 33 is a graph illustrating quantities in the direct power converter.

FIG. 33 shows respective examples of the input current Iin, the instantaneous value Vdcs, the voltage vc, the duties drec, dz, and dc, the sum of the duties drec and dz (drec+dz), and a value drec·Vu* and a value (drec+dz+dc·(1−Vu*)) that are signal waves to be compared to the carrier C. These values are responsive to the situation illustrated in FIG. 32.

The voltage vc is shown to ripple in this example. The capacitor C4 is discharged in the feeding period T1 to reduce the voltage vc in this period. The capacitor C4 is charged in the receiving period T2 to increase the voltage vc in this period. As a result, the voltage vc ripples in a cycle corresponding to a half cycle of the input voltage Vin.

As illustrated in FIG. 33, the value drec·Vu* can be the same as the value (drec+dz+dc·(1−Vu*)) or more in a period when the zero duty dz takes a negative value. In this period, the switching element Sup keeps conducting in the period ts to output a large phase voltage. This causes distortion of the input current Iin.

A second embodiment is intended to suppress distortion of the input current Iin caused by the zero duty dz taking a negative value. The zero duty dz takes a negative value not only from the aforementioned cause. In other words, a technique of the second embodiment described below does not regard the first embodiment as a precondition.

In the second embodiment, it is determined whether the zero duty dz is positive or negative. When the zero duty dz is positive, the direct power converter is controlled in the conventional way. Specifically, when the zero duty dz is higher than zero, the following operations are performed: (i) the switch Sc is made to conduct and a switching signal with a pulse width modulated in the period tc determined by multiplying the cycle ts and the discharge duty dc is applied to the inverter 5; (ii) a switching signal with a pulse width modulated in the period trec determined by multiplying the cycle ts and the rectifying duty drec is applied to the inverter 5; and (iii) the inverter 5 is made to operate based on a zero-voltage vector in the period tz determined by multiplying the cycle ts and the zero duty dz.

As a more specific example, the switch Sc is made to conduct in a period when the carrier C is the same as the value (drec+dz) or more, the switching element Sup is made to conduct when the carrier C is the same as drec+dz+dc·(1−Vu*) or more, the switching element Svp is made to conduct when the carrier C is the same as drec+dz+dc·(1−Vv*) or more, and the switching element Swp is made to conduct when the carrier C is the same as drec+dz+dc·(1−Vw*) or more. Further, the switching element Sup is made to conduct when the carrier C is the same as drec·Vu* or less, the switching element Svp is made to conduct when the carrier C is the same as drec·Vv* or less, and the switching element Swp is made to conduct when the carrier C is the same as drec·Vw* or less.

When the zero duty dz is negative, the period trec is derived in a different way. Specifically, according to the conventional control, the period trec is determined by multiplying the cycle ts and the rectifying duty drec. Here, the period trec is determined by multiplying the sum of the rectifying and zero duties drec and dz (drec+dz) and the cycle ts. A switching signal with pulse widths modulated in the period trec (=(drec+dz)·ts), is applied to the inverter 5. The product of the cycle ts and the zero duty dz is negative when the zero duty dz is negative, so that the period tz is considered to be non-existent.

In summary, when the zero duty dz is negative, (i) the switch Sc is made to conduct and a switching signal with a pulse width modulated in the period tc determined by multiplying the cycle ts and the discharge duty dc is applied to the inverter 5; and (ii') a switching signal with a pulse width modulated in the period trec determined by multiplying the sum of the rectifying and zero duties drec and dz (drec+dz) and the cycle ts is applied to the inverter 5 in this period tree as a carrier cycle.

Figure 34:
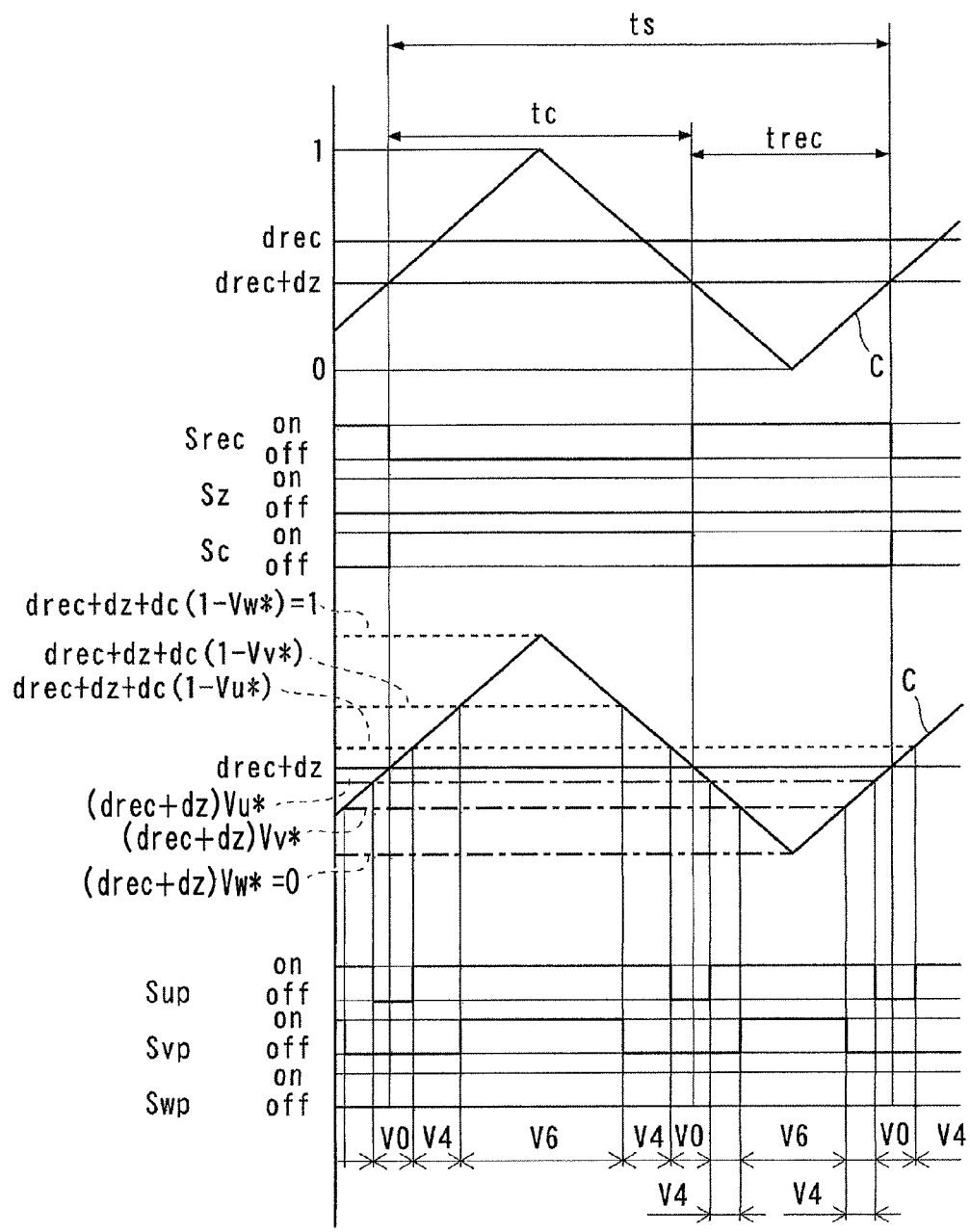
FIG. 34 is a timing diagram explaining operation of the direct power converter in the receiving period.

More specifically, as shown for example in FIG. 34, the switching element Sup is made to conduct when the carrier C is the same as the value (drec+dz)·Vu* or less, the switching element Svp is made to conduct when the carrier C is the same as the value (drec+dz)·Vv* or less, and the switching element Swp is made to conduct when the carrier C is the same as the value (drec+dz)·Vw* or less. Specifically, the product of the sum of the rectifying and zero duties drec and dz (drec+dz) and each of the phase voltage commands Vu*, Vv*, and Vw* is compared to the carrier C to generate a switching signal, which is applied to the inverter 5.

This allows comparison between the conventional triangular wave and each of the phase voltage commands Vu*, Vv*, and Vw* in the period tree. As a result, in the example of FIG. 34, the voltage vectors V0, V4, V6, V4, and V0 are output in this order properly in the period trec. The voltage vectors V0, V4, V6, and V0 are output in this order properly also in the period tc.

Figure 35:
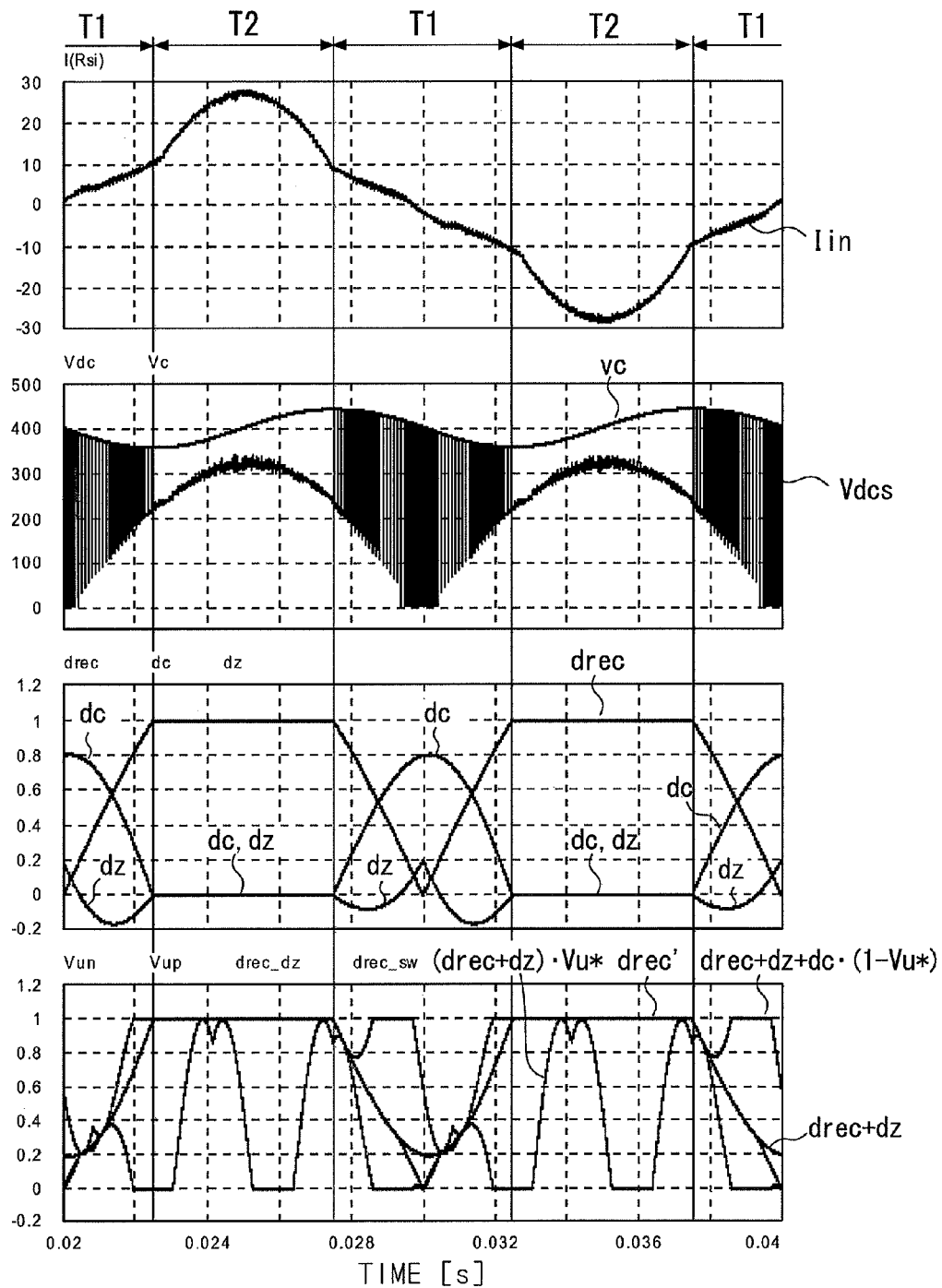
FIG. 35 is a graph illustrating quantities in the direct power converter.

FIG. 35 shows the respective examples of input current Iin, the instantaneous value Vdcs, the voltage vc, a virtual duty drec', the duties dz and dc, the sum of the duties drec and dz (drec+dz), and a signal wave to be compared to the carrier C. The virtual duty drec' is the same as the rectifying duty drec in a period when the zero duty dz is positive and as the sum (drec+dz) in a period when the zero duty dz is negative. Thus, the virtual duty drec' can be considered to be a substantial rectifying duty determined by this control. The substance of this control can be explained as corresponding to the following correction of the rectifying duty drec to be made when the zero duty dz takes a negative value. The rectifying duty drec is corrected by adding the zero duty dz to the rectifying duty drec before the correction.

As seen from FIG. 35, even in a period when the zero duty dz is negative, the value (drec+dz)·Vu* as a signal wave to be compared to the carrier C does not exceed the value (drec+dz+dc·(1−Vu*)). This allows output of a proper phase voltage in each of the periods tc and tree. As a result, distortion of the input current Iin can be suppressed.

The correction is made near a zero-crossing of an input current, thereby reducing influence on a harmonic current (a harmonic component of a frequency higher than the frequency of the distortion).

<Control Device>

Figure 36:
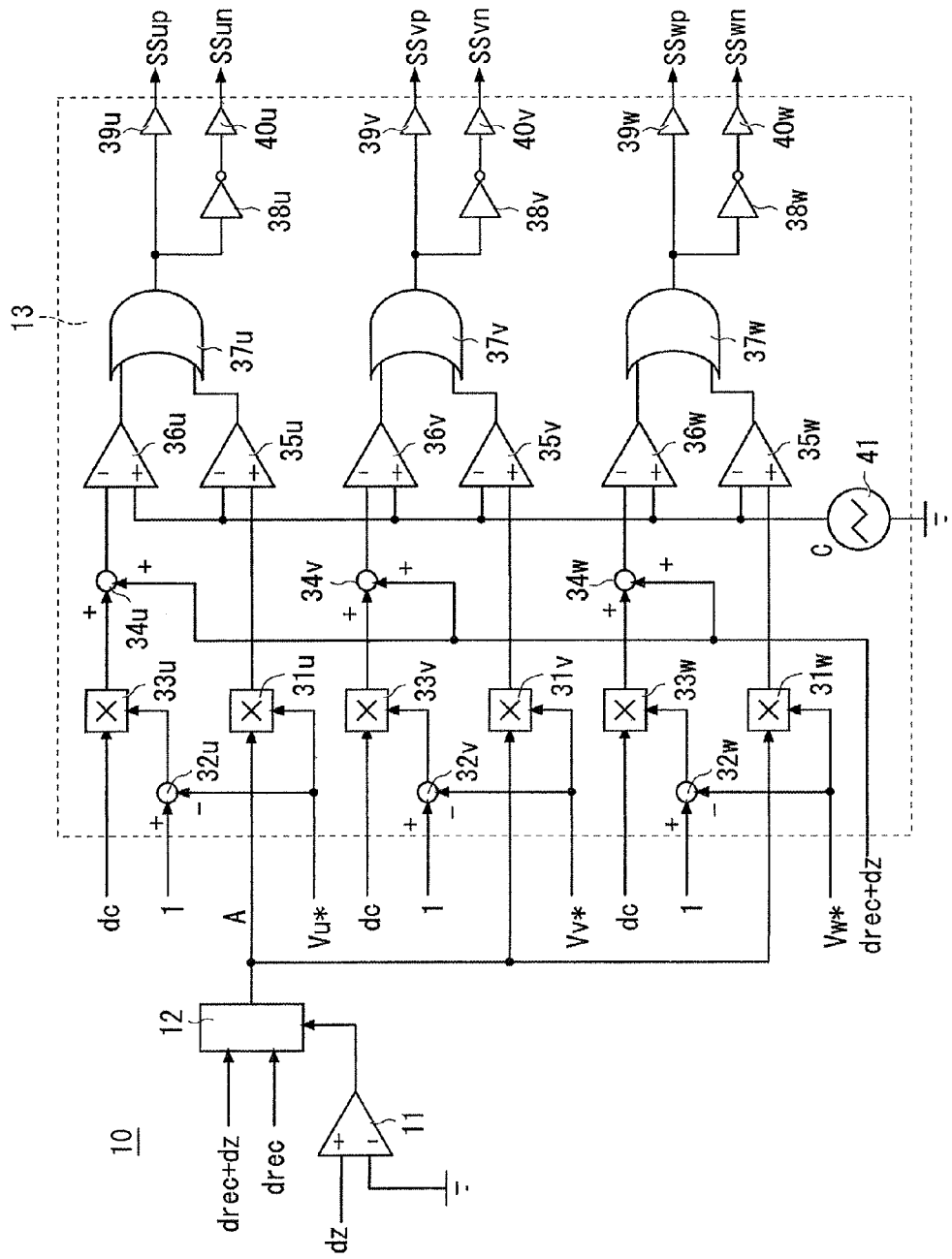
FIG. 36 is an example of a conceptual internal structure of a controller.

FIG. 36 shows an exemplary conceptual structure of a part of a controller 10 to generate a switching signal SSup, a switching signal SSvp, a switching signal SSwp, a switching signal SSun, a switching signal SSvn, and a switching signal SSwn to be applied to the switching elements Sup, Svp, Swp, Sun, Svn, and Swn respectively. The controller 10 includes a polarity determining unit 11, a selecting unit 12, and a switching signal generating unit 13. The polarity determining unit 11 inputs the zero duty dz to determine whether the zero duty dz is positive or negative. Then, the polarity determining unit 11 outputs a result of the determination to the selecting unit 12. The selecting unit 12 outputs the rectifying duty drec when the zero duty dz is positive and outputs the sum of the rectifying and zero duties drec and dz (drec+dz) when the zero duty is negative. The selecting unit 12 may output either the rectifying unit drec or the sum (drec+dz) when the zero duty dz is zero.

An output A of the selecting unit 12 is input to a multiplier 31u, a multiplier 31v, and a multiplier 31w. The multipliers 31u, 31v, and 31w multiply the phase voltage commands Vu*, Vv*, and Vw* respectively by the output A and output results of the multiplication to a comparator 35u, a comparator 35v, and a comparator 35w respectively. As a result, a value A·Vu*, a value A·Vv*, and a value A·Vw* are input to the comparators 35u, 35v, and 35w respectively.

The comparators 35u, 35v, and 35w input the carrier C from a carrier generator 41. The comparators 35u, 35v, and 35w compare A·Vu*, A·Vv*, and A·Vw* respectively to the carrier C. As an example, the comparator 35u outputs an activated signal when the value A·Vu* is the same as the carrier C or less. This applies to the comparators 35v and 35w.

The phase voltage commands Vu*, Vv*, and Vw* are further input to a subtractor 32u, a subtractor 32v, and a subtractor 32w respectively. The subtractors 32u, 32v, and 32w subtract the phase voltage commands Vu*, Vv*, and Vw* respectively from 1 and output results of the subtraction to a multiplier 33u, a multiplier 33v, and a multiplier 33w respectively.

The multipliers 33u, 33v, and 33w multiply the outputs of the subtractors 32u, 32v, 32w respectively by the discharge duty do and output results of the multiplication to an adder 34u, an adder 34v, and an adder 34w.

The adders 34u, 34v, and 34w add the sum (drec+dz) to the outputs of the multipliers 33u, 33v, and 33w respectively and output results of the addition to a comparator 36u, a comparator 36v, and a comparator 36w respectively. As a result, the values (drec+dz+dc·(1−Vu*)), (drec+dz+dc·(1−Vv*)), and (drec+dz+dc·(1−Vw*)) are input to the comparators 36u, 36v, and 36w respectively.

The comparators 36u, 36v, and 36w input the carrier C from the carrier generator 41. The comparators 36u, 36v, and 36w compare the values (drec+dz+dc·(1−Vu*)), (drec+dz+dc·(1−Vv*)), and (drec+dz+dc·(1−Vw*)) respectively to the carrier C and output results of the comparison. As an example, the comparator 36u outputs an activated signal when the value (drec+dz+dc·(1−Vu*)) is the same as the carrier C or more. This applies to the comparators 36v and 36w.

The respective comparison results of the comparators 35u and 36u, those of the comparators 35v and 36v, and those of the comparators 35w and 36w are output to an OR part 37u, an OR part 37v, and an OR part 37w respectively. The OR parts 37u, 37v, and 37w each output a logical sum of the corresponding inputs.

The respective outputs of the OR parts 37u, 37v, and 37w are given as the switching signals SSup, SSvp, and SSwp via a buffer 39u, a buffer 39v, and a buffer 39w respectively.

The respective outputs of the OR parts 37u, 37v, and 37w are input to a NOT part 38u, a NOT part 38v, and a NOT part 38w respectively. The NOT parts 38u, 38v, and 38w output NOTs of the respective inputs. The respective outputs of the NOT parts 38u, 38v, and 38w are given as the switching signals SSun, SSvn, and SSwn via a buffer 40u, a buffer 40v, and a buffer 40w respectively.

Third Embodiment

A method of controlling the switch Sl in the booster circuit 4b is described in detailed in a third embodiment. In the first embodiment, the switch Sl is controlled in the discontinuous mode, for example. In the discontinuous mode, the switch Sl is switched from a non-conducting state to a conducting state after the instantaneous value ils of the current il flowing through the reactor L4 becomes zero (also see FIG. 3). This can suppress switching loss of the switch Sl and recovery loss of the diode D40.

In the third embodiment, the switch Sl in the booster circuit 4b is controlled by switching the critical mode and the discontinuous mode properly. In the critical mode, control is exerted so as to switch the switch Sl from a non-conducting state to a conducting state at a time when the current ils flowing through the reactor L4 becomes zero.

In the third embodiment, the current il is also set using formula (11), for example. Alternatively, the current il is set to be larger than that set by formula (11). In this case, the current il is set using formula (28), for example. The switch Sl is controlled such that the current il conforms to its the setting.

<Discontinuous Mode>

Control on the switch Sl in the discontinuous mode has already been explained and is not described in detail accordingly. In the discontinuous mode, the switch Sl is switched from a non-conducting state to a conducting state (turned off) after the current ils (instantaneous value) flowing through the reactor L4 becomes zero. In this case, the boosting duty dl is set using formula (16).

<Critical Mode>

In the critical mode, the switch Sl is switched from a non-conducting state to a conducting state at a time when the current ils flowing through the reactor L4 becomes zero. Thus, by referring to FIG. 3, $T=\Delta T1+\Delta T2$ is established in formulas (12) and (13). In this case, an integrated value of the switching cycle T of the switch Sl is expressed as $Ip \cdot T/2$, which is divided by the switching cycle T, thereby the current il can be obtained. The current il is expressed by the following formula accordingly:

$$il = Ip/2 \quad (51)$$

The peak value Ip corresponds to the current ils determined when $t=\Delta T1$ is established. Thus, the peak value Ip is determined by substituting $t=\Delta T1$ into formula (12). The determined peak value Ip is then deformed with respect to $\Delta T1$. Further, formula (51) is substituted into a result of the deformation to obtain the following formula:

$$\Delta T1 = \frac{2 \cdot il \cdot Lm}{Vin} \quad (52)$$

With the current il set in the aforementioned way, the conducting period $\Delta T1$ of the switch Sl in the critical mode is determined using formula (52).

<Selection of Mode>

A condition for switching between the critical mode and the discontinuous mode is described here. In terms of switching loss of the switch Sl and recovery loss of the diode D40, it is desirable that the switch Sl be switched to a conducting state when the current ils is zero. In this respect, adopting the discontinuous mode is desired. This is for the reason that the discontinuous mode can switch the second switch to a conducting state more reliably when the current ils is zero.

Meanwhile, it is desirable that the peak value Ip of the current ils flowing through the reactor L4 be small. This is for the reason that the small peak value Ip can reduce the current capacity of the reactor L4, thereby contributing to cost reduction and size reduction.

The discontinuous mode produces a period when the current ils is zero. In contrast, the critical mode ideally does not produce a period when the current ils is zero. Thus, with the same average (current il) in the switching cycle T, the peak value Ip in this switching cycle T is larger in the discontinuous mode than in the continuous mode. In the below, the peak value Ip in the discontinuous mode is considered by simulation.

Figure 37:
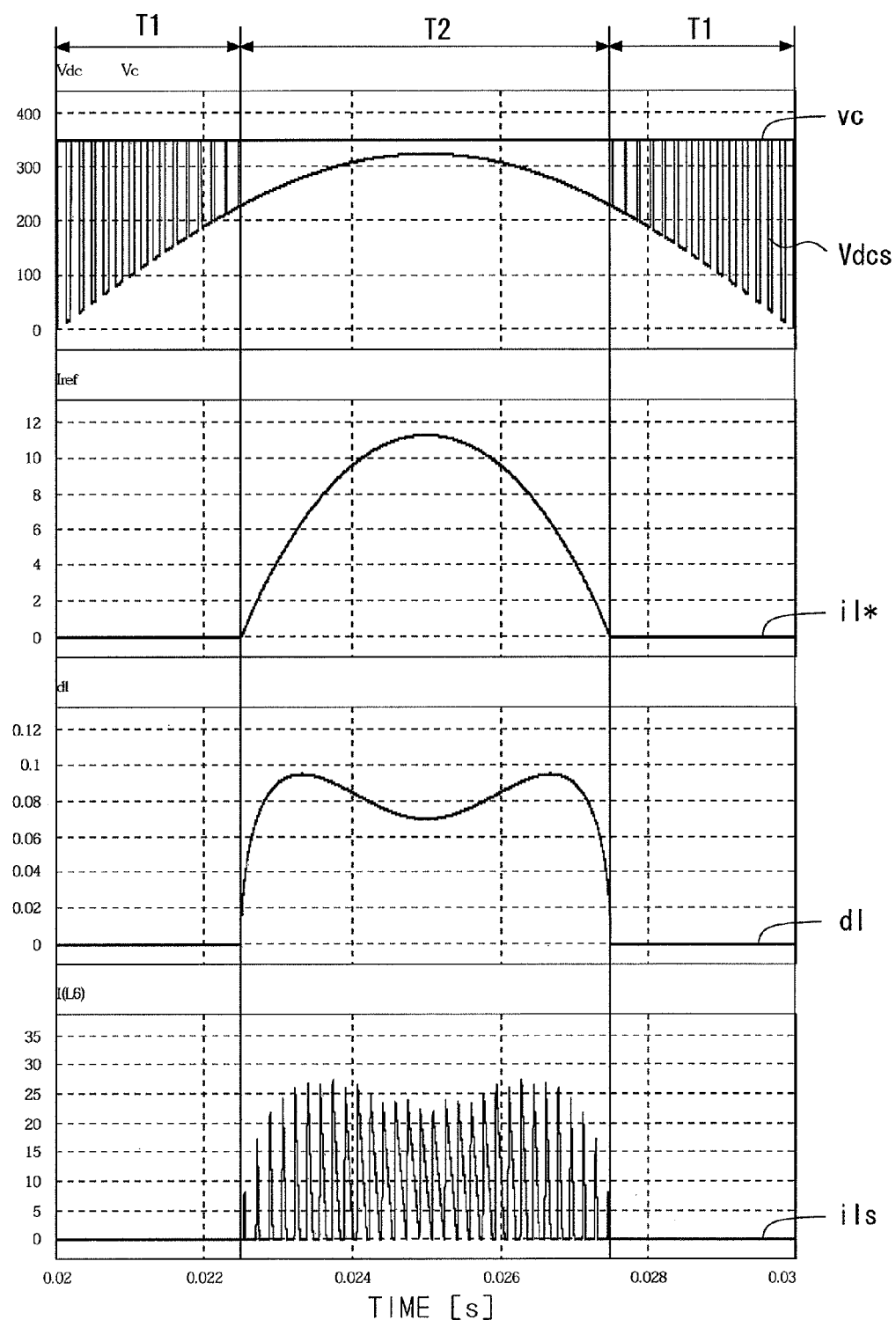
FIG. 37 is a graph illustrating quantities in the direct power converter.

As an example, FIG. 37 shows the instantaneous value Vdcs of a DC voltage between the DC power lines LH and LL, the across voltage vc of the capacitor C4 a current command il*, the boosting duty dl, and the current ils flowing through the reactor L4 that are determined by controlling the booster circuit 4b in the discontinuous mode. The current command il* mentioned herein is a command for an average of a current flowing through the reactor L4 (current il). The current il can be considered to be the same as the current command il*.

FIG. 37 shows a result of the simulation conducted with the switching cycle T (cycle ts of carrier) of $1/5900$ [sec], the amplitude Vm of $\sqrt{2} \times 230$ [V], the amplitude Im of $\sqrt{2} \times 16$ [A], the inductance Lm of 172 [μH], and the voltage vc of 350 [V].

In the feeding period T1, the switch Sc is turned on and off repeatedly based on the discharge duty dc (>0). Thus, as shown in FIG. 37, the instantaneous value Vdcs takes the voltage vd of the capacitor C4 when the switch Sc is conducting and takes the rectified voltage |Vin| rectified by the diode rectifier 3 when the switch Sc is non-conducting. In the receiving period T2, the switch Sc is non-conducting. Thus, the instantaneous value Vdcs always takes the rectified voltage |Vin| (not shown as a graph).

The current command il* takes zero in the feeding period T1 and has a waveform determined for example based on formula (11) or (28) in the receiving period T2. In the example of FIG. 37, this waveform is determined based on formula (11).

Figure 38:
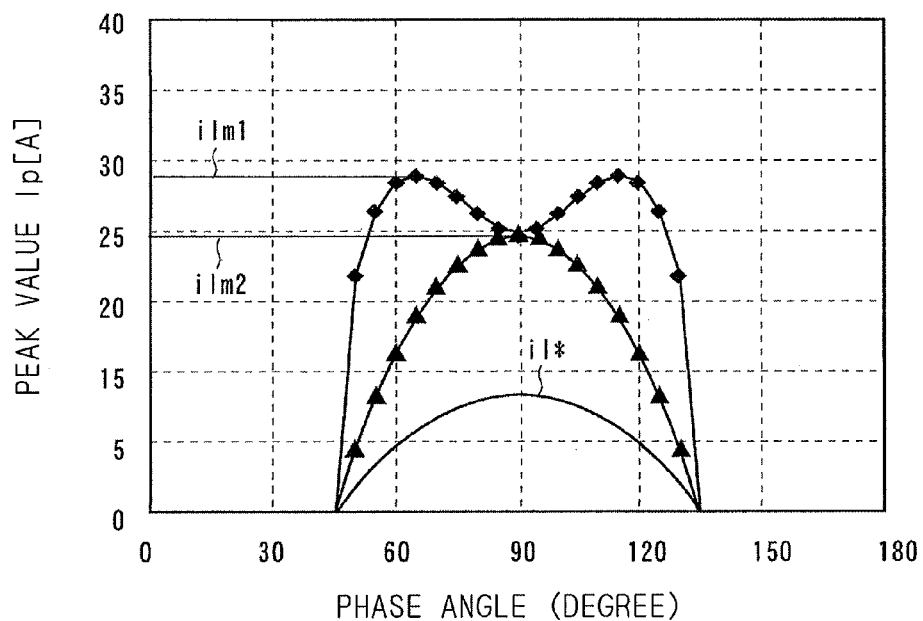
FIG. 38 is a graph illustrating a peak value of a current flowing through the reactor.

The boosting duty dl takes zero in the feeding period T1 and has a waveform determined based on formula (16) in the receiving period T2 (in formula (16), the current il is regarded as the current command il*). As illustrated in FIG. 37, the boosting duty dl increases further in a position farther from the center of the receiving period T2. After taking a maximum once, the boosting duty dl reduces to become zero at the beginning and the end of the receiving period T2. Adopting this boosting duty dl can make the current il substantially the same as the current command il*. In this case, the switch Sl is turned on and off repeatedly based on the boosting duty dl when the discontinuous mode is adopted. This causes the current ils (instantaneous value) through the reactor L4 to flow intermittently as shown in FIG. 37. FIG. 38 shows the peak value Ip of the current ils of FIG. 37 in the form of black rhombuses. This peak value Ip becomes larger as the conducting period $\Delta T1$ becomes longer, so that the waveform of the peak value Ip becomes the same as that of the boosting duty dl ($=\Delta T1/T$).

In the critical mode, the peak value Ip is twice the current command il* as seen from formula (51). This peak value Ip is shown in the form of black triangles in FIG. 38. In FIG. 38, the current command il* is shown by a solid line. In the example of FIG. 38, a maximum ilm1 of the peak value Ip in the discontinuous mode is about 1.2 times a maximum ilm2 of the peak value Ip in the critical mode.

The result given herein as an example is obtained when the inductance Lm is set so as to minimize the maximum ilm1 in the discontinuous mode. A method of setting the inductance Lm is described in detail later. Thus, the maximum ilm1 in the discontinuous mode is actually about 1.2 times the maximum ilm2 in the critical mode or more.

Figure 39:
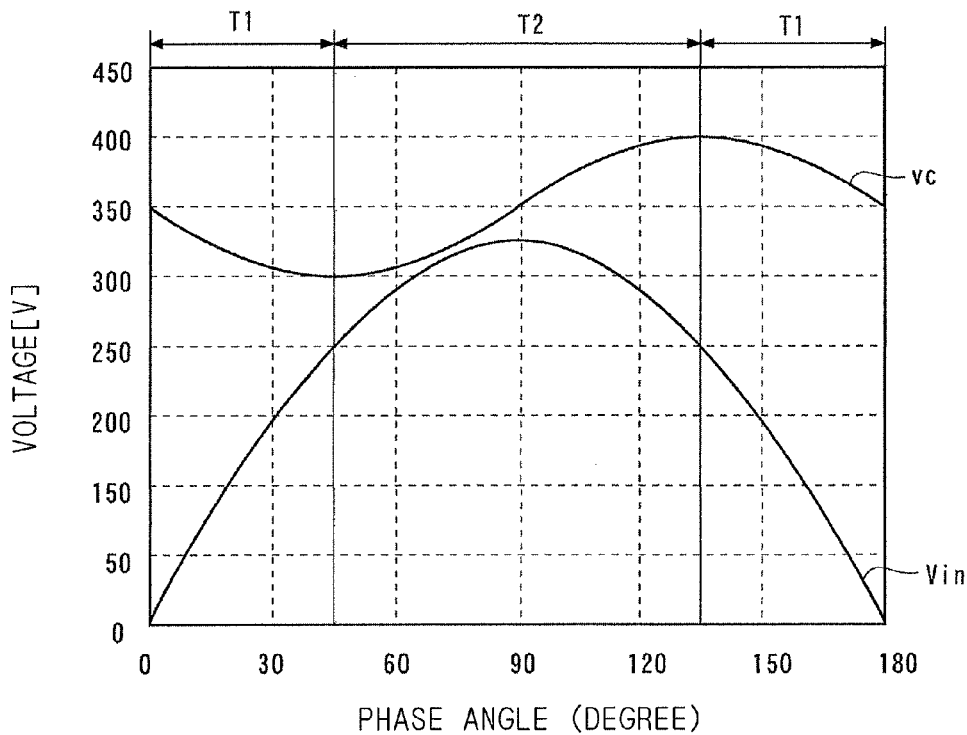
FIG. 39 is a graph illustrating an across voltage of a capacitor and a single-phase AC voltage.
Figure 40:
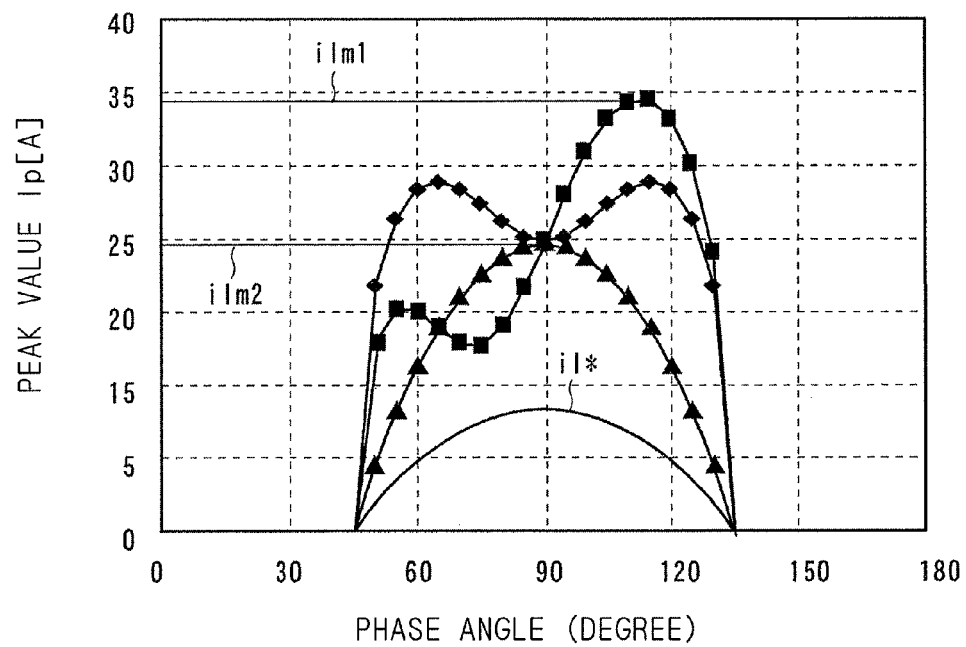
FIG. 40 is a graph illustrating an across voltage of a capacitor and a single-phase AC voltage.

For the sake of simplicity, the voltage vc is shown to be constant in the aforementioned example. Meanwhile, consideration is also given to the voltage vc to ripple as shown in FIG. 39. As understood from FIG. 3 and formula (13), the current ils flowing during the switch Sc is off tilts less as the voltage vc becomes smaller. As a result, in the same conducting period ΔT1, reduction in the voltage vc increases the current il. Conversely, in order for the current il not to be increased by the reduction in the voltage vc, the conducting period ΔT1 should be shorter in response to reduction in the voltage vc. As a result, ripple of the voltage vc is superimposed on the boosting duty dl and eventually, the ripple of the voltage vc is superimposed further on the peak value Ip (black rectangles of FIG. 40).

Thus, the ripple of the voltage vc increases the maximum ilm1 further in the discontinuous mode. Meanwhile, the peak value Ip does not depend on the voltage vc (formula (51)) in the critical mode, so that the peak value Ip is still the same as that of FIG. 38 in the presence of the ripple of the voltage vc.

For the foregoing reason, the maximum ilm1 in the discontinuous mode is larger than the maximum ilm2 in the critical mode.

Figure 41:
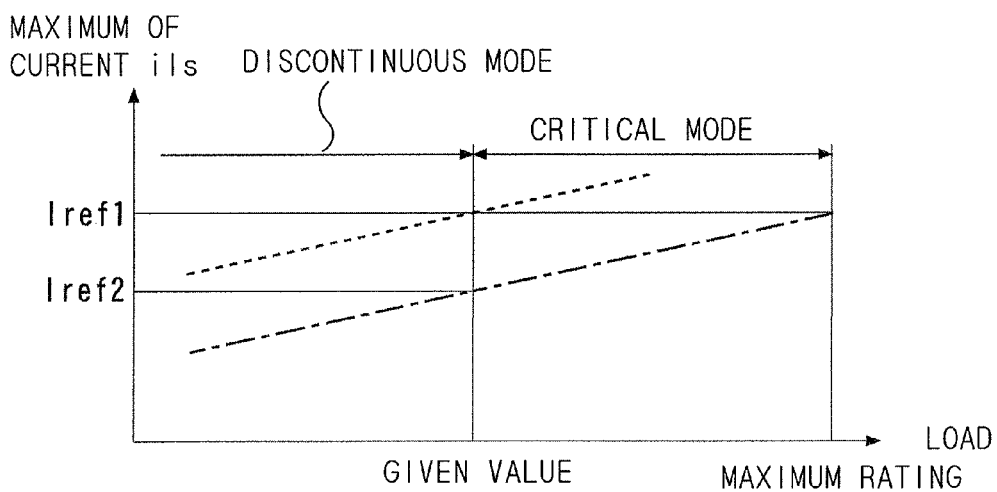
FIG. 41 is an explanation of switching between a critical mode and a discontinuous mode.

In this embodiment, as illustrated in FIG. 41, the discontinuous mode is adopted when a load of the inverter 5 is lower than a given value whereas the critical mode is adopted when the load of the inverter 5 is higher than the given value. In FIG. 41, the maximum ilm1 in the discontinuous mode is schematically shown by a dashed line and the maximum ilm2 in the critical mode is schematically shown by an alternate long and short dash line.

Specifically, when the load is low and the current il is small, a maximum of the peak value Ip is determined to be not so large even in the discontinuous mode. In this case, the discontinuous mode is adopted with the intention of reducing switching loss and recovery loss. Meanwhile, when the load is high and the current il is large, the critical mode is adopted to reduce this maximum. The maximum can be reduced in this way, so that the current capacity of the reactor L4 can be reduced. This achieves the size reduction and cost reduction of the reactor L4.

Further, the load of the inverter 5 can operate in a wider range than a range offered by the control method of adopting only the discontinuous mode when the direct power converter is to operate only in a range where the aforementioned maximum does not exceed an upper limit.

A magnitude relationship between the load of the inverter 5 and the given value may be determined based on a maximum of the current ils flowing through the reactor L4, for example. This is for the reason that in the same mode, the maximum becomes larger in response to increase in the load of the inverter 5.

The maximum of the peak value Ip may alternatively be determined based on a detected value of the current ils flowing through the reactor L4, for example. Still alternatively, the maximum of the peak value Ip may be calculated based on the current command il*.

As shown in FIG. 41, when the maximum ilm1 in the discontinuous mode is smaller than a current reference value Iref1, the discontinuous mode is adopted continuously. When the maximum ilm1 in the discontinuous mode becomes larger than the current reference value Iref1, the critical mode is adopted. The current reference value Iref1 is the same as or slightly smaller than the maximum ilm2 in the critical mode when the load of the inverter 5 becomes a maximum rating, for example.

As shown in FIG. 41, when the maximum ilm2 in the critical mode is larger than a current reference value Iref2 (<Iref1), the critical mode is adopted continuously. When the maximum ilm2 in the critical mode becomes smaller than the current reference value Iref2, the discontinuous mode is adopted. The current reference value Iref2 is the same as or slightly smaller than the maximum ilm2 determined when the critical mode is adopted with the maximum ilm1 in the discontinuous mode being the same as the current reference value Iref1. In other words, the current reference value Iref2 is a value not exceeding the maximum of the current ils through the reactor L4 determined when the critical mode is adopted with the load of the inverter 5 taking the given value.

As a result, the maximum of the current ils can be prevented from exceeding the upper limit. Further, making a switch between the critical mode and the discontinuous mode based on the maximum can prevent the maximum from exceeding the upper limit more properly.

<Timing of Mode Switching>

It is desirable that a mode be switched in a period when the booster circuit 4b is not controlled, specifically in the feeding mode T1 (see FIG. 42). FIG. 42 shows a mode selection signal SSm, the input current Iin, the current ils flowing through the reactor L4, the voltage vc, and the instantaneous value Vdcs of a DC voltage between the DC power lines LH and LL.

As an example, the discontinuous mode is selected when the mode selection signal SSm is inactive and the critical mode is adopted when the mode selection signal SSm is active. In FIG. 42, the activeness and inactiveness of the mode selection signal SSm is switched in the feeding period T1.

If a mode is switched in the receiving period T2 when the current ils flows, the current ils might be disturbed before or after the mode switching. Meanwhile, switching a mode in the feeding period T1 can avoid such a problem.

FIG. 42 shows the current ils flowing through the reactor L4. The maximum of the current ils flowing through the reactor L4 is shown to be reduced by switching from the discontinuous mode to the critical mode.

<Switching Frequency>

In the critical mode, the period ΔT1 when the switch Sl is conducting is expressed by formula (52). A relationship ils=0 is established when t=ΔT2 is established in formula (13), thereby establishing ΔT2=Vin·ΔT1/(vc−Vin). Specifically, the period ΔT2 when the switch Sl is non-conducting is determined depending on the period ΔT1. The period ΔT1 becomes longer with increase in the current il, so that the period ΔT2 also becomes longer with increase in the current il. Thus, in the critical mode, the switching cycle T (=ΔT1+ΔT2) of the switch Sl fluctuates in response to the current il and becomes longer with increase in the current il. In other words, a switching frequency in the critical mode becomes lower with increase in the current il. The current il takes a maximum when the load of the inverter 5 is the maximum rating and the phase angle ωt is 90 degrees (also see FIGS. 40 and 41), so that the switching frequency determined at this time takes a minimum.

Meanwhile, in the discontinuous mode, the switching cycle T can be a fixed value. Thus, a switching frequency can also be a fixed value.

A switching frequency in the discontinuous mode can be lower than a minimum of a switching frequency in the critical mode. As shown in FIG. 43, this can extend a range where the critical mode is adopted for the reason given below.

The conducting period ΔT1 (=dl·T) of the switch Sl in the discontinuous mode becomes longer as the switching cycle T becomes longer, so that the peak value Ip becomes larger as a switching frequency becomes lower (as the cycle T becomes longer). Thus, the maximum ilm1 also becomes larger as the switching frequency becomes lower. Specifically, the maximum ilm1 (dashed line) of FIG. 41 in the discontinuous mode moves upward further with increase in the switching cycle T. This reduces the load of the inverter 5 further when the maximum ilm1 takes the current reference value Iref1 in the discontinuous mode as shown in FIG. 43, thereby extending an operating range in the critical mode.

In the critical mode, a switching frequency fluctuates in response to the current il, so that the value of the switching frequency is dispersed. This reduces a specific switching frequency to become a cause for noise of the reactor L4. Thus, extending the operating range in the critical mode reduces the noise of the reactor L4 as a whole.

Alternatively, the switching frequency in the discontinuous mode can be higher than the minimum of the switching frequency in the critical mode. This can extend a range where the discontinuous mode is adopted. As a result, the discontinuous mode can be adopted not only under a light load but also under a middle load.

In the critical mode, a switching frequency is determined in response to the current il. In the discontinuous mode, a switching frequency can be a fixed value. This fixed value can control the frequency of occurrence of switching loss, thereby enhancing efficiency. Thus, extending the operating range in the discontinuous mode contributes to enhanced efficiency under a middle load and a light load.

In terms of reducing the maximum of the current ils, the fixed value of the switching frequency in the discontinuous mode can be the same as the minimum of the switching frequency in the critical mode, for example.

<Generation of Switch Signal for Switch S1>

Figure 44:
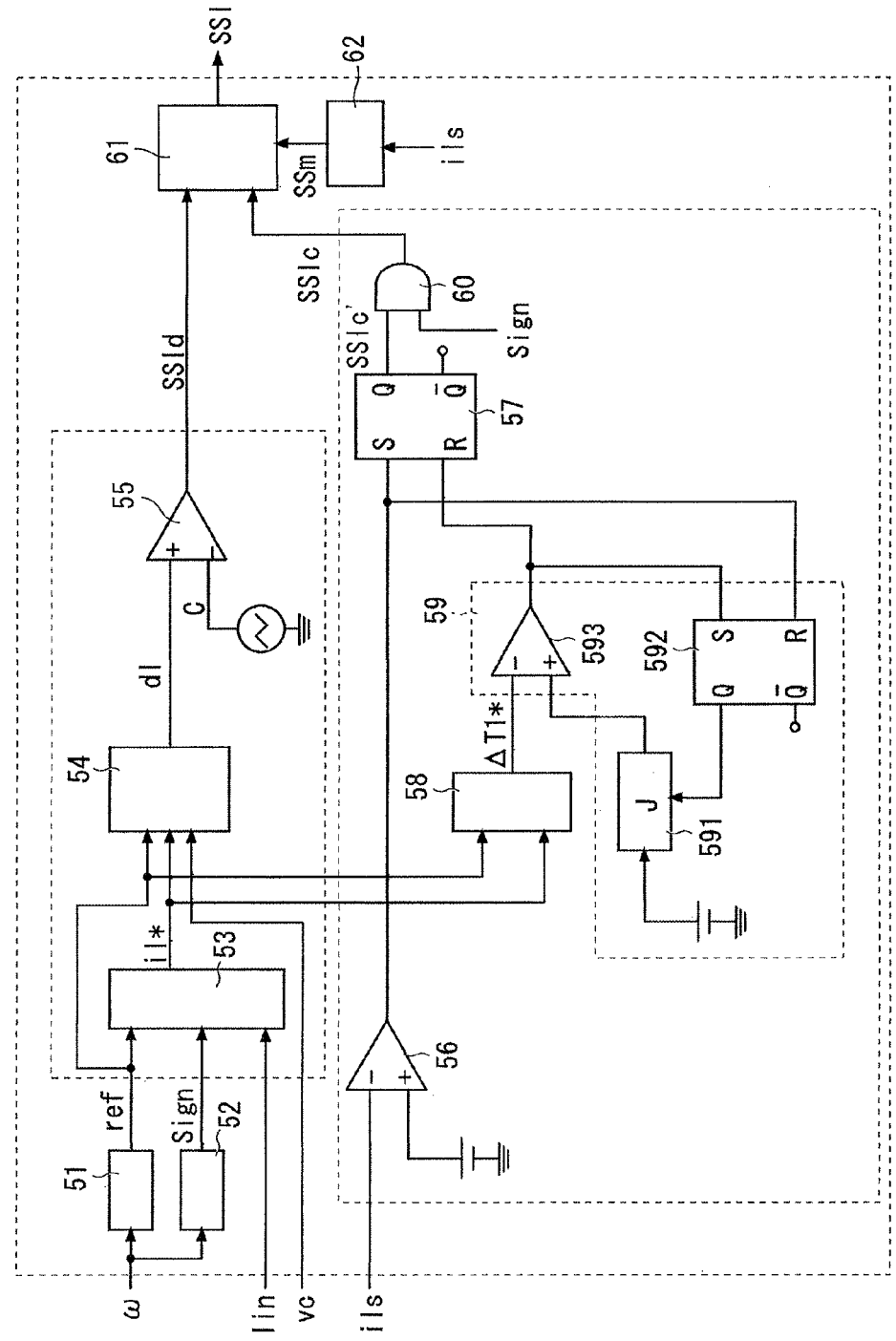
FIG. 44 is an example of a conceptual internal structure of the controller.

FIG. 44 shows an exemplary internal structure of a part of the controller 10 responsible for control on the switch Sl. The controller 10 includes an arithmetic processor 51, an arithmetic processor 52, a current command generating unit 53, a duty command generating unit 54, a discontinuous mode switch signal generating unit 55, a current zero-crossing detecting unit 56, a critical mode switch signal generating unit 57, a conducting period command generating unit 58, a conducting period elapse detecting unit 59, a feeding period switch signal prohibiting unit 60, a selecting unit 61, and a selection signal generating unit 62.

The arithmetic processor 51 inputs the power angular velocity ω of the input voltage Vin, calculates sin ωt, and outputs a result as a signal ref. The arithmetic processor 52 inputs the power angular velocity w and outputs a signal Sign. The signal Sign is expressed by the following formula:

$$\text{Sign} = \frac{\text{sign}(-\cos(2\omega t)) + 1}{2} \quad (53)$$

The symbol sign is what is called a signum function. When x takes a positive value, sign (x) takes 1. When x takes a negative value, sign (x) takes −1. Thus, according to formula (53), in a period when cos(2ωt) takes a positive value, specifically in the feeding period T1, the signal Sign takes zero and when cos(2ωt) takes a negative value, specifically in the receiving period T2, the signal Sign takes 1.

The current command generating unit 53 inputs the signals ref and Sign and the input current Iln. The current command generating unit 53 generates the current command il* based on the following formula:

$$il^* = \text{Sign} \cdot (Im \cdot abs(ref) - Im/abs(ref)/2) \quad (54)$$

In this formula, abs(x) is the absolute value of x. According to formula (54), the current command il* becomes zero in the feeding period T1 and takes a value determined based on formula (11) in the receiving period T2. The current command il* in the receiving period T2 may be set to be larger than that determined by formula (11) and may be set using formula (28), for example.

The duty command generating unit 54 inputs the current command il*, the across voltage vc of the capacitor C4, and the signal ref. The duty command generating unit 54 generates the boosting duty dl based on formula (16). The current command il* of formula (54) is adopted as the current il of formula (16).

The discontinuous mode switch signal generating unit 55 generates a switch signal SSl in the discontinuous mode (hereinafter called a switch signal SSld) based on the boosting duty dl. As an example, the discontinuous mode switch signal generating unit 55 is a comparator that compares the boosting duty dl and a carrier (such as the carrier C) and outputs a result of the comparison as the switch signal SSld.

The current zero-crossing detecting unit 56 detects a zero-crossing of the current ils (instantaneous value) flowing through the reactor L4. In the example of FIG. 44, the current zero-crossing detecting unit 56 is shown to be a comparator that detects a zero-crossing of the current ils when the detected current ils is smaller than a given reference value (substantially zero). Alternatively, the current zero-crossing detecting unit 56 may detect a voltage VL of the reactor L4 and detect a zero-crossing of the current ils based on the voltage VL.

The critical mode switch signal generating unit 57 is for example an RS flip-flop that inputs the output of the current zero-crossing detecting unit 56 to a set terminal. Thus, the RS flip-flop outputs an activated signal SSlc' in response to detection of the current zero-crossing.

The conducting period command generating unit 58 inputs the signal ref and the current command il* to generate a command value ΔT1* for the period ΔT1 based on formula (52).

The conducting period elapse detecting unit 59 detects elapse of the command value ΔT1* from a time when the zero-crossing of the current ils is detected. As an example, the conducting period elapse detecting unit 59 has an integrating circuit 591, a reset signal generator 592, and a comparator 593. The integrating circuit 591 receives a constant value (DC voltage) and a control signal input from the reset signal generator 592. In the absence of input of the control signal, namely in the presence of input of an inactive control signal, the integrating circuit 591 integrates this constant value with respect to time and outputs an integrated value. Thus, the integrated value increases in proportion to time.

The reset signal generator 592 is for example an RS flip-flop that inputs the output of the current zero-crossing detecting unit 56 at a reset terminal. Thus, the RS flip-flop outputs an inactive signal as a control signal to the integrating circuit 591 when the zero-crossing of the current ils is detected. The integrating circuit 591 sequentially outputs integrated values after initializing the integrated values with inputting this control signal as a trigger.

The comparator 593 compares the command value ΔT1* and the integrated value. When the integrate value exceeds the command value ΔT1*, the comparator 593 outputs this excess. In this way, the comparator 593 can detect elapse of the command value ΔT1* from the zero-crossing of the current ils.

The output of the comparator 593 is input to a set terminal of the reset signal generator 592. In response, the reset signal generator 592 applies an activated control signal to the integrating circuit 591. This makes the integrating circuit 591 stop integrating operation.

The output of the comparator 593 is input to a reset terminal of the critical mode switch signal generating unit 57. Then, the critical mode switch signal generating unit 57 makes the signal SSlc' inactive in response to elapse of the command value ΔT1* from the zero-crossing of the current ils.

The feeding period switch signal prohibiting unit 60 prohibits out of the switch signal SSl for the critical mode (hereinafter called a switch signal SSlc) in the feeding period T1. In the example of FIG. 44, the feeding period switch signal prohibiting unit 60 is an AND circuit that receives the signal SSlc' input from the critical mode switch signal generating unit 57 and the signal Sign. In response, the feeding period switch signal prohibiting unit 60 outputs an inactive signal as the switch signal SSlc when the signal Sign is 0 (specifically, in the feeding period T1) and outputs the signal SSlc' as the switch signal SSlc when the signal Sign is 1 (specifically, in the receiving period T2).

The selecting unit 61 inputs the switch signals SSld and SSlc and the mode selection signal SSm. Based on the mode selection signal SSm, the selecting unit 61 outputs one of the switch signals SSld and SSlc as the switch signal SSl to the switch Sl.

The mode selection signal SSm is generated by the selection signal generating unit 62. The selection signal generating unit 62 outputs the mode selection signal SSm such that the switch signal SSlc is adopted when the load of the inverter 5 is higher than the given value and the switch signal SSld is adopted when the load of the inverter 5 is lower than the given value.

As an example, the current ils is input to the selection signal generating unit 62. The selection signal generating unit 62 detects a maximum of the current ils in one cycle of a single-phase AC voltage. Then, the selection signal generating unit 62 outputs the mode selection signal SSm based on the maximum. As an example, when a current mode is the discontinuous mode and the maximum ilm1 is larger than the current reference value Iref1, the selection signal generating unit 62 switches the mode selection signal SSm and outputs the switched signal. When a current mode is the critical mode and the maximum ilm2 is smaller than the current reference value Iref2, the selection signal generating unit 62 switches the mode selection signal SSm and outputs the switched signal.

Alternatively, the current command il* may be input to the selection signal generating unit 62, and the selection signal generating unit 62 may calculate the maximum ilm2 in the critical mode and the maximum ilm1 in the discontinuous mode based on the current command il*.

<Method of Determining Inductance of Reactor L4>

A method of determining the inductance Lm of the reactor L4 is described.

The discontinuous mode can be achieved in the entire receiving period T2 by making a maximum of the sum of the periods ΔT1 and ΔT2 less than the switching cycle T. The sum of the periods ΔT1 and ΔT2 becomes largest when the current il becomes highest, specifically when the load of the inverter 5 becomes a maximum rating and the phase angle ωt is 90 degrees (also see FIG. 40).

Meanwhile, reducing a period when the current ils is zero is desirable in order to reduce the peak value Ip. In this regard, this period is zero when the sum of the periods ΔT1 and ΔT2 is largest, so that the discontinuous mode can be achieved in the entire receiving period T2 and the peak value Ip can be suppressed.

If the sum of the periods ΔT1 and ΔT2 is the same as the switching cycle T, an average of a voltage of the switch Sl can be expressed as $(1-dl)\cdot vc$. This average is the same as the rectified voltage $|Vin|$, thereby establishing $Vm\cdot|\sin(\omega t)|=(1-dl)\cdot vc$. Thus, the boosting duty dl determined when the phase angle ωt takes π/2 (=90 degrees) is expressed by the following formula:

$$dl = 1 - Vm/vc \tag{55}$$

Meanwhile, the following formula is derived by deforming formula (16) with respect to the inductance Lm:

$$Lm = \frac{dl^2 \cdot vc \cdot Vin \cdot T}{2 \cdot il \cdot (vc - Vin)} \tag{56}$$

As a result, by adopting a value determined when the inverter 5 is at a maximum rating and the phase angle ωt is 90 degrees as the current il in formula (56), by adopting a value determined when the phase angle ωt is 90 degrees as the input voltage Vin, and by adopting formula (55) for determining the boosting duty dl, the inductance Lm is determined that can reduce the maximum ilm while realizing the discontinuous mode reliably in the entire receiving period T2.

While the present disclosure has been described in detail, the foregoing description is in all aspects illustrative and does not restrict the disclosure. It is understood that numerous modifications not illustrated can be devised without departing from the scope of the disclosure.

The invention claimed is:

1. A method of controlling a direct power converter, the direct power converter comprising:
   a first power line;
   a second power line, a potential applied to said second power line being lower than a potential applied to said first power line;
   a diode rectifier that performs single-phase full-wave rectification, said diode rectifier having an input side connected to a single-phase AC power source, which outputs an AC waveform represented as sin(ωt), with ωt being a phase angle of the single-phase AC power source, and an output side connected to said first and second power lines;
   a charge-discharge circuit provided between said first and second power lines; and
   an inverter that converts a DC voltage between said first and second power lines to an AC voltage,
   said charge-discharge circuit comprising:
   a buffer circuit including a capacitor and a first switch connected in series to said capacitor between said first and second power lines on the side of said first power line relative to said capacitor, said buffer circuit transferring power between said first and second power lines; and
   a booster circuit that boosts a rectified voltage from said diode rectifier to charge said capacitor, said booster circuit including:
      a diode having an anode, and a cathode connected between said first switch and said capacitor;
      a reactor connected between said first power line and said anode such that a first terminal of said reactor is connected to said first power line and a second terminal of said reactor is connected to said anode; and a second switch connected between said second power line and said anode such that a first terminal of said second switch is connected to said second power line and a second terminal of said second switch is commonly connected to said anode and said second terminal of said reactor, wherein a DC voltage applied to said first switch and said capacitor is input to said inverter as said DC voltage between said first and second power lines;

power is fed from said buffer circuit to said first and second power lines in a first period when $\cos(2\omega t)$ is positive, with $\cos(2\omega t)$ being the cosine value of a value twice the phase angle $\omega t$, power from said first and second power lines is received by said buffer circuit in a second period when said cosine value is negative, and at least one of the following is satisfied:
  a discharge duty for making said first switch conducting is set to be higher than a first value in said first period, said first value being determined by dividing the product of an amplitude of an AC voltage of said single-phase AC power source and said cosine value by the product of an across voltage of said capacitor and $\sqrt{2}$, and
  a rectifying duty for making said diode rectifier conducting is set to be higher than a second value in said second period, said second value being the reciprocal of the product of the absolute value of said sine value and $\sqrt{2}$.

2. The method of controlling the direct power converter according to claim 1, wherein
  said rectifying duty in said second period is set to be higher than said second value, and
  said discharge duty in said first period is set at a value determined by multiplying said first value by a factor (>1) such that a maximum of ripple of a virtual DC link voltage caused by said rectifying duty becomes the same as a maximum of ripple of said virtual DC link voltage caused by said discharge duty, said virtual DC link voltage being expressed as the sum of the product of said discharge duty and said across voltage and the product of said rectifying duty and a rectified voltage of said AC voltage.

3. The method of controlling the direct power converter according to claim 2, wherein
  said second switch of said booster circuit is controlled such that in said second period, a current flowing through said reactor becomes a value determined by multiplying a value by a third value, said factor, and a ratio of an average of a DC current input to said inverter to a fourth value, said value being determined by subtracting a half of the reciprocal of the absolute value of said sine value from the absolute value of said sine value, said third value being a wave height value determined by converting an input current input to said diode rectifier to a sine wave relative to an effective value of said input current, said fourth value being determined by multiplying said third value by $1/\sqrt{2}$.

4. The method of controlling the direct power converter according to claim 2, wherein
  an amplitude modulation factor is reduced as said virtual DC link voltage increases as a result of ripple, said amplitude modulation factor being a ratio of an amplitude of an output of said inverter to said virtual DC link voltage, and
  said inverter is controlled based on said amplitude modulation factor.

5. The method of controlling the direct power converter according to claim 1, wherein said rectifying duty in said second period is 1.

6. The method of controlling the direct power converter according to claim 5, wherein said discharge duty in said first period is a value determined by multiplying said first value by $\sqrt{2}$ as a factor.

7. The method of controlling the direct power converter according to claim 1, wherein
  a switching signal with a pulse width modulated in a period determined by multiplying a cycle of a carrier and said discharge duty, to make said first switch conducting, is applied to said inverter,
  when a zero duty expressed as a value determined by subtracting the sum of said rectifying duty and said discharge duty from 1 is higher than zero, a switching signal with a pulse width modulated in a period determined by multiplying a cycle of said carrier and said rectifying duty and said rectifying duty is applied to said inverter and said inverter is made to adopt a zero-voltage vector in a period determined by multiplying said cycle of said carrier and said zero duty, and
  when said zero duty is lower than zero, a switching signal with a pulse width modulated in a period determined by multiplying said cycle of said carrier by the sum of said rectifying and zero duties is applied to said inverter.

8. The method of controlling the direct power converter according to claim 1, wherein
  in said first period, said second switch is turned on and off repeatedly in a critical mode or a discontinuous mode,
  said critical mode is a mode in which said second switch is turned on at a time when a reactor current flowing through said reactor becomes zero and said discontinuous mode is a mode in which said second switch is turned on after said reactor current becomes zero, and
  said critical mode is adopted when a load of said inverter is higher than a given value and said discontinuous mode is adopted when said load is lower than said given value.

9. The method of controlling the direct power converter according to claim 8, wherein
  when a maximum of said reactor current in said discontinuous mode exceeds a current reference value, said load is determined to be higher than said given value and said critical mode is adopted, and
  said current reference value is smaller than a maximum of said reactor current when said critical mode is adopted in a state that said load is at a maximum rating.

10. The method of controlling the direct power converter according to claim 8, wherein
  when a maximum of said reactor current in said critical mode is smaller than a second current reference value, said load is determined to be lower than said given value and said discontinuous mode is adopted, and
  said second current reference value is the same as or smaller than a maximum of said reactor current when said critical mode is adopted in a state that said load takes said given value.

11. The method of controlling the direct power converter according to claim 8, wherein a switching frequency of said second switch in said discontinuous mode is the same as a minimum of said switching frequency in said critical mode.

12. The method of controlling the direct power converter according to claim 8, wherein a switching frequency of said second switch in said discontinuous mode is higher than a minimum of said switching frequency in said critical mode.

13. The method of controlling the direct power converter according to claim 8, wherein a switching frequency of said second switch in said discontinuous mode is lower than a minimum of said switching frequency in said critical mode.

14. The method of controlling the direct power converter according to claim 8, wherein said first switch is made to keep non-conducting in said first period and said critical and discontinuous modes are switched in said second period.

* * * * *